United States Patent
You et al.

(10) Patent No.: US 12,453,731 B2
(45) Date of Patent: Oct. 28, 2025

(54) ANILINE-BASED WDR5 PROTEIN-PROTEIN INTERACTION INHIBITOR, AND PREPARATION METHOD AND USE THEREOF

(71) Applicant: CHINA PHARMACEUTICAL UNIVERSITY, Nanjing (CN)

(72) Inventors: Qidong You, Nanjing (CN); Xiaoke Guo, Nanjing (CN); Weilin Chen, Nanjing (CN); Dongdong Li, Nanjing (CN); Jing Gu, Nanjing (CN); Jun Xu, Nanjing (CN); Xin Chen, Nanjing (CN); Zhengyu Jiang, Nanjing (CN); Xiaoli Xu, Nanjing (CN)

(73) Assignee: China Pharmaceutical University, Jiangsu (CN)

( * ) Notice: Subject to any disclaimer, the term of this patent is extended or adjusted under 35 U.S.C. 154(b) by 1079 days.

(21) Appl. No.: 17/434,353

(22) PCT Filed: Mar. 22, 2019

(86) PCT No.: PCT/CN2019/079160
§ 371 (c)(1),
(2) Date: Aug. 26, 2021

(87) PCT Pub. No.: WO2020/172932
PCT Pub. Date: Sep. 3, 2020

(65) Prior Publication Data
US 2022/0152027 A1 May 19, 2022

(30) Foreign Application Priority Data
Feb. 26, 2019 (CN) .......................... 201910139980.6

(51) Int. Cl.
*A61K 31/517* (2006.01)
*A61K 31/506* (2006.01)
(Continued)

(52) U.S. Cl.
CPC .......... *A61K 31/517* (2013.01); *A61K 31/506* (2013.01); *A61K 31/5355* (2013.01); *A61P 35/00* (2018.01)

(58) Field of Classification Search
None
See application file for complete search history.

(56) References Cited

U.S. PATENT DOCUMENTS 10,980,807 B2  4/2021  Dai et al.
11,174,250 B2  11/2021  Al-Awar et al.
(Continued)

FOREIGN PATENT DOCUMENTS

CN   104844573 A   8/2015
CN   105175284 B   6/2017
(Continued)

OTHER PUBLICATIONS

PCT/CN2019079160 International Search Report, mailed Nov. 26, 2019 (2 Pages).
(Continued)

*Primary Examiner* — Jeffrey S Lundgren
*Assistant Examiner* — Anthony Joseph Seitz
(74) *Attorney, Agent, or Firm* — Young Basile Hanlon & MacFarlane, P.C.

(57) ABSTRACT

The present disclosure discloses a WDR5 protein-protein interaction inhibitor, including a compound having a structure represented by general formula (I). Experiments show that the inhibitor acts on a WDR5 protein and an interacting protein thereof including, but not limited to, MLL, selectively inhibits the proliferation of leukemia cells, and inhibits the methylation of H3K4 and the expression of downstream Hox/Meis-1 gene at the cellular level. The present disclosure also discloses a method for preparing the inhibitor
(Continued)

and use thereof in the preparation of a drug for treating acute leukemia and other related diseases.

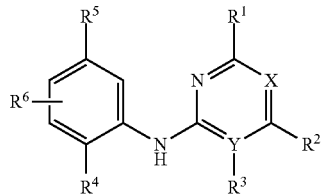

(I)

18 Claims, 1 Drawing Sheet

(51) Int. Cl.
*A61K 31/5355* (2006.01)
*A61P 35/00* (2006.01)

(56) References Cited

U.S. PATENT DOCUMENTS

| | | | | |
|---|---|---|---|---|
| 11,479,545 | B2* | 10/2022 | You | A61K 31/496 |
| 12,054,478 | B2* | 8/2024 | You | C07D 405/12 |
| 2019/0112290 | A1 | 4/2019 | Al-Awar et al. | |
| 2021/0139466 | A1 | 5/2021 | You et al. | |
| 2023/0286925 | A1* | 9/2023 | You | C07D 401/14 |

FOREIGN PATENT DOCUMENTS

| | | |
|---|---|---|
| CN | 107382840 A | 11/2017 |
| WO | WO2011149827 A1 | 12/2011 |

OTHER PUBLICATIONS

Chinese Application CN201910139980 First Search mailed Dec. 31, 2021 (1 Page).
Chinese Application CN201810365880 First Search mailed Nov. 25, 2020 (2 Pages).
EP18916025.2 European Supplementary Search Report, mailed Jul. 12, 2021 (8 pages).
Bolshan, et al., "Synthesis, Optimization, and Evaluation of Novel Small Molecules as Antagonists of WDR5-MLL Interaction," ACS Medicinal Chemisrty Letters, vol. 4, No. 3, Feb. 2013, pp. 353-357.
Li, Dongdong et al., "High-affinity Small Molevular Blockers of Mixed Lineage Leukemia 1 (MLL)-WDR5 Interaction Inhibit MLL1 Complez H3K4 Methyltransferase Activity," Euopean Journal of Medicinal Chemistry, vol. 124, Aug. 20, 2016, pp. 480-489.
Li, Dongdong et al.,"Structure-based Design and Synthesis of Small Molecular Inhibitors Disturbing the Interaction of MLL1-WDR5," European Journal of Medicinal Chemistry, vol. 118, Apr. 13, 2016, pp. 1-8.
Getlik, Matthaus et al., "Structure-Based Optimization of a Small Molecule Antagonist of the Interaction Between WD Repeat-Containing Protein 5 (WDR5) and Mized-Lineage Leukemia 1 (MLL1)," Journal of Medicianl Chemistry, vol. 59, No. 6, Mar. 9, 2016, pp. 2478-2496.
PCT/CN2018123500 International Search Report, mailed Mar. 11, 2019 (3 Pages).

* cited by examiner

ANILINE-BASED WDR5 PROTEIN-PROTEIN INTERACTION INHIBITOR, AND PREPARATION METHOD AND USE THEREOF

TECHNICAL FIELD

The present disclosure relates to an aniline compound in medicinal chemistry, a preparation method thereof, and use thereof. As a WDR5 protein-protein interaction inhibitor, the compound inhibits the level of a histone methyltransferase and the expression of a downstream hematopoietic gene at the cellular level, inhibits the growth of transplanted tumors in nude mice at the animal level, and can be used to treat diseases such as acute leukemia.

BACKGROUND

A WDR5 protein includes 334 amino acids, and contains 7 WD40 repeat domains. Structural studies have shown that the WD40 repeat domains form a 7-blade propeller structure, each blade including 4 antiparallel chains. Such a structural feature enables WDR5 to interact with many other proteins, for example, WDR5-MLL1, WDR5-MYC, and WDR5-MOF/HAT. WDR5 may also bind to H3K4me2. Studies have shown that the WDR5 may stabilize or assemble a VISA (virus-induced signaling adaptor)-related complex, and plays an important role in type I interferon and antiviral innate immune response. The WDR5 protein is also highly expressed in bladder cancer, and promotes the proliferation, self-renewal and chemotherapy of bladder cancer cells by activating the expression of H3K4me3. As an important cofactor, the WDR5 participates in N-Myc-regulated transcriptional activation and tumorigenesis. Inhibition of the WDR5 protein is a novel target for the treatment of MYCN-amplified neuroblastoma.

The histone methylation plays a key role in many bioprocesses and is an important research content in the field of epigenetic regulation. MLL1 is a histone H3 lysine 4 (H3K4) methyltransferase. MLL1 gene is translocated and rearranged to form a fusion gene that expresses an oncogenic MLL fusion protein to induce mixed lineage leukemia (MLL1, acute myeloid leukemia and acute lymphatic leukemia). Conventional chemotherapy for the treatment of leukemia caused by MLL abnormality is undesirable with poor prognosis. No targeted drug is available at present. Therefore, it is an urgent need of development of a novel therapeutic agent for the biological properties of the disease.

The chromosomal translocation of MLL1 only occurs on a monoallelic gene, and there is also a wild-type MLL1. The wild-type MLL1 and a fusion protein thereof are jointly involved in the occurrence and development of mixed lineage leukemia, where enzymatic activity of the wild-type MLL1 is crucial for the induction of leukemia by the MLL1 fusion protein. Therefore, specifically inhibiting the enzymatic activity of the wild-type MLL1 can achieve the effect of leukemia treatment.

MLL1 present alone has very poor catalytic activity, and can only catalyze the monomethylation of H3K4. When MLL1 forms a core complex with WDR5, RbBP5, Ash2L, and DPY30, the enzymatic catalysis activity is greatly enhanced, especially the catalytic activity for H3K4me2. As a bridge linking a C-terminal WIN motif of MLL1 to other proteins, the WDR5 plays a vital role in the formation of the complex. Therefore, interfering with the WDR5 protein-protein interaction using a micromolecular inhibitor is an effective way to inhibit the enzymatic catalysis activity of MLL1, thereby inhibiting the expression of downstream Hox and Meis-1 genes, and thus blocking the progression of leukemia.

SUMMARY OF THE INVENTION

Object of the Disclosure: An object of the present disclosure is to provide a WDR5 protein-protein interaction inhibitor, which inhibits the level of a histone methyltransferase and the expression of a downstream hematopoietic gene at the cellular level and inhibits the growth of transplanted tumors in nude mice at the animal level; and use thereof in the treatment of a drug for an indication related to a MLL enzyme function. The inhibitor can be used to treat diseases such as acute leukemia.

Technical Solution: The present disclosure discloses a micromolecular compound that may interfere with WDR5 protein-protein interaction, inhibits the catalytic activity of a MLL1 for methyl transfer and down-regulates the expression levels of Hox and Meis-1 genes by interfering with the WDR5 protein-protein interaction, thereby inducing the apoptosis of leukemia cells for use in the treatment of acute leukemia. The compound of the present disclosure has a structure below:

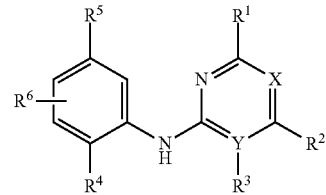

where X represents CH or N;
Y represents C or N;
$R^1$, $R^2$ and $R^3$ are identical to or different from each other, and are each independently selected from the group consisting of hydrogen, $C_1$-$C_6$ alkyl, $C_3$-$C_6$ cycloalkyl, $C_1$-$C_6$ alkyl substituted with $C_1$-$C_6$ alkoxy, nitro, halo, cyano, aldehyde group, hydroxyl, —$NR^7R^8$, or

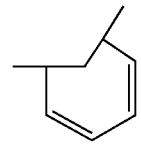

formed by linking $R^2$ and $R^3$, where $R^7$ and $R^8$ are identical to or different from each other, and each independently represent hydrogen or $C_1$-$C_4$ alkyl, or 3- to 7-membered nitrogenous heterocycle formed by linking $R^7$ and $R^8$;
$R^4$ represents morpholinyl, piperazinyl, 4-substituted piperazinyl, 4-substituted homopiperazinyl, 3-substituted piperazinyl, or 2-substituted piperazinyl, where a substituent is $C_1$-$C_4$ alkyl, 3- to 7-membered cycloalkyl, hydroxyalkyl, or phenyl;
$R^5$ represents nitro, amino, phenyl, substituted phenyl, 5- to 6-membered oxygenic or nitrogenous aromatic heterocycle, substituted 5- to 6-membered oxygenic or nitrogenous aromatic heterocycle, or —$NHCOR^9$, where $R^9$ represents hydroxyl, $C_1$-$C_6$ alkoxy, phenyl, substituted phenyl, 5- to 6-membered oxygenic or nitrogenous aromatic heterocycle, or substituted 5- to 6-membered oxygenic or nitrogenous aromatic heterocycle, where a substituent is $C_1$-$C_4$ alkyl, $C_1$-$C_4$ alkoxy, halo, cyano, —NHCOR$^{10}$, —CONR$^{11}$R$^{12}$ or —COOR$^{10}$, where R$^{10}$ represents hydrogen, $C_1$-$C_6$ alkyl, $C_1$-$C_6$ amino-substituted alkyl, 3- to 7-membered cycloalkyl, 3- to 7-membered nitrogenous or oxygenic heterocycle, or phenyl; and R$^{11}$ and R$^{12}$ independently represent hydrogen, $C_1$-$C_6$ alkyl, phenyl or substituted phenyl, substituted or unsubstituted 3- to 7-membered nitrogenous or oxygenic heterocycle, or 3- to 7-membered nitrogenous or oxygenic heterocycle formed by R$^{11}$ and R$^{12}$; and R$^6$ represents hydrogen, halo, methyl, trifluoromethyl, amino, or substituted amino, where a substituent is $C_1$-$C_4$ alkyl, or allyl;

R$^1$, R$^2$ and R$^3$ are identical to or different from each other, and are each independently selected from the group consisting of hydrogen, halo, methyl, nitro, cyano, aldehyde group, methoxyl, —NR$^7$R$^8$, or

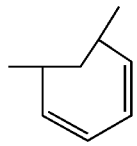

performed by linking R$^2$ and R$^3$, where R$^7$ and R$^8$ are identical to or different from each other, and each independently represent hydrogen, or $C_1$-$C_4$ alkyl, or 3- to 5-membered nitrogenous heterocycle formed by linking R$^7$ and R$^8$;

R$^4$ is preferably morpholinyl, piperazinyl, or 4-substituted piperazinyl, where a substituent is methyl, ethyl, cyclopropyl, hydroxyethyl, or phenyl;

R$^5$ is preferably nitro, amino, —NHCOR$^9$, furyl, pyrimidinyl, pyridinyl, substituted triazolyl, or substituted phenyl, where a substituent is a mono- or di-substituted halo, —NHCOR$^{10}$, —CONR$^{11}$R$^{12}$, or —COOR$^{10}$, where R$^9$ represents phenyl; R$^{10}$ represents hydrogen, $C_1$-$C_6$ alkyl, $C_1$-$C_6$ amino-substituted alkyl, 3- to 7-membered cycloalkyl, 3- to 7-membered nitrogenous or oxygenic heterocycle, or phenyl; and R$^{11}$ and R$^{12}$ independently represent hydrogen, $C_1$-$C_6$ alkyl, phenyl or substituted phenyl, substituted or unsubstituted 3- to 7-membered nitrogenous or oxygenic heterocycle, or 3- to 7-membered nitrogenous or oxygenic heterocycle formed by linking R$^{11}$ and R$^{12}$.

The present disclosure further includes a pharmaceutically acceptable salt of Compound (I) and a solvate thereof, which have the same pharmacological effects as Compound (I).

The present disclosure discloses a pharmaceutical composition, which comprises Compound (I), or a pharmaceutical salt thereof, or a solvate, and one or more pharmaceutical carriers, diluents and excipients.

The present disclosure further provides use of the compound of formula (I) or a pharmaceutical salt thereof or a solvate in the preparation of a drug for treating a disease mediated by the enzyme by inhibiting WDR5 protein-protein interaction. The disease, for example, MLL gene-fused leukemia, may be treated by inhibiting the enzyme activity of MLL1.

The clinically used dose of the compound of the present disclosure is 0.01 mg to 1000 mg/day, or may deviate from this range according to the disease severity or different dosage forms.

In some embodiments, the compound of formula (I) may contain an alkaline functional group adequate to form a salt. Representative salts include a pharmaceutical inorganic acid salt, including a hydrochloride, a hydrobromide, and a sulfate; and a pharmaceutical organic acid salt, preferably including an acetate, a trifluoroacetate, a lactate, a succinate, a fumarate, a maleate, a citrate, a benzoate, a methanesulfonate, a p-benzoate or a p-toluenesulfonate.

Further, the present disclosure also discloses a method for preparing a related compound of formula (I), including the following processes:

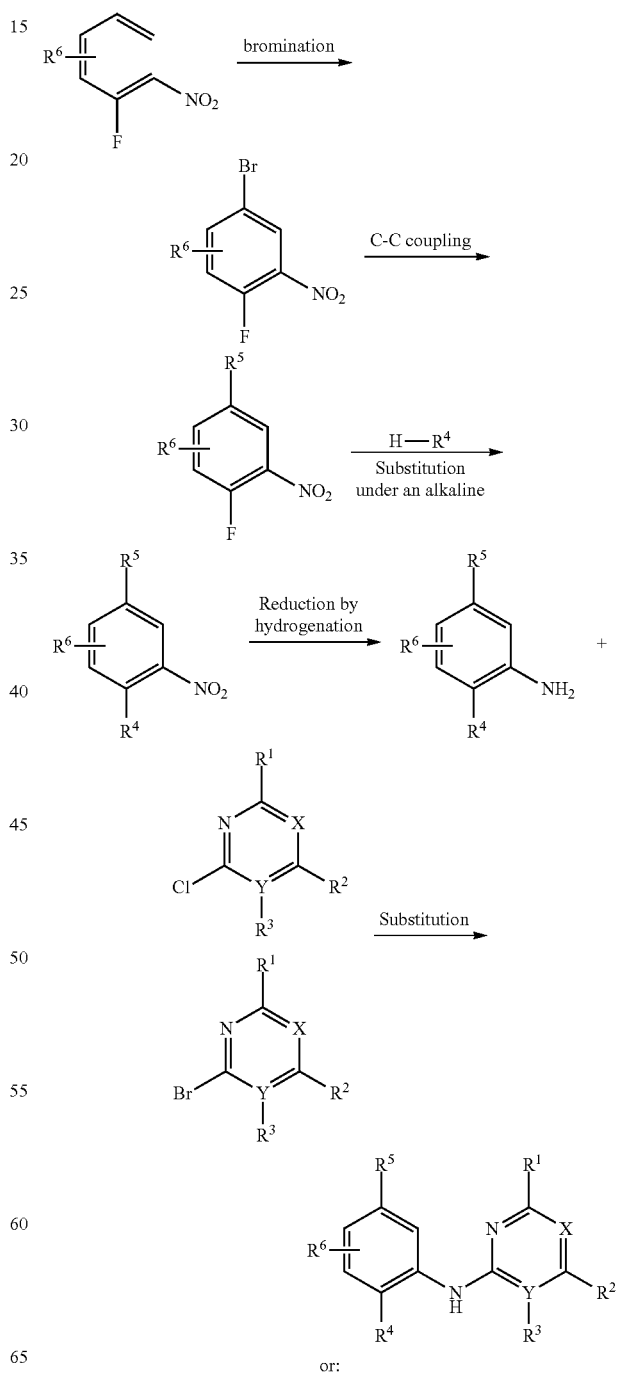

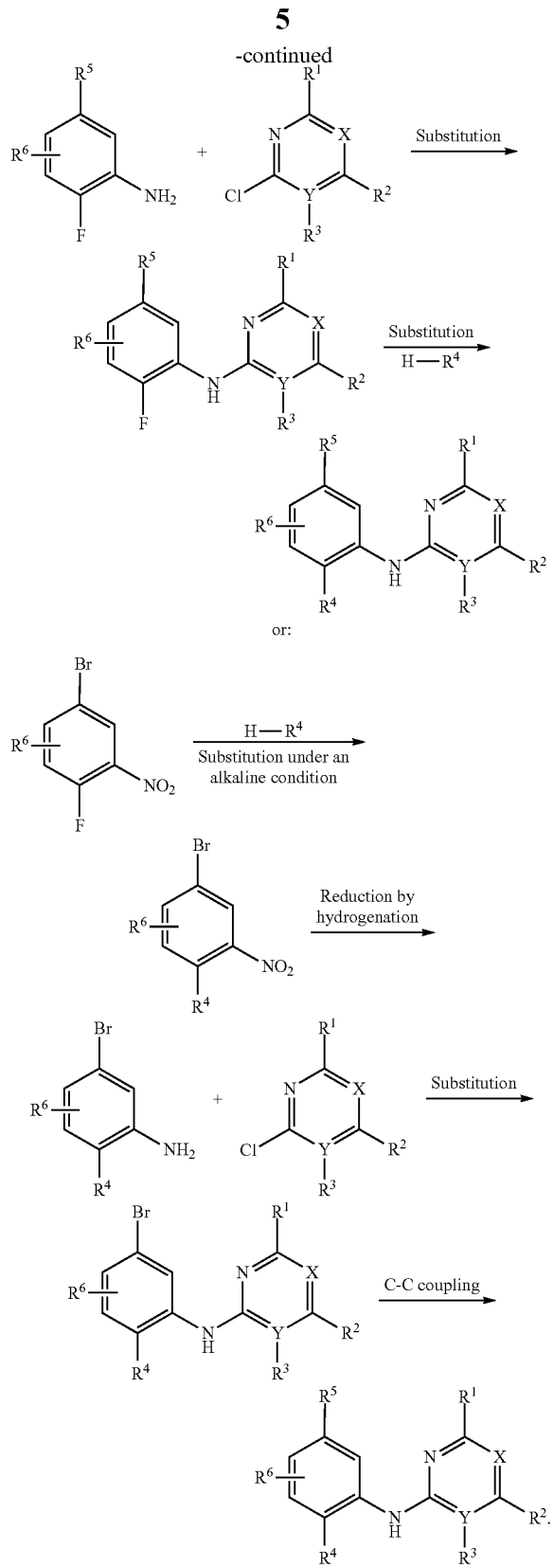

Beneficial effects: The aniline compound of the present disclosure has a strong WDR5 protein-protein interaction inhibiting activity, may reduce the enzymatic catalysis activity of MLL1, down-regulates the expression of Hox and Meis-1 genes at the cellular level, and is useful in the treatment of an indication related to a WDR5 enzyme function. The related indication refers to a hematological tumor, including diseases such as acute leukemia.

DETAILED DESCRIPTION

Example 1

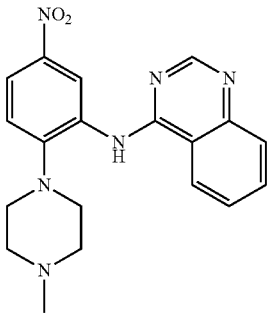 [SMILES: CN1CCN(c2ccc([N+](=O)[O-])cc2Nc2ncnc3ccccc23)CC1]

N-(2-(4-methylpiperazin-1-yl)-5-nitrophenyl)qui-nazoline-4-amine

Figure 1:
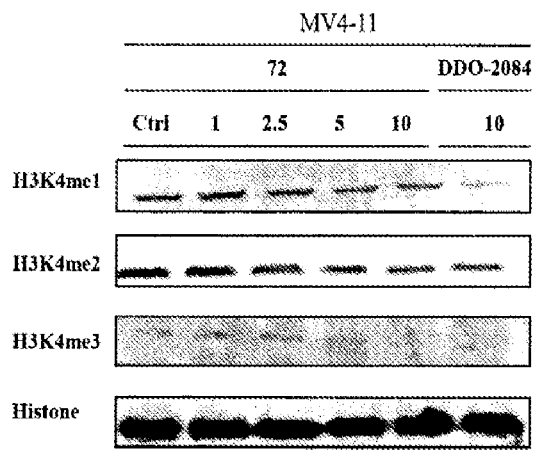
FIG. 1 shows the effect of the title compound of Example 72 on the intracellular enzymatic catalysis activity of MLL1, as detected by a Western blot experiment.

Step 1: Preparation of 2-(4-methylpiperazin-1-yl)-5-nitrophenylamine 2-fluoro-5-nitrophenylamine (2 g, 12.8 mmol) was dissolved in DMF (20 mL), and then DIPEA (3.3 g, 25.6 mmol) and 1-methylpiperazine (25.6 mmol) were added. The mixture was stirred at 100° C. for 8 hrs. 100 mL of water was added to the reaction mixture, which was extracted with ethyl acetate (3×50 mL). The organic layers were combined, dried over anhydrous $Na_2SO_4$, and distilled under reduced pressure, to obtain a crude product, which was washed with $CH_3CN$ to obtain a yellow solid. Yield 53.0%; m.p. 200° C.-202° C. $^1$H NMR (300 MHz, DMSO-$d_6$) δ 7.53 (d, J=2.4 Hz, 1H), 7.42 (dd, J=8.8, 2.4 Hz, 1H), 7.04 (d, J=8.7 Hz, 1H), 5.26 (s, 2H), 3.11 (s, 4H), 2.58 (s, 4H), 2.24 (s, 3H). HRMS (ESI): calcd. for m/z $C_{11}H_{17}N_4O_2$, $[M+H]^+$ 237.1316, found 237.1342.

Step 2: Preparation of Titled Compound

N-(2-(4-methylpiperazin-1-yl)-5-nitrophenyl)quinazo-line-4-amine 2-(4-methylpiperazin-1-yl)-5-nitrophenylamine (0.2 g, 0.846 mmol) was dissolved in isopropanol (10 mL), and then 1 mL of concentrated HCl and 4-chloroquinazoline (0.27 g, 1.69 mmol) were added. The mixture was refluxed for 18 hrs. The reaction mixture was distilled under reduced pressure until a solid precipitated, cooled, and filtered under suction. The filter cake was washed with isopropanol (5 mL×3), and dried to obtain a yellow solid. Yield 63.5%; m.p.>250° C.; $^1$H NMR (300 MHz, DMSO-$d_6$) δ 9.57 (s, 1H), 8.61 (s, 2H), 8.43 (s, 1H), 8.07 (s, 1H), 7.86 (d, J=10.0 Hz, 2H), 7.69 (s, 1H), 7.30 (s, J=8.8 Hz, 1H), 3.09 (s, 4H), 2.32 (s, 4H), 2.13 (s, 3H). HRMS (ESI): calcd. for m/z $C_{19}H_{20}N_6O_2$, [M+H]$^+$ 365.1720, found 365.1722. HPLC (100% MeOH): $t_R$=7.772 min, 99.16%.

Example 2

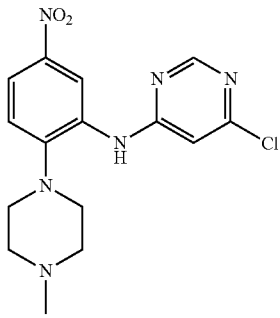 [SMILES: CN1CCN(c2ccc([N+](=O)[O-])cc2Nc2cc(Cl)ncn2)CC1]

6-chloro-N-(2-(4-methylpiperazin-1-yl)-5-nitrophenyl)pyrimidine-4-amine

Following the method in Step 2 of Example 1, 4-chloroquinazoline was replaced by 4,6-dichloropyrimidine (1.69 mmol), to obtain a yellow solid. Yield 65.8%; m.p. 169° C.-171° C.; $^1$H NMR (300 MHz, DMSO-$d_6$) δ 9.36 (s, 1H), 8.48 (s, 1H), 8.42 (d, J=2.7 Hz, 1H), 8.02 (dd, J=8.9, 2.8 Hz, 1H), 7.23 (d, J=9.0 Hz, 1H), 6.81 (s, 1H), 3.04 (t, J=4.6 Hz, 4H), 2.35 (t, J=4.7 Hz, 4H), 2.16 (s, 3H). HRMS (ESI): calcd. for m/z $C_{15}H_{17}ClN_6O_2$, [M+H]$^+$ 349.1174, found 349.1177. HPLC (100% MeOH): $t_R$=6.097 min, 96.84%.

Example 3

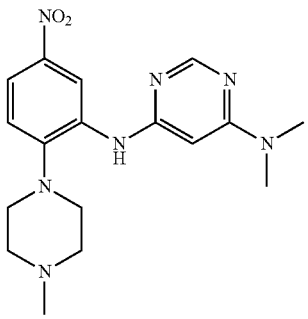 [SMILES: CN1CCN(c2ccc([N+](=O)[O-])cc2Nc2cc(N(C)C)ncn2)CC1]

$N^4,N^4$-dimethyl-$N^6$-(2-(4-methylpiperazin-1-yl)-5-nitrophenyl)pyrimidine-4,6-diamine The title compound of Example 2 (0.35 mmol) was dissolved in DMF (5 mL), and then DIPEA (1.5 mmol) and dimethylamine (1 mmol) were added. The mixture was kept at 120° C. for 4 hrs. The reaction mixture was diluted with ethyl acetate (20 mL), washed with water (10 mL×3), and then washed with a saturated sodium chloride solution. The organic layer was dried over anhydrous sodium sulfate, filtered under suction, and spin-dried. The crude product was purified by silica gel column chromatography (dichloromethane:methanol=50:1) to obtain a yellow solid. Yield 49.5%; m.p. 152° C.-154° C.; $^1$H NMR (300 MHz, CDCl$_3$) δ 8.69 (d, J=2.7 Hz, 1H), 8.28 (s, 1H), 7.80 (dd, J=8.7, 2.7 Hz, 1H), 7.06 (d, J=8.8 Hz, 1H), 6.94 (s, 1H), 5.82 (s, 1H), 3.03 (s, 6H), 2.94 (t, J=4.8 Hz, 4H), 2.65-2.48 (m, 4H), 2.30 (s, 3H). HRMS (ESI): calcd. for m/z $C_{17}H_{23}N_7O_2$, [M+H]$^+$ 358.1986, found 358.1992. HPLC (100% MeOH): $t_R$=4.709 min, 99.20%.

Example 4

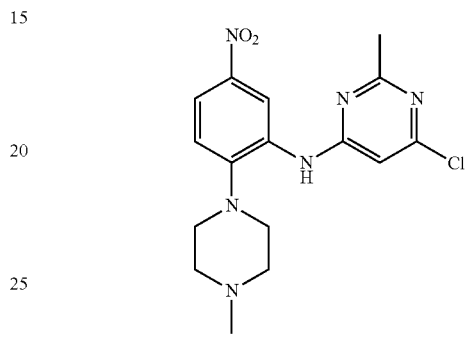

6-chloro-2-methyl-N-(2-(4-methylpiperazin-1-yl)-5-nitrophenyl)pyrimidine-4-amine Following the method in Step 2 of Example 1, 4-chloroquinazoline was replaced by 4,6-dichloro-2-methylpyrimidine, to obtain a yellow solid. Yield 44.8%; m.p. 196° C.-198° C.; $^1$H NMR (300 MHz, CDCl$_3$) δ 9.09 (d, J=2.6 Hz, 1H), 7.97 (dd, J=8.8, 2.7 Hz, 1H), 7.55 (s, 1H), 7.23 (s, 1H), 6.59 (s, 1H), 3.02 (t, J=4.8 Hz, 4H), 2.65-2.61 (m, 7H), 2.40 (s, 3H). HRMS (ESI): calcd. for m/z $C_{16}H_{19}ClN_6O_2$, [M+H]$^+$ 363.1331, found 363.1335. HPLC (100% MeOH): $t_R$=8.574 min, 97.99%.

Example 5

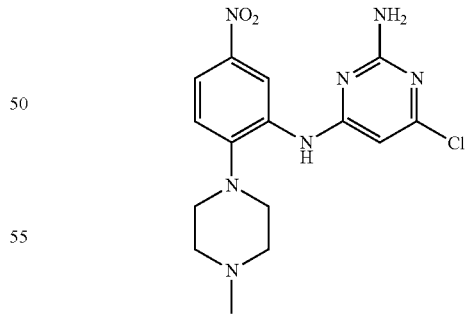

6-chloro-$N^4$-(2-(4-methylpiperazin-1-yl)-5-nitrophenyl)pyrimidine-2,4-diamine

Following the preparation method in Step 2 of Example 1, 4-chloroquinazoline was replaced by 4,6-dichloro-2-aminopyrimidine, to obtain a yellow solid. Yield 77.6%; m.p. 248° C.-251° C.; $^1$H NMR (300 MHz, CDCl$_3$) δ 9.13 (s, 1H), 7.94

(dd, J=8.7, 2.6 Hz, 1H), 7.41 (s, 1H), 7.20 (d, J=2.6 Hz, 1H), 5.16 (s, 2H), 3.00 (t, J=4.8 Hz, 4H), 2.64 (s, 4H), 2.41 (s, 3H). HRMS (ESI): calcd. for m/z $C_{15}H_{18}ClN_7O_2$, [M+H]$^+$ 364.1283, found 364.1289. HPLC (100% MeOH): $t_R$=5.850 min, 97.14%.

Example 6

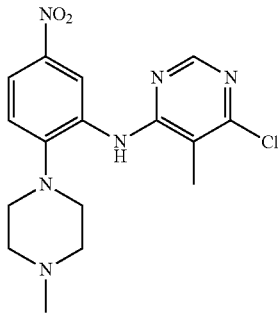 [SMILES: Cc1c(Cl)ncnc1Nc1cc([N+](=O)[O-])ccc1N1CCN(C)CC1]

6-chloro-5-methyl-N-(2-(4-methylpiperazin-1-yl)-5-nitrophenyl)pyrimidine-4-amine Following the preparation method in Step 2 of Example 1, 4-chloroquinazoline was replaced by 4,6-dichloro-5-methylpyrimidine, to obtain a yellow solid. Yield 60.5%; m.p. 259° C.-261° C.; $^1$H NMR (300 MHz, CDCl$_3$) δ 9.55 (s, 1H), 8.57 (s, 1H), 8.18 (s, 1H), 7.95 (dd, J=8.7, 2.7 Hz, 1H), 7.27 (s, 1H), 3.02 (t, J=4.8 Hz, 4H), 2.66 (s, 4H), 2.42 (s, 6H). HRMS (ESI): calcd. for m/z $C_{16}H_{19}ClN_6O_2$, [M+H]$^+$ 363.1331, found 363.1349. HPLC (100% MeOH): $t_R$=7.673 min, 97.05%.

Example 7

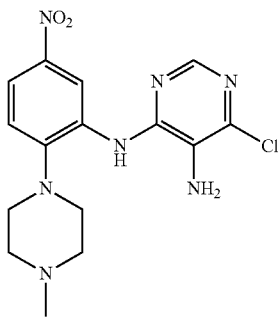

6-chloro-N$^4$-(2-(4-methylpiperazin-1-yl)-5-nitrophenyl)pyrimidine-4,5-diamine

Following the preparation method in Step 2 of Example 1, 4-chloroquinazoline was replaced by 4,6-dichloro-5-aminopyrimidine, to obtain a yellow solid. Yield 84.7%; m.p. 185° C.-187° C.; $^1$H NMR (300 MHz, DMSO-d$_6$) δ 8.65 (d, J=2.6 Hz, 1H), 8.22 (s, 1H), 7.98-7.91 (m, 2H), 7.27 (d, J=8.9 Hz, 1H), 5.41 (s, 2H), 2.91 (br s, 4H), 2.47 (br s, 4H), 2.20 (s, 3H). HRMS (ESI): calcd. for m/z $C_{15}H_{18}ClN_7O_2$, [M+H]$^+$ 364.1283, found 364.1286. HPLC (100% MeOH): $t_R$=6.581 min, 98.22%.

Example 8

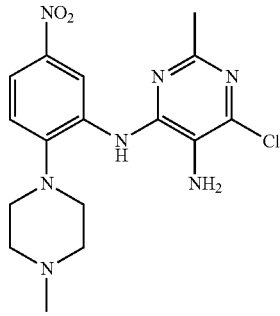 [SMILES: Cc1nc(Cl)c(N)c(Nc2cc([N+](=O)[O-])ccc2N2CCN(C)CC2)n1]

6-chloro-2-methyl-N$^4$-(2-(4-methylpiperazin-1-yl)-5-nitrophenyl)pyrimidine-4,5-diamine Following the preparation method in Step 2 of Example 1, 4-chloroquinazoline was replaced by 4,6-dichloro-2-methyl-5-aminopyrimidine, to obtain a yellow solid. Yield 67.8%; m.p. 248° C.-250° C.; $^1$H NMR (300 MHz, DMSO-d$_6$) δ 8.87 (d, J=2.8 Hz, 1H), 8.22 (s, 1H), 7.94 (dd, J=8.8, 2.8 Hz, 1H), 5.12 (s, 2H), 2.98 (t, J=4.8 Hz, 4H), 2.46 (s, 4H), 2.32 (s, 3H), 2.21 (s, 3H). HRMS (ESI): calcd. for m/z $C_{16}H_{20}ClN_7O_2$, [M+H]$^+$ 378.1440, found 378.1440. HPLC (100% MeOH): $t_R$=6.251 min, 97.99%.

Example 9

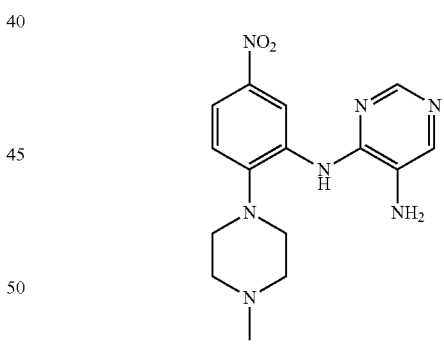

N$^4$-(2-(4-methylpiperazin-1-yl)-5-nitrophenyl)pyrimidine-4,5-diamine

Following the preparation method in Step 2 of Example 1, 4-chloroquinazoline was replaced by 4-chloro-5-aminopyrimidine, to obtain a yellow solid. Yield 43.7%; m.p.>250° C.; $^1$H NMR (300 MHz, DMSO-d$_6$) δ 8.25 (s, 1H), 7.82 (dd, J=7.4, 1.9 Hz, 1H), 7.81-7.77 (m, 2H), 7.67 (s, 1H), 7.04 (d, J=7.5 Hz, 1H), 5.82 (s, 2H), 3.20 (t, J=5.3 Hz, 4H), 2.98 (t, J=5.3 Hz, 4H), 2.60 (s, 3H). HRMS (ESI): calcd. for m/z $C_{15}H_{19}N_7O_2$, [M+H]$^+$ 330.1673, found 330.1675. HPLC (100% MeOH): $t_R$=7.673 min, 97.05%.

Example 10

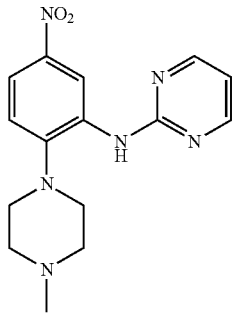 [SMILES: CN1CCN(c2ccc([N+](=O)[O-])cc2Nc2ncccn2)CC1]

N-(2-(4-methylpiperazin-1-yl)-5-nitrophenyl)pyrimidine-2-amine

Following the preparation method in Step 2 of Example 1, 4-chloroquinazoline was replaced by 2-bromopyrimidine, to obtain a yellow solid. Yield 57.5%; m.p. 195° C.-197° C.; $^1$H NMR (300 MHz, CDCl$_3$) δ 9.47 (s, 1H), 8.54 (d, J=3.0 Hz, 2H), 8.03 (s, 1H), 7.88 (d, J=3.0 Hz, 1H), 7.22 (d, J=9.0 Hz, 1H), 6.85 (t, J=9.0 Hz, 1H), 3.04 (t, J=5.6 Hz, 4H), 2.70 (br s, 4H), 2.42 (s, 3H). HRMS (ESI): calcd. for m/z C$_{15}$H$_{18}$ClN$_7$O$_2$, [M+H]$^+$ 315.1564, found 315.1566. HPLC (100% MeOH): t$_R$=16.340 min, 96.09%.

Example 11

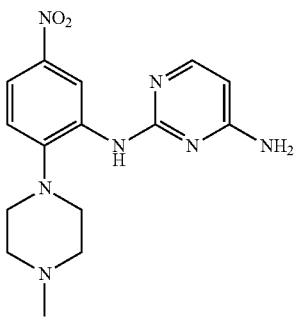 [SMILES: CN1CCN(c2ccc([N+](=O)[O-])cc2Nc2nccc(N)n2)CC1]

N$^2$-(2-(4-methylpiperazin-1-yl)-5-nitrophenyl)pyrimidine-2,4-diamine

Following the preparation method in Step 2 of Example 1, 4-chloroquinazoline was replaced by 2-chloropyrimidine-4-amine, to obtain a yellow solid. Yield 45.7%; m.p. 210° C.-212° C.; $^1$H NMR (300 MHz, DMSO-d$_6$) δ 9.30 (s, 1H), 7.94 (d, J=6.0 Hz, 1H), 7.80 (dd, J=8.7 Hz, 1H), 7.63 (s, 1H), 7.32 (d, J=8.8 Hz, 1H), 6.81 (br s, 2H), 6.03 (d, J=5.8 Hz, 1H), 2.93 (t, J=4.7 Hz, 4H), 2.54 (br s, 4H), 2.26 (s, 3H). HRMS (ESI): calcd. for m/z C$_{15}$H$_{19}$N$_7$O$_2$, [M+H]$^+$ 330.1673, found 330.1679. HPLC (100% MeOH): t$_R$=6.354 min, 96.85%.

Example 12

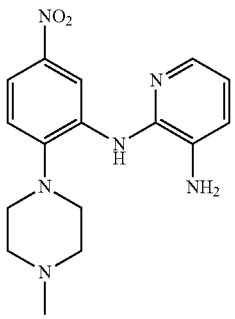 [SMILES: CN1CCN(c2ccc([N+](=O)[O-])cc2Nc2ncccc2N)CC1]

N$^2$-(2-(4-methylpiperazin-1-yl)-5-nitrophenyl)pyridin-2,3-diamine

Following the preparation method in Step 2 of Example 1, 4-chloroquinazoline was replaced by 2-chloropyridin-3-amine, to obtain a yellow solid. Yield 36.6%; m.p. 210° C.-212° C.; $^1$H NMR (300 MHz, DMSO-d$_6$) δ 9.06 (d, J=2.8 Hz, 1H), 7.77 (dd, J=8.8, 2.8 Hz, 1H), 7.68-7.59 (m, 2H), 7.28 (d, J=8.8 Hz, 1H), 7.77 (dd, J=7.6, 1.7 Hz, 1H), 6.75 (dd, J=7.6, 1.7 Hz, 1H), 4.94 (s, 2H), 2.90 (t, J=4.8 Hz, 4H), 2.54 (s, 4H), 2.25 (s, 3H). HRMS (ESI): calcd. for m/z C$_{15}$H$_{20}$N$_6$O$_2$, [M+H]$^+$ 329.1720, found 329.1722. HPLC (100% MeOH): t$_R$=4.151 min, 95.29%.

Example 13

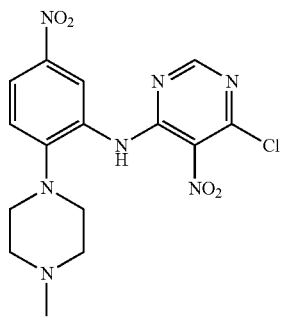 [SMILES: CN1CCN(c2ccc([N+](=O)[O-])cc2Nc2ncnc(Cl)c2[N+](=O)[O-])CC1]

6-chloro-N-(2-(4-methylpiperazin-1-yl)-5-nitrophenyl)-5-nitropyrimidine-4-amine

Following the preparation method in Step 2 of Example 1, 4-chloroquinazoline was replaced by 4,6-dichloro-5-nitropyrimidine, to obtain a yellow solid. Yield 53.2%; m.p.>250° C.; $^1$H NMR (300 MHz, DMSO-d$_6$) δ 10.20 (s, 1H), 8.85 (d, J=6.5 Hz, 1H), 8.16 (d, J=6.0 Hz, 2H), 7.62 (t, J=9.5 Hz, 1H), 3.52 (br s, 4H), 2.42 (br s, 4H), 2.22 (s, 3H). HRMS (ESI): calcd. for m/z C$_{15}$H$_{16}$ClN$_7$O$_4$, [M+H]$^+$ 394.0671, found 394.0674. HPLC (100% MeOH): t$_R$=6.083 min, 97.01%.

Example 14

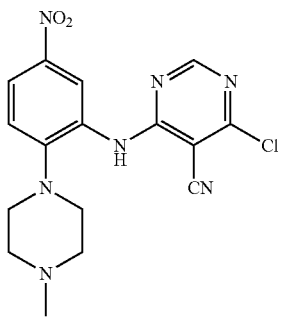 [SMILES: CN1CCN(c2ccc([N+](=O)[O-])cc2Nc2ncnc(Cl)c2C#N)CC1]

4-chloro-6-((2-(4-methylpiperazin-1-yl)-5-nitrophenyl)amino)pyrimidine-5-carbonitrile Following the preparation method in Step 2 of Example 1, 4-chloroquinazoline was replaced by 4,6-dichloropyrimidine-5-carbonitrile, to obtain a yellow solid. Yield 82.7%; m.p.>250° C.; $^1$H NMR (300 MHz, DMSO-d$_6$) δ 8.39 (d, J=2.8 Hz, 1H), 8.22 (s, 1H), 8.06 (dt, J=9.0, 3.1 Hz, 1H), 7.32 (d, J=8.9 Hz, 1H), 3.21 (br s, 4H), 2.84 (br s, 4H), 2.47 (s, 3H). HRMS (ESI): calcd. for m/z $C_{16}H_{16}ClN_7O_2$, [M+H]$^+$ 374.1133, found 374.1135. HPLC (100% MeOH): $t_R$=5.679 min, 98.83%.

Example 15

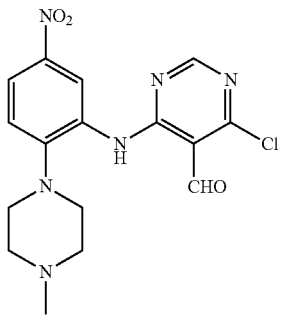 [SMILES: CN1CCN(c2ccc([N+](=O)[O-])cc2Nc2ncnc(Cl)c2C=O)CC1]

4-chloro-6-((2-(4-methylpiperazin-1-yl)-5-nitrophenyl)amino)pyrimidine-5-carbaldehyde Following the preparation method in Step 2 of Example 1, 4-chloroquinazoline was replaced by 4,6-dichloropyrimidine-5-carbaldehyde, to obtain a yellow solid. Yield 75.9%; m.p.>250° C.; $^1$H NMR (300 MHz, DMSO-d$_6$) δ 11.93 (s, 1H), 10.05 (s, 1H), 9.05 (d, J=2.6 Hz, 1H), 8.36 (d, J=1.6 Hz, 1H), 8.01 (dt, J=8.9, 2.3 Hz, 1H), 7.36 (dd, J=8.9, 1.8 Hz, 1H), 3.04-2.87 (m, 4H), 2.56 (t, J=4.6 Hz, 4H), 2.26 (s, 3H). HRMS (ESI): calcd. for m/z $C_{16}H_{17}ClN_6O_3$, [M+H]$^+$ 377.1130, found 377.1132. HPLC (100% MeOH): $t_R$=6.472 min, 98.17%.

Example 16

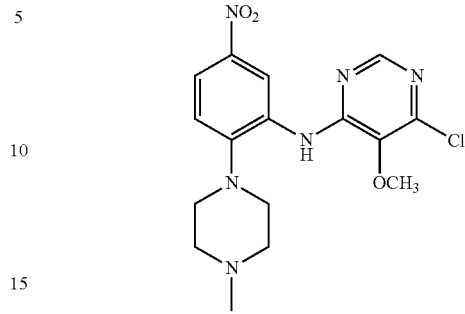

6-chloro-5-methoxyl-N-(2-(4-methylpiperazin-1-yl)-5-nitrophenyl)pyrimidine-4-amine Following the preparation method in Step 2 of Example 1, 4-chloroquinazoline was replaced by 4,6-dichloropyrimidine-5-carbaldehyde, to obtain a yellow solid. Yield 88.9%; m.p.>250° C.; $^1$H NMR (300 MHz, CDCl$_3$) δ 9.59 (d, J=2.7 Hz, 1H), 8.68 (s, 1H), 8.45 (d, J=3.5 Hz, 1H), 7.96 (dd, J=8.8, 2.7 Hz, 1H), 7.26 (d, J=2.1 Hz, 1H), 4.06 (s, 1H), 3.06-2.97 (m, 4H), 2.67 (br s, 4H), 2.42 (s, 3H). HRMS (ESI): calcd. for m/z $C_{16}H_{19}ClN_6O_3$, [M+H]$^+$ 379.1280, found 379.1286. HPLC (100% MeOH): $t_R$=6.614 min, 95.68%.

Example 17

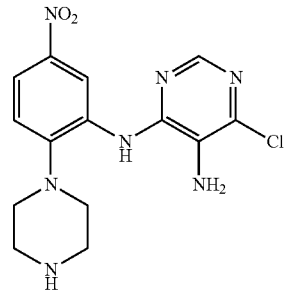 [SMILES: Nc1c(Cl)ncnc1Nc1cc([N+](=O)[O-])ccc1N1CCNCC1]

6-chloro-N$^4$-(5-nitro-2-(piperazin-1-yl)phenyl)pyrimidine-4,5-diamine

Step 1: Preparation of 6-chloro-N$^4$-(2-fluoro-5-nitrophenyl)pyrimidine-4,5-diamine 2-fluoro-5-nitrophenylamine (2 g, 12.8 mmol) was dissolved in isopropanol (50 mL), and then 2 mL of concentrated sulfuric acid and 4,6-dichloro-5-aminopyrimidine (25.6 mmol) were added. The mixture was refluxed for 18 hrs. The reaction mixture was spun until a solid precipitated, cooled until a solid precipitated, and filtered under suction. The filter cake was washed with isopropanol (5 mL×3), and dried to obtain a yellow solid. Yield 59.5%; m.p. 209° C.-211° C.; $^1$H-NMR (300 MHz, DMSO-d$_6$) δ 9.14 (s, 1H), 8.65-8.62 (m, 1H), 8.06-8.03 (m, 1H), 7.86 (s, 1H), 7.58-7.54 (m, 1H), 5.54 (s, 2H). m/z (EI-MS): 284.1 [M]$^+$.

Step 2: Preparation of a Target Product: 6-chloro-$N^4$-(5-nitro-2-(piperazin-1-yl)phenyl)pyrimidine-4,5-diamine 6-chloro-$N^4$-(2-fluoro-5-nitrophenyl)pyrimidine-4,5-diamine (0.35 mmol) was dissolved in 5 mL of DMF, and then DIPEA (1.5 mmol) and t-butyl piperazine-1-carboxylate (1.0 mmol) were added. The mixture was kept at 50° C. for 5 hrs. The reaction mixture was diluted with ethyl acetate (20 mL), washed with water (10 mL×3), and then washed with a saturated sodium chloride solution. The organic layer was dried over anhydrous sodium sulfate, and spin-dried, to obtain a crude product, which was dissolved in dichloromethane (20 mL), and then trifluoroacetic acid (2 mL) was added dropwise. The mixture was kept at room temperature for 2 hrs. The reaction mixture was neutralized with a saturated sodium bicarbonate solution until no bubbles were generated, extracted with ethyl acetate, and spin-dried to obtain a yellow solid, which was washed with $CH_3CN$ and dried. Yield 65.6%; m.p.>250° C.; $^1H$ NMR (300 MHz, DMSO-$d_6$) δ 9.09 (br s, 1H), 8.60 (d, J=2.7 Hz, 1H), 8.33 (s, 1H), 7.89 (dd, J=8.9, 2.7 Hz, 1H), 7.83 (s, 1H), 7.23 (d, J=8.9 Hz, 1H), 5.55 (s, 2H), 3.21 (s, 4H), 3.42 (t, J=6.0 Hz, 4H). HRMS (ESI): calcd. for m/z $C_{14}H_{17}ClN_7O_2$, [M+H]$^+$ 350.1127, found 350.1131. HPLC (100% MeOH): $t_R$=4.069 min, 96.17%.

Example 18

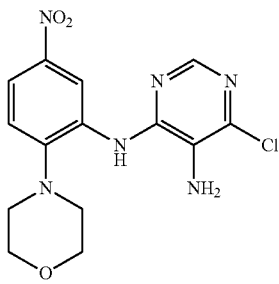 [SMILES: Nc1c(Cl)ncnc1Nc1cc([N+](=O)[O-])ccc1N1CCOCC1]

6-chloro-$N^4$-(2-morpholino-5-nitrophenyl)pyrimidine-4,5-diamine 6-chloro-$N^4$-(2-fluoro-5-nitrophenyl)pyrimidine-4,5-diamine (0.35 mmol) was dissolved in 5 mL of DMF, and then DIPEA (1.5 mmol) and morpholine (1.0 mmol) were added. The mixture was kept at 50° C. for 5 hrs. The reaction mixture was diluted with ethyl acetate (20 mL), washed with water (10 mL×3), and then washed with a saturated sodium chloride solution. The organic layer was dried over anhydrous sodium sulfate, and spin-dried to obtain a crude product, which was washed with $CH_3CN$ and dried. Yield 71.4%; m.p.>250° C.; $^1H$ NMR (300 MHz, DMSO-$d_6$) δ 8.70 (s, 1H), 8.32 (s, 1H), 8.08-7.86 (m, 2H), 7.29 (d, J=9.0 Hz, 1H), 5.46 (s, 2H), 3.73 (s, 4H), 2.99 (s, 4H). HRMS (ESI): calcd. for m/z $C_{14}H_{16}ClN_6O_3$, [M+H]$^+$ 351.0967, found 351.0967. HPLC (100% MeOH): $t_R$=7.041 min, 98.84%.

Example 19

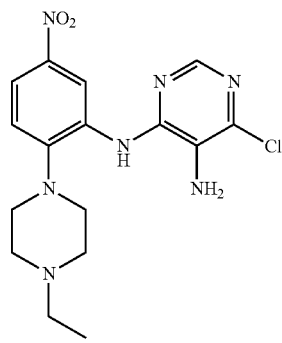 [SMILES: CCN1CCN(c2ccc([N+](=O)[O-])cc2Nc2ncnc(Cl)c2N)CC1]

6-chloro-$N^4$-(2-(4-ethylpiperazin-1-yl)-5-nitrophenyl)pyrimidine-4,5-diamine

Following the preparation method in Step 2 of Example 18, morpholine was replaced by 1-ethylpiperazine to obtain a yellow solid. Yield 46.7%; m.p. 185° C.-187° C.; $^1H$ NMR (300 MHz, CDCl$_3$) δ 9.34 (s, 1H), 8.32 (s, 1H), 8.18 (s, 1H), 7.93 (dt, J=8.8, 2.7 Hz, 1H), 7.27-7.20 (m, 1H), 3.60 (s, 2H), 3.08-2.93 (m, 4H), 2.70 (s, 4H), 2.53 (qd, J=7.2, 2.7 Hz, 2H), 1.16 (td, J=7.3, 2.7 Hz, 3H). HRMS (ESI): calcd. for m/z $C_{16}H_{21}ClN_7O_2$, [M+H]$^+$ 378.1440, found 348.1449. HPLC (100% MeOH): $t_R$=4.542 min, 97.65%.

Example 20

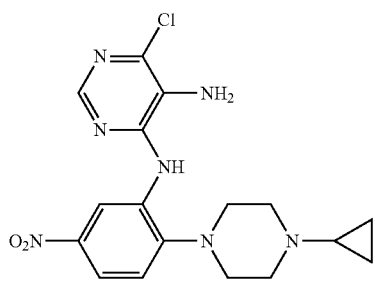 [SMILES: Nc1c(Cl)ncnc1Nc1cc([N+](=O)[O-])ccc1N1CCN(C2CC2)CC1]

6-chloro-$N^4$-(2-(4-cyclopropylpiperazin-1-yl)-5-nitrophenyl)pyrimidine-4,5-diamine Following the preparation method in Step 2 of Example 18, morpholine was replaced by 1-cyclopropylpiperazine to obtain a yellow solid. Yield 58.9%; m.p. 223° C.-225° C.; $^1H$ NMR (300 MHz, CDCl$_3$) δ 9.35 (d, J=2.7 Hz, 1H), 8.32 (s, 1H), 8.21 (s, 1H), 7.92 (dd, J=8.7, 2.7 Hz, 1H), 3.62 (s, 2H), 2.96 (t, J=4.7 Hz, 4H), 2.87 (s, 4H), 1.78-1.71 (m, 1H), 0.56-0.51 (m, 2H), 0.49-0.44 (m, 2H). HRMS (ESI): calcd. for m/z $C_{17}H_{21}ClN_7O_2$, [M+H]$^+$ 390.1440, found 390.1446. HPLC (100% MeOH): $t_R$=4.811 min, 99.31%.

17

Example 21

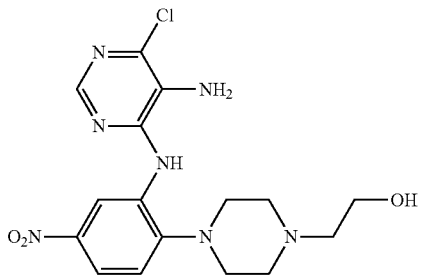 [SMILES: Nc1c(Cl)ncnc1Nc1cc([N+](=O)[O-])ccc1N1CCN(CCO)CC1]

2-(4-(2-((5-amino-6-chloropyrimidin-4-yl)amino)-4-nitrophenyl) piperazin-1-yl)ethan-1-ol Following the preparation method in Step 2 of Example 18, morpholine was replaced by 2-(piperazin-1-yl)ethan-1-ol to obtain a yellow solid. Yield 76.4%; m.p. 202° C.-204° C.; $^1$H NMR (300 MHz, CDCl$_3$) δ 9.33 (s, 1H), 8.32 (s, 1H), 8.15 (s, 1H), 7.94 (d, J=8.7 Hz, 1H), 7.27 (s, 1H), 3.70 (s, 2H), 3.64-2.46 (m, 2H), 3.02 (s, 4H), 2.78 (s, 4H), 2.68 (s, 2H), 2.57 (s, 1H). HRMS (ESI): calcd. for m/z C$_{16}$H$_{20}$ClN$_7$O$_3$, [M+H]$^+$ 394.1389, found 394.1387. HPLC (100% MeOH): t$_R$=7.347 min, 96.12%.

Example 22

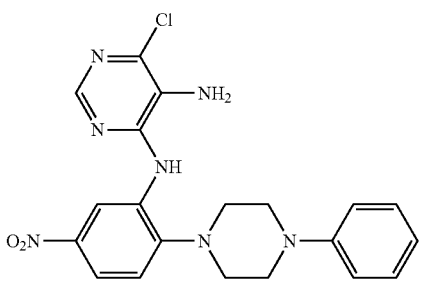 [SMILES: Nc1c(Cl)ncnc1Nc1cc([N+](=O)[O-])ccc1N1CCN(c2ccccc2)CC1]

6-chloro-N$^4$-(5-nitro-2-(4-phenylpiperazin-1-yl)phenyl)pyrimidine-4,5-diamine

Following the preparation method in Step 2 of Example 18, morpholine was replaced by 1-phenylpiperazine to obtain a yellow solid. Yield 76.4%; m.p.>250° C.; $^1$H NMR (300 MHz, CDCl$_3$) δ 9.39 (d, J=2.7 Hz, 1H), 8.35 (s, 1H), 8.25 (s, 1H), 7.97 (dd, J=8.9, 2.6 Hz, 1H), 7.39-7.28 (m, 3H), 7.06-6.90 (m, 3H), 3.54 (s, 2H), 3.44 (t, J=4.9 Hz, 4H), 3.16 (t, J=4.9 Hz, 4H). HRMS (ESI): calcd. for m/z C$_{20}$H$_{20}$ClN$_7$O$_2$, [M+H]$^+$ 426.1440, found 426.1449. HPLC (100% MeOH): t$_R$=4.905 min, 95.52%.

18

Example 23

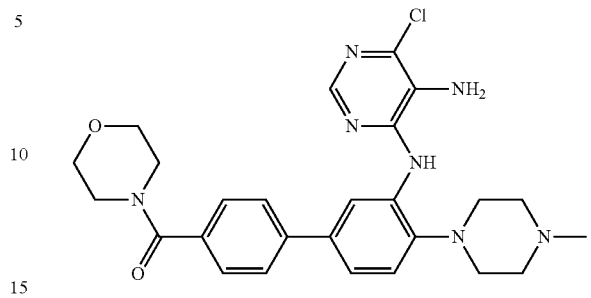

(3"-((5-amino-6-chloropyrimidin-4-yl)amino)-4-(4-methylpiperazin-1-yl)-[1,1'-biphenyl]-4-yl)(morpholino)methanone Step 1: Preparation of methyl 4'-fluoro-3'-nitro-[1,1'-biphenylyl]-4-carboxylate 4-bromo-1-fluoro-2-nitrobenzene (5.0 g, 22.8 mmol) was dissolved in 1,4-dioxane (100 mL), and the solution was added to (4-(methoxylcarbonyl)phenyl)boric acid (27.3 mmol). Cesium carbonate (14.8 g, 45.6 mmol) and a catalytic amount of Pd(PPh$_3$)$_2$Cl$_2$ were added. The mixture was refluxed for 20 hrs under the protection of N$_2$. The reaction mixture was filtered to remove the catalyst and cesium carbonate, and spin-dried to obtain a crude product, which was purified by column chromatography (dichloromethane:methanol=50:1) to obtain a white solid. Yield 69.9%; m.p. 145° C.-147° C. $^1$H NMR (300 MHz, CDCl$_3$) δ 8.31-8.13 (m, 3H), 7.88-7.59 (m, 1H), 8.28 (m, 3H), 7.42-7.36 (m, 1H), 3.94 (s, 3H). m/z (EI-MS): 276.2 [M]$^+$.

Step 2: Preparation of methyl 4'-(4-methylpiperazin-1-yl)-3'-nitro-[1,1'-biphenyl]-4-carboxylate Following the preparation method in Step 1 of Example 1, 2-F-5-nitrophenylamine was replaced by methyl 4'-fluoro-3'-nitro-[1,1'-biphenylyl]-4-carboxylate to obtain a yellow solid. Yield 93.8%; m.p. 130° C.-132° C.; $^1$H NMR (300 MHz, CDCl$_3$) δ 8.11 (dd, J=6.8, 1.9 Hz, 2H), 8.05 (d, J=2.3 Hz, 1H), 7.44 (dd, J=8.6, 2.3 Hz, 1H), 7.68-7.61 (m, 2H), 7.21 (d, J=8.6 Hz, 1H), 3.95 (s, 3H), 3.16 (t, J=4.7 Hz, 4H), 2.61 (t, J=4.7 Hz, 4H), 2.38 (s, 3H). m/z (EI-MS): 356.2 [M]$^+$.

Step 3: Preparation of methyl 3'-amino-4'-(4-methylpiperazin-1-yl)-[1,1'-biphenylyl]-4-carboxylate Methyl 4'-(4-methylpiperazin-1-yl)-3'-nitro-[1,1'-biphenyl]-4-carboxylate (12.9 mmol) was dissolved in methanol, and a catalytic amount of Pd/C was added. The mixture was stirred under the protection of H$_2$ at room temperature for 2 hrs. The reaction mixture was filtered and spin-dried to obtain a gray white solid. Yield 90.4%; m.p. 229° C.-231° C.; $^1$H NMR (300 MHz, CDCl$_3$) δ 8.07 (d, J=8.5 Hz, 2H), 7.61 ((dd, J=6.7, 1.8 Hz, 2H), 7.09 (d, J=8.5 Hz, 1H), 7.03

(m, 2H), 4.06 (s, 2H), 3.93 (s, 3H), 3.01 (t, J=4.4 Hz, 4H), 2.61 (s, 4H), 2.38 (s, 3H). m/z (EI-MS): 326.2 [M]+.

Step 4: Preparation of methyl 3'-((5-amino-6-chloropyrimidin-4-yl)amino)-4'-(4-methylpiperazin-1-yl)-[1,1'-biphenylyl]-4-carboxylate 4,6-dichloro-5-nitropyrimidine (7.40 g, 38.11 mmol) was dissolved in tetrahydrofuran (50 mL), and then triethyl amine (3.17 mL, 22.86 mmol) was added. A solution of methyl 3'-amino-4'-(4-methylpiperazin-1-yl)-[1,1'-biphenylyl]-4-carboxylate in tetrahydrofuran was added dropwise at 0° C., heated to room temperature and stirred for 6 hrs. The reaction mixture was spin-dried to obtain a crude product, which was separated by silica gel column chromatography (dichloromethane:methanol=100:1) to obtain a yellow solid. The yellow solid was dissolved in ethyl acetate, and then $SnCl_2$ (3× equiv.) was added. and. The mixture was refluxed for 4 hrs, adjusted with a saturated sodium bicarbonate solution until no bubbles were generated, and filtered under suction. The filter cake was washed with ethyl acetate (4×20 mL), and the filtrate was extracted with ethyl acetate (4×50 mL). The organic layers were combined, dried, and spin-dried to obtain a gray white solid. Yield 45.7%; m.p. 209° C.-210° C.; $^1$H NMR (300 MHz, DMSO-$d_6$) δ 8.53-8.42 (m, 1H), 8.23 (s, 1H), 7.96-7.90 (m, 3H), 7.70 (d, J=8.4 Hz, 2H), 7.46-7.42 (m, 1H), 7.26 (d, J=8.3 Hz, 1H), 5.36 (s, 2H), 3.93 (s, 3H), 3.57 (t, J=4.6 Hz, 4H), 2.87 (t, J=4.7 Hz, 4H), 2.24 (s, 3H). m/z (EI-MS): 453.2 [M]+.

Step 5: Preparation of 3'-((5-amino-6-chloropyrimidin-4-yl)amino)-4'-(4-methylpiperazin-1-yl)-[1,1'-biphenyl]-4-carboxylic Acid Methyl 3'-((5-amino-6-chloropyrimidin-4-yl)amino)-4'-(4-methylpiperazin-1-yl)-[1,1'-biphenylyl]-4-carboxylate was dissolved in methanol (50 mL), and then lithium hydroxide (1 M, 10 mL) was added. The mixture was stirred at room temperature for 2 hrs, adjusted with 1M HCl until a large amount of solid precipitated, filtered under suction, and dried, to obtain a white solid. Yield 80.0%; m p.>250° C.; $^1$H NMR (300 MHz, DMSO-$d_6$) δ 8.33-8.28 (m, 2H), 8.10 (s, 1H), 7.86-7.84 (m, 2H), 7.80 (s, 1H), 7.13-7.11 (m, 2H), 6.88 (d, J=2.0 Hz, 1H), 5.42 (s, 2H), 3.54 (t, J=4.6 Hz, 4H), 2.35 (t, J=4.7 Hz, 4H), 2.24 (s, 3H). m/z (EI-MS): 439.3 [M]+.

Step 6: Preparation of a Target Product: (3"-((5-amino-6-chloropyrimidin-4-yl)amino)-4"-(4-methylpiperazin-1-yl)-[1,1'-biphenyl]-4-yl)(morpholino)methanone Methyl 3'-((5-amino-6-chloropyrimidin-4-yl)amino)-4'-(4-methylpiperazin-1-yl)-[1,1'-biphenylyl]-4-carboxylate (0.1 g, 0.26 mmol) was dissolved in DMF (10 mL), and then then condensing agent BOP (0.22 g, 0.49 mmol) and triethyl amine (0.12 mL, 0.88 mmol) were added. The mixture was stirred at room temperature for 30 min, and then, morpholine (0.39 mmol) was added. The mixture was stirred at room temperature for 12 hrs. Then, the reaction mixture was poured into water (50 mL), and extracted with ethyl acetate (3×50 mL). The organic layer was dried over anhydrous sodium sulfate, filtered, spin-dried, and separated and purified by column chromatography (dichloromethane:methanol=50:1) to obtain a white solid. Yield 67.8%; m.p. 225° C.-227° C.; $^1$H NMR (300 MHz, DMSO-$d_6$) δ 8.45 (d, J=13.6 Hz, 2H), 7.90 (s, 1H), 7.69 (d, J=7.9 Hz, 2H), 7.49 (d, J=7.7 Hz, 2H), 7.42 (d, J=8.4 Hz, 1H), 7.27 (d, J=8.2 Hz, 1H), 5.39 (s, 2H), 3.61 (s, 4H), 3.35 (s, 4H), 2.98-2.90 (s, 4H), 2.64 (s, 4H), 2.34 (s, 3H). HRMS (ESI): calcd. for m/z $C_{26}H_{30}ClN_7O_2$, [M+H]+ 508.2222, found 508.2223. HPLC (80% methanol in water): $t_R$=3.507 min, 98.81%.

Example 24

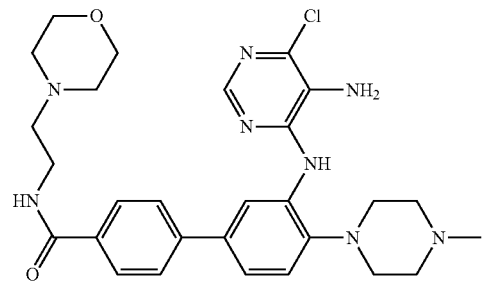 [SMILES: CN1CCN(c2ccc(-c3ccc(C(=O)NCCN4CCOCC4)cc3)cc2Nc2ncnc(Cl)c2N)CC1]

3"-((5-amino-6-chloropyrimidin-4-yl)amino)-4"-(4-methylpiperazin-1-yl)-N-(2-morpholinoethyl)-[1,1'-biphenyl]-zole-4-carboxamide Following the preparation method in Step 6 of Example 23, morpholine was replaced by 2-morpholinoethyl-1-amine to obtain a white solid. Yield 55.8%; m.p. 230° C.-232° C.; $^1$H NMR (300 MHz, DMSO-$d_6$) δ 8.45 (s, 1H), 8.27-8.22 (m, 2H), 7.92-7.90 (m, 3H), 7.71 (d, J=8.0 Hz, 2H), 7.45 (d, J=8.2 Hz, 1H), 7.26 (d, J=8.4 Hz, 1H), 5.39 (s, 2H), 3.58 (s, 4H), 3.40-3.34 (m, 4H), 2.90 (s, 4H), 2.61 (s, 4H), 2.44 (s, 4H), 2.31 (s, 3H). HRMS (ESI): calcd. for m/z $C_{28}H_{35}ClN_8O_2$, [M+H]+ 551.2644, found 551.2639. HPLC (80% methanol in water): $t_R$=3.196 min, 98.91%.

Example 25

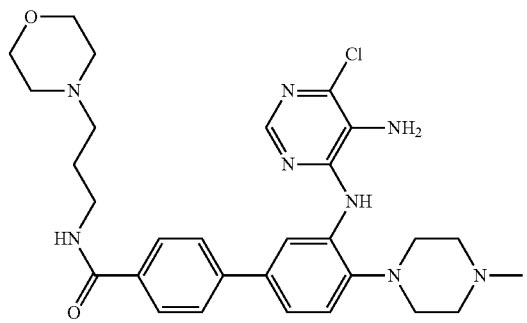 [SMILES: CN1CCN(c2ccc(-c3ccc(C(=O)NCCCN4CCOCC4)cc3)cc2Nc2ncnc(Cl)c2N)CC1]

3"-((5-amino-6-chloropyrimidin-4-yl)amino)-4"-(4-methylpiperazin-1-yl)-N-(3-morpholinopropyl)-[1,1'-biphenyl]-zole-4-carboxamide Following the preparation method in Step 6 of Example 23, morpholine was replaced by 3-morpholinopropyl-1-amine to obtain a white solid. Yield 48.9%; m.p. 210° C.-212° C.; $^1$H NMR (300 MHz, DMSO-$d_6$) δ 8.53-8.42 (m, 1H), 8.28 (d, J=2.8 Hz, 1H), 8.23 (s, 1H), 7.96-7.90 (m, 3H), 7.70 (d, J=8.4 Hz, 2H), 7.46-7.42 (m, 1H), 7.26 (d, J=8.3 Hz, 1H), 5.36 (s, 2H), 3.57 (t, J=4.6 Hz, 4H), 3.32-3.30 (m, 2H), 2.87 (t, J=4.7 Hz, 4H), 2.51-2.49 (m, 4H), 2.37-2.32 (m, 6H), 2.24 (s, 3H). HRMS (ESI): calcd. for m/z C$_{29}$H$_{31}$ClN$_8$O$_2$, [M+H]$^+$ 565.2801, found 565.2801. HPLC (80% methanol in water): t$_R$=3.974 min, 96.00%.

Example 26

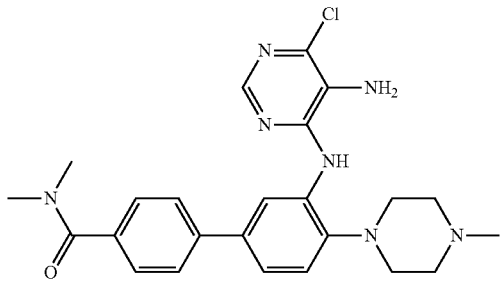

3"-((5-amino-6-chloropyrimidin-4-yl)amino)-N,N-dimethyl-4"-(4-methylpiperazin-1-yl)-[1,1'-biphenyl]-4-carboxamide Following the preparation method in Step 6 of Example 23, morpholine was replaced by dimethyl amine to obtain a white solid. Yield 78.9%; m.p. 142° C.-145° C.; $^1$H NMR (300 MHz, DMSO-d$_6$) δ 8.24 (s, 1H), 7.70 (s, 2H), 7.56-7.41 (m, 5H), 7.02 (s, 1H), 5.57 (s, 2H), 3.19-3.97 (m, 10H), 2.75 (s, 4H), 2.43 (s, 3H). HRMS (ESI): calcd. for m/z C$_{24}$H$_{28}$ClN$_7$O, [M+H]$^+$ 466.2117, found 466.2121. HPLC (80% methanol in water): t$_R$=2.489 min, 95.56%.

Example 27

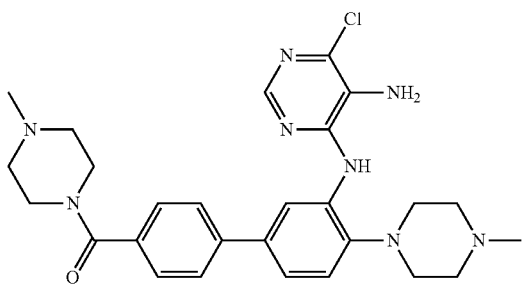

(3"-((5-amino-6-chloropyrimidin-4-yl)amino)-4"-(4-methylpiperazin-1-yl)-[1,1'-biphenyl]-4-yl)(4-methylpiperazin-1-yl) methanone Following the preparation method in Step 6 of Example 23, morpholine was replaced by 1-methylpiperazine to obtain a white solid. Yield 56.9%; m.p.>250° C.; $^1$H NMR (300 MHz, DMSO-d$_6$) δ 8.54 (d, J=13.6 Hz, 2H), 7.90 (s, 1H), 7.68 (d, J=7.9 Hz, 2H), 7.45 (d, J=7.7 Hz, 2H), 7.39 (d, J=8.4 Hz, 1H), 7.27 (d, J=8.1 Hz, 1H), 5.35 (s, 2H), 3.61 (s, 4H), 3.35 (s, 4H), 2.98-2.90 (s, 4H), 2.64 (s, 4H), 2.34 (s, 3H), 2.30 (s, 3H). HRMS (ESI): calcd. for m/z C$_{27}$H$_{33}$ClN$_8$O, [M+H]$^+$ 521.2937, found 521.2937. HPLC (80% methanol in water): t$_R$=4.094 min, 98.10%.

Example 28

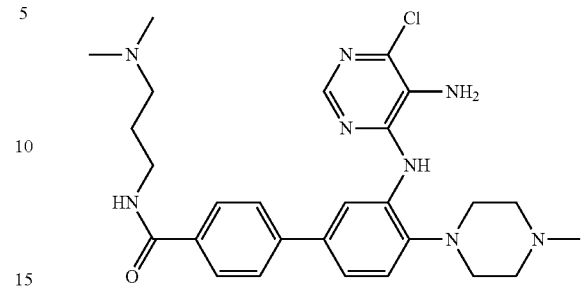

3"-((5-amino-6-chloropyrimidin-4-yl)amino)-N-(3-(dimethylamino)propyl)-4"-(4-methylpiperazin-1-yl)-[1,1'-biphenyl]-4-carboxamide Following the preparation method in Step 6 of Example 23, morpholine was replaced by N$^1$,N$^1$-dimethyl-1,3-diamine to obtain a white solid. Yield 38.9%; m.p. 232° C.-234° C.; $^1$H NMR (300 MHz, DMSO-d$_6$) δ 8.66 (s, 1H), 8.26-8.20 (m, 2H), 7.93-7.88 (m, 3H), 7.73 (d, J=9.8 Hz, 2H), 7.47 (s, 1H), 7.29 (s, 1H), 5.44 (s, 2H), 3.08-2.90 (m, 8H), 2.77 (s, 6H), 2.50 (s, 4H), 1.90 (s, 4H), 1.28-1.23 (m, 2H). HRMS (ESI): calcd. for m/z C$_{27}$H$_{36}$ClN$_8$O, [M+H]$^+$ 523.2695, found 523.2695. HPLC (90% methanol in water): t$_R$=3.409 min, 98.88%.

Example 29

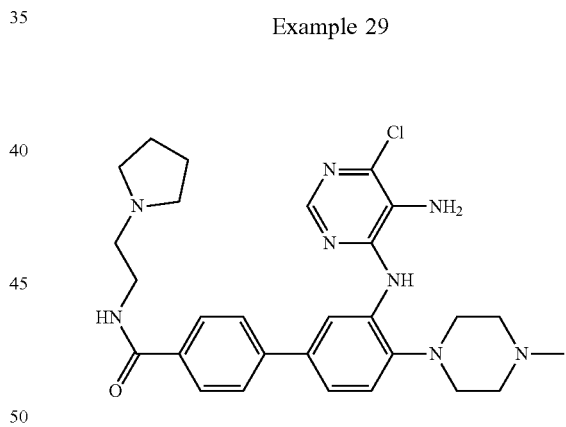

3"-((5-amino-6-chloropyrimidin-4-yl)amino)-4"-(4-methylpiperazin-1-yl)-N-(2-(pyrrolidin-1-yl)ethyl)-[11,1'-biphenylyl]-4-carboxamide Following the preparation method in Step 6 of Example 23, morpholine was replaced by 2-(pyrimidin-1-yl)ethan-1-amine to obtain a white solid. Yield 37.8%; m.p. 241° C.-243° C.; $^1$H NMR (300 MHz, DMSO-d$_6$) δ 8.67 (s, 1H), 8.25-8.22 (m, 2H), 7.93-7.88 (m, 3H), 7.73 (d, J=9.8 Hz, 2H), 7.47 (s, 1H), 7.29 (s, 1H), 5.64 (s, 2H), 3.64-3.62 (m, 2H), 3.38-3.34 (m, 6H), 3.12 (s, 4H), 2.54 (s, 2H), 2.48 (s, 2H), 2.36 (s, 3H), 1.93 (s, 4H). HRMS (ESI): calcd. for m/z C$_{28}$H$_{35}$ClN$_8$O, [M+H]$^+$ 535.2695, found 535.2690. HPLC (100% methanol): t$_R$=7.516 min, 98.64%.

Example 30

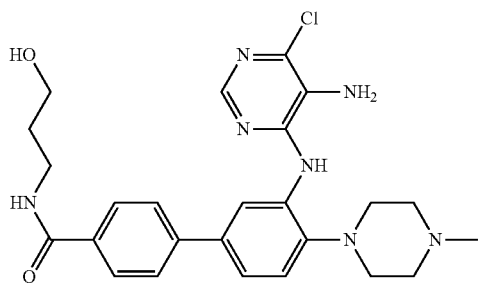 [SMILES: CN1CCN(c2ccc(-c3ccc(C(=O)NCCCO)cc3)cc2Nc2ncnc(Cl)c2N)CC1]

3"-((5-amino-6-chloropyrimidin-4-yl)amino)-N-(3-hydroxylpropyl)-4"-(4-methylpiperazin-1-yl)-[1,1'-biphenyl]-zole-4-carboxamide Following the preparation method in Step 6 of Example 23, morpholine was replaced by 3-aminopropan-1-ol to obtain a white solid. Yield 50.7%; m.p. 189° C.-192° C.; $^1$H NMR (300 MHz, DMSO-$d_6$) δ 8.45 (d, J=7.2 Hz, 1H), 8.30-8.19 (m, 2H), 7.93-7.90 (m, 3H), 7.72-7.69 (m, 2H), 7.43 (d, J=8.4 Hz, 1H), 7.26 (d, J=8.4 Hz, 1H), 5.37 (s, 2H), 4.49-4.47 (m, 1H), 3.51-3.45 (m, 4H), 2.88 (s, 4H), 2.52-2.50 (m, 4H), 2.27 (s, 3H), 1.74-1.64 (m, 2H). HRMS (ESI): calcd. for m/z $C_{25}H_{31}ClN_7O_2$, $[M+H]^+$ 496.2222, found 496.2217. HPLC (80% methanol in water): $t_R$=2.384 min, 96.63%

Example 31

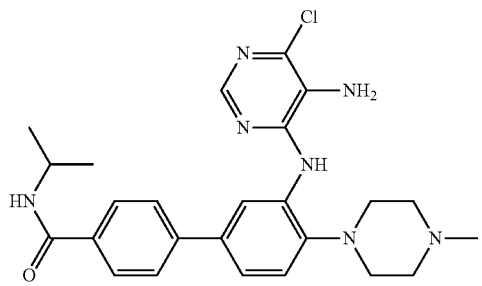 [SMILES: CC(C)NC(=O)c1ccc(-c2ccc(N3CCN(C)CC3)c(Nc3ncnc(Cl)c3N)c2)cc1]

3"-((5-amino-6-chloropyrimidin-4-yl)amino)-N-isopropyl-4"-(4-methylpiperazin-1-yl)-[1,1'-biphenyl]-4-carboxamide Following the preparation method in Step 6 of Example 23, morpholine was replaced by propan-2-amine to obtain a white solid. Yield 63.8%; m.p. 184° C.-186° C.; $^1$H NMR (300 MHz, DMSO-$d_6$) δ 8.27-8.22 (m, 2H), 7.91 (d, J=8.1 Hz, 2H), 7.71 (s, 1H), 7.59 (d, J=8.0 Hz, 2H), 7.43-7.30 (m, 2H), 7.04 (d, J=8.2 Hz, 1H), 5.54 (s, 2H), 4.12 (s, 1H), 3.33 (s, 4H), 3.07 (s, 4H), 2.82 (s, 3H), 1.18 (s, 6H). HRMS (ESI): calcd. for m/z $C_{25}H_{30}ClN_7O$, $[M+H]^+$ 480.2279, found 480.2276. HPLC (80% methanol in water): $t_R$=3.601 min, 96.77%.

Example 32

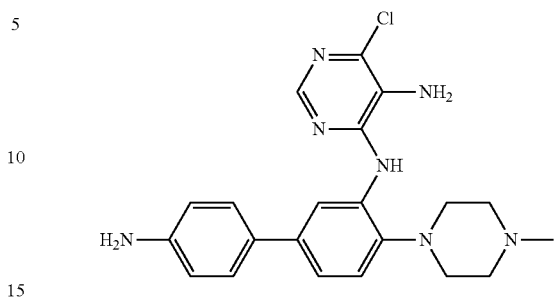

Step 1: Preparation of 1-(4-bromo-2-nitrophenyl)-4-methylpiperazine 2-fluoro-5-bromonitrobenzene (10.0 g, 45.4 mmol) was dissolved in DMF (20 mL), and DIPEA (9.5 mL, 54.6 mmol) and 1-methylpiperazine (6.6 mL, 54.6 mmol) were added. The mixture was stirred at 80° C. for 8 hrs. The reaction mixture was poured into 100 mL of water, and extracted with ethyl acetate (3×100 mL). The organic layer was dried over anhydrous sodium sulfate, filtered, and spin-dried to obtain a yellow solid. Yield 95.0%; $^1$H NMR (300 MHz, CDCl$_3$) δ 7.91 (d, J=2.4 Hz, 1H), 7.57 (dd, J=8.8, 2.4 Hz, 1H), 7.04 (d, J=8.8 Hz, 1H), 3.08 (t, J=4.9 Hz, 4H), 2.58 (t, J=4.9 Hz, 4H), 2.37 (s, 3H). m/z (EI-MS): 300.0 $[M]^+$.

Step 2: Preparation of 5-bromo-2-(4-methylpiperazin-1-yl)phenylamine 1-(4-bromo-2-nitrophenyl)-4-methylpiperazine (12.9 g, 43.14 mmol) was dissolved in methanol (100 mL), and a catalytic amount of Pd/C was added. The mixture was kept under the protection of hydrogen at room temperature for 2 hrs, filtered, and spin-dried to obtain a yellow solid. Yield 89%; m.p. 165-167° C.; $^1$H NMR (300 MHz, CDCl$_3$) δ6.84-6.79 (m, 3H), 4.01 (s, 2H), 2.89 (s, 4H), 2.45 (s, 4H), 2.35 (s, 3H). m/z (EI-MS): 270.0 $[M]^+$.

Step 3: Preparation of $N^4$-(5-bromo-2-(4-methylpiperazin-1-yl)phenyl)-6-chloropyrimidine-4,5-diamine Following the preparation method in Step 4 of Example 23, methyl 3'-amino-4'-(4-methylpiperazin-1-yl)-[1,1'-biphenylyl]-4-carboxylate was replaced by 5-bromo-2-(4-methylpiperazin-1-yl)phenylamine, to obtain a white solid. Yield 72.5%; m.p. 196-198° C.; $^1$H NMR (300 MHz, CDCl$_3$) δ 8.26 (s, 1H), 6.84-6.79 (m, 3H), 8.10 (s, 1H), 5.34 (s, 2H), 2.89 (s, 4H), 2.45 (s, 4H), 2.34 (s, 3H). m/z (EI-MS): 397.1 $[M]^+$.

Step 4: Preparation of a Target Product $N^4$-(4'-amino-4-(4-methylpiperazin-1-yl)-[1,1'-biphenyl]-3-yl)-6-chloropyrimidine-e-4,5-diamine $N^4$-(5-bromo-2-(4-methylpiperazin-1-yl)phenyl)-6-chloropyrimidine-4,5-diamine (1.0 g, 2.5 mmol) was dissolved in 1,4-dioxane (30 mL), and then 4-aminophenylboric acid (2.9 mmol), cesium carbonate (1.6 g, 5 mmol), and a catalytic amount of Pd(PPh$_3$)$_2$Cl$_2$ were added. The mixture was refluxed under the protection of nitrogen for 20 hrs, and filtered to remove the catalyst and cesium carbonate. The filtrate was spin-dried, and separated and purified by column chromatography (dichloromethane:methanol=50:1) to obtain a light yellow solid. Yield 67.3%; m.p. 212° C.-214° C.; $^1$H NMR (300 MHz, DMSO-d$_6$) δ 8.16 (d, J=8.1 Hz, 2H), 7.90 (s, 1H), 7.65 (d, J=8.2 Hz, 2H), 7.55 (d, J=8.4 Hz, 2H), 7.37 (d, J=8.4 Hz, 1H), 7.26 (d, J=8.2 Hz, 1H), 5.43 (s, 2H), 5.15 (s, 2H), 3.17 (s, 4H), 3.06 (s, 4H), 2.75 (s, 3H). m/z (EI-MS): 410.2 [M]$^+$. HPLC (100% methanol): $t_R$=7.489 min, 95.67%.

Example 33

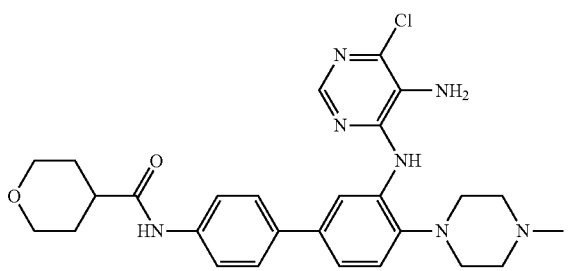 [SMILES: CN1CCN(c2ccc(-c3ccc(NC(=O)C4CCOCC4)cc3)cc2Nc2ncnc(Cl)c2N)CC1]

N-(3"-((5-amino-6-chloropyrimidin-4-yl)amino)-4"-(4-methylpiperazin-1-yl)-[1,1'-biphenyl]-4-yl)tetra-hydro-2H-pyran-4-carboxamide Tetrahydro-2H-pyran-4-carboxylic acid (0.35 mmol) was dissolved in DMF (8 mL), and then BOP (0.26 g, 0.59 mmol) and triethyl amine (0.1 mL, 0.88 mmol) were added. The mixture was stirred at room temperature for 30 min, and then the title compound (0.12 g, 0.29 mmol) of Example 32 was added. The mixture was stirred at room temperature for 12 h. The reaction mixture was poured into 50 mL of water, extracted with ethyl acetate (3×50 mL), dried over anhydrous sodium sulfate, filtered, spin-dried, and separated and purified by silica gel column chromatography (dichloromethane:methanol=50:1) to obtain a white solid. Yield 78.5%; m.p. 207° C.-209° C.; $^1$H NMR (300 MHz, DMSO-d$_6$) δ 9.99 (s, 1H), 8.21 (s, 1H), 7.90 (s, 1H), 7.68 (dd, J=8.4, 5.9 Hz, 3H), 7.57-7.54 (m, 2H), 7.38-7.35 (m, 1H), 5.38 (s, 2H), 3.94-3.90 (m, 3H), 3.37-3.35 (m, 2H), 2.92 (s, 4H), 2.76 (s, 4H), 2.43 (s, 3H), 1.72-1.69 (m, 4H). HRMS (ESI): calcd. for m/z C$_{27}$H$_{32}$ClN$_7$O$_2$, [M+H]$^+$ 522.2379, found 522.2377. HPLC (80% methanol in water): $t_R$=4.280 min, 95.50%.

Example 34

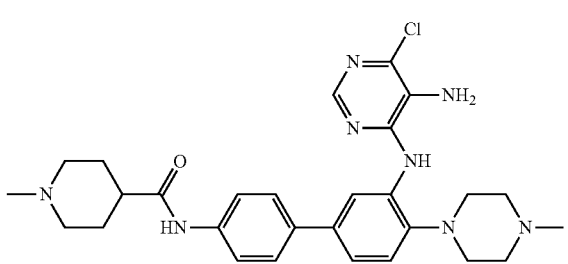

N-(3"-((5-amino-6-chloropyrimidin-4-yl)amino)-4"-(4-methylpiperazin-1-yl)-[1,1'-biphenyl]-4-yl)-1-methylpiperidin-4-carboxamide Following Example 33, tetrahydro-2H-pyran-4-carboxylic acid was replaced by 1-methylpiperidin-4-carboxylic acid, to obtain a white solid. Yield 63.6%; m.p. 157° C.-160° C.; $^1$H NMR (300 MHz, DMSO-d$_6$) δ 10.19 (s, 1H), 8.22-8.19 (m, 2H), 7.95 (s, 1H), 7.69 (d, J=8.4 Hz, 2H), 7.57 (d, J=8.7 Hz, 2H), 7.36 (d, J=8.4 Hz, 1H), 7.24 (d, J=8.1 Hz, 1H), 5.42 (s, 2H), 2.99-2.90 (m, 5H), 2.85 (s, 4H), 2.73 (s, 3H), 2.53 (s, 4H), 2.49 (s, 3H), 2.03-1.99 (m, 4H). HRMS (ESI): calcd. for m/z C$_{28}$H$_{36}$ClN$_8$O, [M+H]$^+$ 535.2695, found 535.2710. HPLC (80% methanol in water): $t_R$=4.518 min, 98.25%.

Example 35

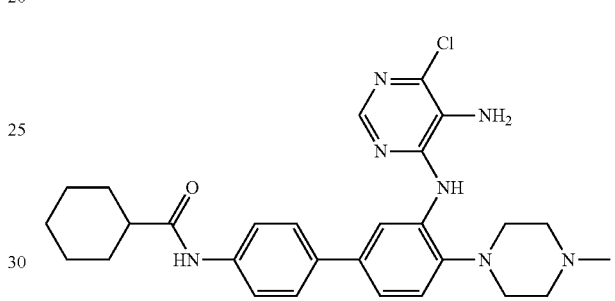

N-(3"-((5-amino-6-chloropyrimidin-4-yl)amino)-4"-(4-methylpiperazin-1-yl)-[1,1'-biphenyl]-4-yl)cyclo-hexanecarboxamide Following Example 33, tetrahydro-2H-pyran-4-carboxylic acid was replaced by cyclohexane-carboxylic acid, to obtain a white solid. Yield 80.1%; m.p. 256° C.-258° C.; $^1$H NMR (300 MHz, DMSO-d$_6$) δ 9.91 (s, 1H), 8.18 (d, J=8.2 Hz, 2H), 7.90 (s, 1H), 7.69 (d, J=8.3 Hz, 2H), 7.55 (d, J=8.4 Hz, 2H), 7.37 (d, J=8.4 Hz, 1H), 7.26 (d, J=8.2 Hz, 1H), 5.43 (s, 2H), 3.17 (s, 4H), 3.06 (s, 4H), 2.75 (s, 3H), 2.34-2.30 (m, 1H), 1.76 (t, J=12.5 Hz, 4H), 1.42 (t, J=11.6 Hz, 2H), 1.33-1.09 (m, 4H). HRMS (ESI): calcd. for m/z C$_{28}$H$_{34}$ClN$_7$O, [M+H]$^+$ 520.2586, found 520.2584. HPLC (90% methanol in water): $t_R$=4.003 min, 97.87%.

Example 36

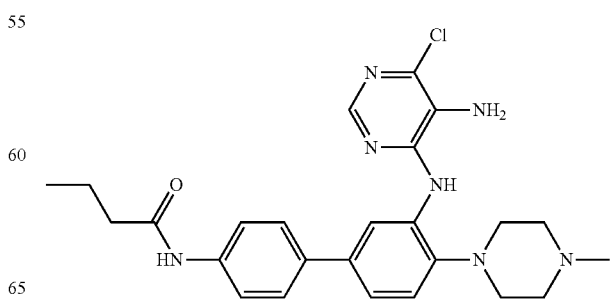

N-(3''-((5-amino-6-chloropyrimidin-4-yl)amino)-4''-(4-methylpiperazin-1-yl)-[1,1'-biphenyl]-4-yl)butyramide Following Example 33, tetrahydro-2H-pyran-4-carboxylic acid was replaced by n-butanoic acid, to obtain a white solid. Yield 79.7%; m.p. 196° C.-198° C.; $^1$H NMR (300 MHz, DMSO-$d_6$) δ 10.00 (s, 1H), 8.21-8.16 (m, 2H), 7.90 (d, J=6.0 Hz, 1H), 7.71-7.69 (m, 2H), 7.59-7.54 (m, 2H), 7.38 (d, J=7.8 Hz, 1H), 7.27 (d, J=8.2 Hz, 1H), 5.44 (s, 2H), 3.51-3.46 (m, 4H), 3.27-3.16 (m, 4H), 2.88 (s, 3H), 2.32-2.27 (m, 2H), 1.68-1.58 (m, 2H), 0.96-0.89 (m, 3H). HRMS (ESI): calcd. for m/z $C_{25}H_{31}ClN_7O$, [M+H]$^+$ 480.2273, found 480.2274. HPLC (80% methanol in water): $t_R$=4.696 min, 96.97%.

Example 37

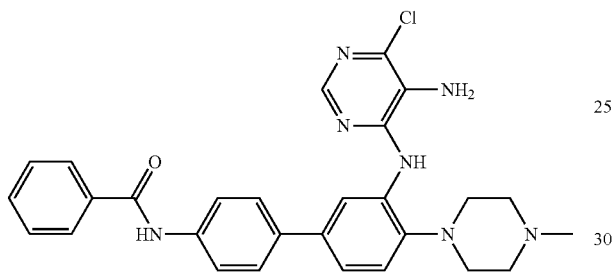

N-(3''-((5-amino-6-chloropyrimidin-4-yl)amino)-4''-(4-methylpiperazin-1-yl)-[1,1'-biphenyl]-4-yl)benzenecarboxamide Following Example 33, tetrahydro-2H-pyran-4-carboxylic acid was replaced by benzoic acid, to obtain a white solid. Yield 77.9%; m.p.>250° C.; $^1$H NMR (300 MHz, DMSO-$d_6$) δ 10.00 (s, 1H), 8.21-8.16 (m, 2H), 7.90 (d, J=6.0 Hz, 1H), 7.71-7.69 (m, 2H), 7.59-7.54 (m, 2H), 7.38 (d, J=7.8 Hz, 1H), 7.27 (d, J=8.2 Hz, 1H), 5.44 (s, 2H), 3.51-3.46 (m, 4H), 3.27-3.16 (m, 4H), 2.88 (s, 3H), 2.32-2.27 (m, 2H), 1.68-1.58 (m, 2H), 0.96-0.89 (m, 3H). HRMS (ESI): calcd. for m/z $C_{28}H_{28}ClN_7O$, [M+H]$^+$ 514.2117, found 514.2115. HPLC (90% methanol in water): $t_R$=3.889 min, 95.09%.

Example 38

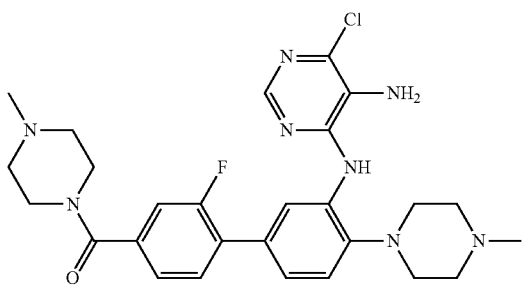 [SMILES: CN1CCN(C(=O)c2ccc(-c3ccc(N4CCN(C)CC4)c(Nc4ncnc(Cl)c4N)c3)c(F)c2)CC1]

(3''-((5-amino-6-chloropyrimidin-4-yl)amino)-2-fluoro-4''-(4-methylpiperazin-1-yl)-[1,1'-biphenyl]-4-yl)(4-methylpiperazin-1-yl)methanone Following the preparation method in Step 4 of Example 32, 4-aminophenylboric acid was replaced by 2-F-4-carboxylphenylboric acid, to obtain a white intermediate. Following the preparation method in Step 6 of Example 23, morpholine was replaced by 1-methylpiperazine to obtain a white solid. Yield 43.1%; m.p. 182° C.-184° C.; $^1$H NMR (300 MHz, DMSO-$d_6$) δ 8.12 (s, 1H), 7.80 (s, 1H), 7.68-7.65 (m, 2H), 7.60 (dd, J=7.5, 2.0 Hz, 1H), 7.10 (dd, J=7.5, 2.0 Hz, 1H), 6.93 (d, J=7.3 Hz, 1H), 6.82 (d, J=2.0 Hz, 1H), 5.36 (s, 2H), 3.55 (t, J=5.1 Hz, 4H), 3.30 (t, J=5.1 Hz, 4H), 2.85 (t, J=4.7 Hz, 4H), 2.53 (s, 4H), 2.34 (s, 3H), 2.32 (s, 3H). HRMS (ESI): calcd. for m/z $C_{27}H_{32}ClFN_8O$, [M+H]$^+$ 539.2444, found 539.2443. HPLC (80% methanol in water): $t_R$=4.156 min, 95.21%.

Example 39

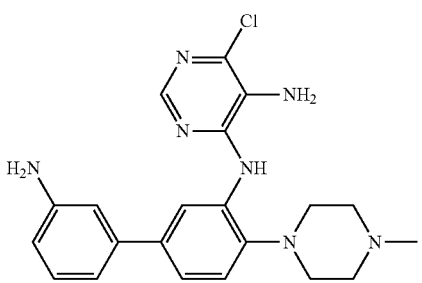 [SMILES: CN1CCN(c2ccc(-c3cccc(N)c3)cc2Nc2ncnc(Cl)c2N)CC1]

N-(3'-amino-4-(4-methylpiperazin-1-yl)-[1,1'-biphenyl]-3-yl)-6-chloropyrimidine-4,5-diamine Following the preparation method in Step 4 of Example 32, 4-aminophenylboric acid was replaced by 3-aminophenylboric acid, to obtain a white solid. Yield 69.4%; m.p. 215° C.-217° C.; $^1$H NMR (300 MHz, DMSO-$d_6$) δ 8.23 (s, 1H), 8.17 (s, 1H), 7.90 (s, 1H), 7.23 (d, J=6.4 Hz, 2H), 7.07 (d, J=7.7 Hz, 1H), 6.80 (s, 1H), 6.73 (d, J=7.6 Hz, 1H), 6.53 (d, J=8.0 Hz, 1H), 5.36 (s, 2H), 5.17 (s, 2H), 2.85 (s, 4H), 2.61 (s, 4H), 2.25 (s, 3H). HRMS (ESI): calcd. for m/z $C_{21}H_{24}ClN_7$, [M+H]$^+$ 410.1854, found 410.1852. HPLC (100% methanol): $t_R$=7.491 min, 95.66%.

Example 40

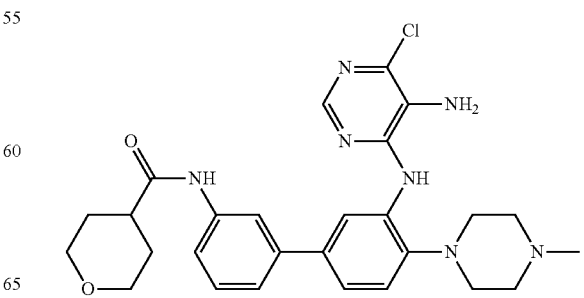

N-(3"-((5-amino-6-chloropyrimidin-4-yl)amino)-4"-(4-methylpiperazin-1-yl)-[1, 1'-biphenyl]-3-yl)tetrahydro-2H-pyran-4-carboxamide Following the preparation method in Example 33, the title compound of Example 32 was replaced by the title compound of Example 39, to obtain a white solid. Yield 65.0%; m.p. 212° C.-214° C.; ¹H NMR (300 MHz, DMSO-d₆) δ 9.99 (s, 1H), 8.24 (s, 1H), 8.19 (s, 1H), 7.89 (s, 2H), 7.59 (d, J=8.0 Hz, 1H), 7.44-7.19 (m, 4H), 5.38 (s, 2H), 3.91 (d, J=10.9 Hz, 2H), 3.47-3.35 (m, 3H), 2.86 (s, 4H), 2.54 (m, 4H), 2.24 (s, 3H), 1.70 (s, 4H). HRMS (ESI): calcd. for m/z $C_{27}H_{32}ClN_7O_2$, [M+H]⁺ 522.2379, found 522.2368. HPLC (100% methanol): $t_R$=7.105 min, 98.72%.

Example 41

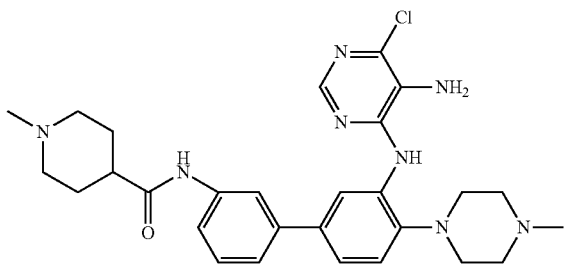

N-(3"-((5-amino-6-chloropyrimidin-4-yl)amino)-4"-(4-methylpiperazin-1-yl)-[1,1'-biphenyl]-3-yl)-1-methylpiperidin-4-carboxamide Following the preparation method in Example 34, the title compound of Example 32 was replaced by the title compound of Example 39, to obtain a white solid. Yield 56.9%; m.p. 158° C.-160° C.; ¹H NMR (300 MHz, DMSO-d₆) δ 9.95 (s, 1H), 8.24 (s, 1H), 8.18 (s, 1H), 7.89 (s, 2H), 7.59 (d, J=8.3 Hz, 1H), 7.39-7.19 (m, 4H), 5.38 (s, 2H), 2.86-2.83 (m, 4H), 2.80 (s, 1H), 2.57-2.51 (m, 4H), 2.22 (s, 3H), 2.15 (s, 3H), 1.89-1.82 (m, 2H), 1.79-1.58 (m, 4H), 1.22 (s, 2H). HRMS (ESI): calcd. for m/z $C_{28}H_{36}ClN_8O$, [M+H]⁺ 535.2695, found 535.2702. HPLC (100% methanol): $t_R$=7.252 min, 95.45%.

Example 42

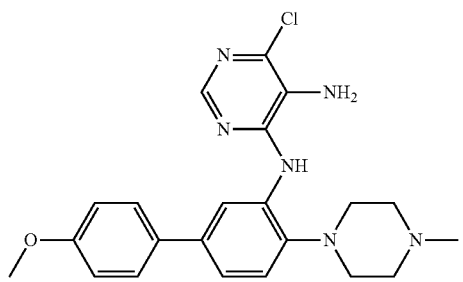

6-chloro-N-(4'-methoxyl-4-(4-methylpiperazin-1-yl)-[1,1'-biphenyl]-3-yl)pyrimidine-4,5-diamine Following the preparation method in Step 4 of Example 32, 4-aminophenylboric acid was replaced by 4-methoxylphenylboric acid, to obtain a white solid. Yield 59.9%; m.p. 211° C.-213° C.; ¹H NMR (300 MHz, DMSO-d₆) δ 8.24 (s, 2H), 7.90 (s, 1H), 7.57 (d, J=7.9 Hz, 2H), 7.40-7.35 (m, 3H), 7.24 (d, J=8.3 Hz, 1H), 5.37 (s, 2H), 5.22 (s, 1H), 4.52 (s, 2H), 2.85 (t, J=4.5 Hz, 4H), 2.53 (s, 4H), 2.24 (s, 3H). m/z (EI-MS): 425.2 [M]⁺. HPLC (80% methanol in water): $t_R$=4.590 min, 99.44%.

Example 43

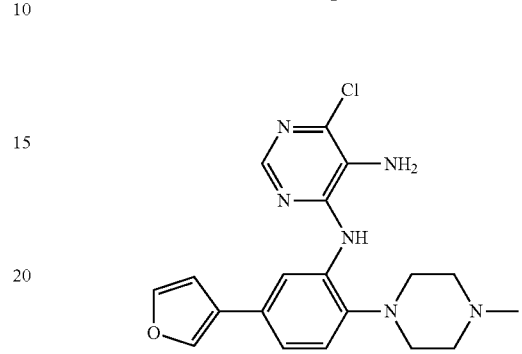

6-chloro-N⁴-(5-(furan-3-yl)-2-(4-methylpiperazin-1-yl)phenyl)pyrimidine-4,5-diamine Following the preparation method in Step 4 of Example 32, 4-aminophenylboric acid was replaced by 3-furylphenylboric acid, to obtain a white solid. Yield 70.1%; m.p. 164° C.-166° C.; ¹H NMR (300 MHz, DMSO-d₆) δ 8.23 (s, 1H), 7.90 (s, 1H), 7.54 (d, J=7.5 Hz, 1H), 7.43 (s, 1H), 7.07 (d, J=7.7 Hz, 1H), 6.91 (d, J=7.4 Hz, 1H), 6.82 (s, 1H), 6.53 (d, J=8.0 Hz, 1H), 5.36 (s, 2H), 2.85 (s, 4H), 2.61 (s, 4H), 2.25 (s, 3H). HRMS (ESI): calcd. for m/z $C_{19}H_{22}ClN_6O$, [M+H]⁺ 385.1538, found 385.1538. HPLC (90% methanol in water): $t_R$=6.859 min, 96.26%.

Example 44

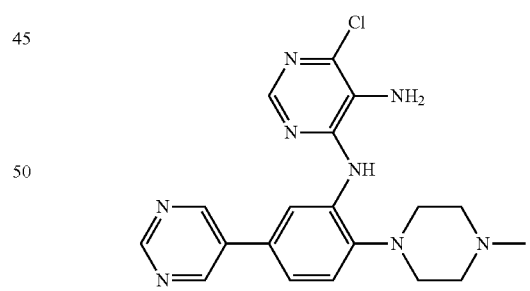

6-chloro-N⁴-(2-(4-methylpiperazin-1-yl)-5-(pyrimidine-5-yl)phenyl)pyrimidine-4,5-diamine Following the preparation method in Step 4 of Example 32, 4-aminophenylboric acid was replaced by 4-pyrimidinylphenylboric acid, to obtain a white solid. Yield 45.8%; m.p. 189° C.-191° C.; ¹H NMR (300 MHz, DMSO-d₆) δ 9.17 (s, 1H), 9.10 (s, 2H), 8.57 (s, 1H), 7.80 (s, 1H), 7.10 (dd, J=7.5, 2.0 Hz, 1H), 6.99 (d, J=7.4 Hz, 1H), 6.82 (d, J=2.0 Hz, 1H), 5.32 (s, 2H), 2.85 (s, 4H), 2.54 (s, 4H), 2.34

(s, 3H). HRMS (ESI): calcd. for m/z $C_{19}H_{22}ClN_8$, $[M+H]^+$ 397.1651, found 397.1653. HPLC (80% methanol in water): $t_R$=3.973 min, 97.50%.

Example 45

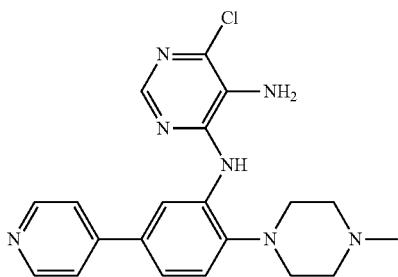 [SMILES: CN1CCN(c2ccc(-c3ccncc3)cc2Nc2ncnc(Cl)c2N)CC1]

6-chloro-$N^4$-(2-(4-methylpiperazin-1-yl)-5-(pyridin-4-yl)phenyl)pyrimidine-4,5-diamine Following the preparation method in Step 4 of Example 32, 4-aminophenylboric acid was replaced by 4-pyridinylphenylboric acid, to obtain a white solid. Yield 44.2%; m.p. 202° C.-204° C.; $^1$H NMR (300 MHz, DMSO-d$_6$) δ 8.83 (s, 1H), 8.69 (d, J=5.1 Hz, 2H), 7.80 (s, 1H), 7.75 (s, 2H), 7.10 (dd, J=7.5, 2.0 Hz, 1H), 6.94 (d, J=7.5 Hz, 1H), 6.82 (s, 1H), 5.54 (s, 2H), 3.30 (t, J=5.1 Hz, 4H), 2.85 (t, J=4.7 Hz, 4H), 2.54 (s, 4H), 2.34 (s, 3H), 2.32 (s, 3H). m/z (EI-MS): 411.1 [M]$^+$. HPLC (100% methanol): $t_R$=7.074 min, 96.00%.

Example 46

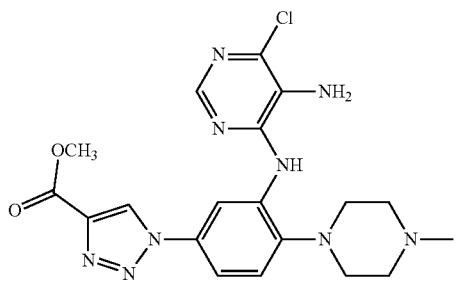 [SMILES: COC(=O)c1cn(-c2ccc(N3CCN(C)CC3)c(Nc3ncnc(Cl)c3N)c2)nn1]

Methyl 1-(3-((5-amino-6-chloropyrimidin-4-yl)amino)-4-(4-methylpiperazin-1-yl)phenyl)-1H-1,2,3-triazole-4-carboxylate Step 1: Preparation of 4-(4-methylpiperazin-1-yl)-3-nitrophenylamine 4-F-3-nitrophenylamine (5 g, 32 mmol) was dissolved in acetonitrile (50 mL), and then DIPEA (7.9 mL, 47.8 mmol) and 1-methylpiperazine (5.3 mL, 67.8 mmol) were added. The mixture was refluxed for 12 hrs. The reaction mixture was spin-dried to obtain a crude red solid, which was washed with acetonitrile, filtered under suction, and dried. Yield 95.5%; m.p.>250° C.; $^1$H NMR (300 MHz, DMSO-d$_6$) δ 7.06 (d, J=8.6 Hz, 1H), 6.76 (s, 1H), 6.69 (d, J=8.5 Hz, 1H), 5.34 (s, 2H), 2.70 (t, J=4.4 Hz, 4H), 2.27 (s, 4H), 2.09 (s, 3H). m/z (EI-MS): 237.1 [M]$^+$.

Step 2: Preparation of 1-(4-azido-2-nitrophenyl)-4-methylpiperazine 4-(4-methylpiperazin-1-yl)-3-nitrophenylamine (5.0 g, 21.25 mmol) was dissolved in 2M HCl. An aqueous solution (12 mL) of NaNO$_2$ (2.2 g, 31.8 mmol) was added dropwise in an ice bath. The mixture was stirred under an ice bath condition for 30 min. Then, sodium azide (2.8 g, 42.5 mmol) was added. The mixture was heated to room temperature, and stirred for 2 hrs. The reaction mixture was adjusted to pH=9 to 10 with 2 M NaOH until a reddish brown solid precipitated, which was filtered and dried. Yield 87.7%; m.p. 88-91° C.; $^1$H NMR (300 MHz, DMSO-d$_6$) δ 7.48 (d, J=2.2 Hz, 1H), 7.34-7.20 (m, 2H), 2.85 (t, J=4.7 Hz, 4H), 2.31 (t, J=4.8 Hz, 4H), 2.11 (s, 3H). m/z (EI-MS): 262.1 [M]$^+$.

Step 3: Preparation of methyl 1-(4-(4-methylpiperazin-1-yl)-3-nitrophenyl)-1H-1,2,3-triazole-4-carboxylate 1-(4-azido-2-nitrophenyl)-4-methylpiperazine (2.0 g, 7.6 mmol) was dissolved in methanol (50 mL), and methyl propiolate (1.8 g, 22.8 mmol) was added. Then, CuI (0.14 g, 0.76 mmol) and DIPEA (1.2 mL, 7.6 mmol) were added. The mixture was refluxed for 48 hrs, and filtered to remove CuI. The filtrate was spin-dried to obtain a crude product, which was washed with ethyl acetate to obtain a reddish brown solid. Yield 61.7%; m.p. 159-161° C.; $^1$H NMR (300 MHz, DMSO-d$_6$) δ 9.45 (s, 1H), 8.36 (d, J=2.7 Hz, 1H), 8.11-8.01 (m, 1H), 7.42 (d, J=9.1 Hz, 1H), 3.80 (s, 3H), 2.99 (t, J=5.4 Hz, 4H), 2.35 (t, J=5.2 Hz, 4H), 2.13 (s, 3H). m/z (EI-MS): 369.2 [M+Na]$^+$.

Step 4: Preparation of methyl 1-(3-amino-4-(4-methylpiperazin-1-yl)phenyl)-1H-1, 2, 3-triazole-4-carboxylate Methyl 1-(4-(4-methylpiperazin-1-yl)-3-nitrophenyl)-1H-1,2,3-triazole-4-carboxylate (1.7 g, 4.9 mmol) was dissolved in methanol (50 mL), and a catalytic amount of Pd/C was added. The mixture was stirred under the protection of hydrogen at room temperature for 6 hrs, and filtered to remove Pd/C. The filtrate was spin-dried to obtain a pink solid. Yield 85.3%; m.p. 194-197° C.; $^1$H NMR (300 MHz, DMSO-d$_6$) δ 9.28 (s, 1H), 7.28 (d, J=1.9 Hz, 1H), 7.07 (d, J=1.9 Hz, 2H), 5.15 (s, 2H), 3.90 (s, 3H), 2.87 (t, J=4.5 Hz, 4H), 2.53 (br s, 4H), 2.26 (s, 3H). m/z (EI-MS): 317.2 [M]$^+$.

Step 5: Preparation of a Target Product: methyl 1-(3-((5-amino-6-chloropyrimidin-4-yl)amino)-4-(4-methylpiperazin-1-yl)phenyl)-1H-1,2,3-triazole-4-carboxylate Following the preparation method in Step 4 of Example 23, methyl 3'-amino-4'-(4-methylpiperazin-1-yl)-[1,1'-biphenylyl]-4-carboxylate was replaced by methyl 1-(3-amino-4-(4-methylpiperazin-1-yl)phenyl)-1H-1,2,3-triazole-4-carboxylate, to obtain a beige solid. Yield 65.9%; m.p. 231° C.-233° C.; $^1$H NMR (300 MHz, DMSO-d$_6$) δ 9.46 (s, 1H), 8.62 (s, 1H), 8.34 (s, 1H), 7.95 (s, 1H), 7.64 (d, J=8.6 Hz, 1H), 7.37 (d, J=8.7 Hz, 1H), 5.44 (s, 2H), 3.89 (s, 3H), 2.88 (s, 4H), 2.51 (s, 4H), 2.23 (s, 3H). HRMS (ESI): calcd.

for m/z $C_{19}H_{22}ClFN_9O_2$, [M+H]⁺ 444.1657, found 444.1660. HPLC (90% methanol in water): $t_R$=3.775 min, 97.63%.

Example 47

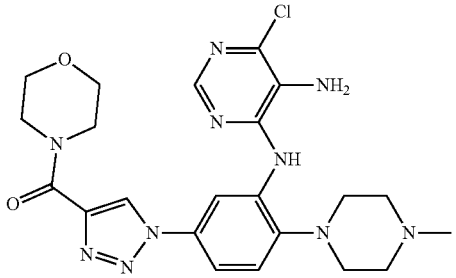 [SMILES: CN1CCN(c2ccc(-n3cc(C(=O)N4CCOCC4)nn3)cc2Nc2ncnc(Cl)c2N)CC1]

(1-(3-((5-amino-6-chloropyrimidin-4-yl)amino)-4-(4-methylpiperazin-1-yl)phenyl)-1H-1,2,3-triazole-4-yl)(morpholino)methanone

Step 1: Methyl 1-(3-((5-amino-6-chloropyrimidin-4-yl)amino)-4-(4-methylpiperazin-1-yl)phenyl)-1H-1,2,3-triazole-4-carboxylate Following the preparation method in Step 5 of Example 23, methyl 3'-((5-amino-6-chloropyrimidin-4-yl)amino)-4'-(4-methylpiperazin-1-yl)-[1,1'-biphenylyl]-4-carboxylate was replaced by methyl 1-(3-((5-amino-6-chloropyrimidin-4-yl)amino)-4-(4-methylpiperazin-1-yl)phenyl)-1H-1,2,3-triazole-4-carboxylate, to obtain a beige solid. Yield 87.6%; m.p. 232° C.-234° C.; ¹H NMR (300 MHz, DMSO-d₆) δ 12.20 (s, 1H), 9.36 (s, 1H), 8.62 (s, 1H), 8.34 (s, 1H), 7.95 (s, 1H), 7.63 (d, J=8.7 Hz, 1H), 7.38 (d, J=8.7 Hz, 1H), 5.47 (s, 2H), 2.90 (s, 4H), 2.53 (s, 4H), 2.34 (s, 3H). HRMS (ESI): calcd. for m/z $C_{18}H_{20}ClFN_9O_2$, [M+H]⁺ 430.1488, found 430.1492. HPLC (90% methanol in water): $t_R$=3.548 min, 99.16%.

Step 2: Preparation of a Target Product: (1-(3-((5-amino-6-chloropyrimidin-4-yl)amino)-4-(4-methylpiperazin-1-yl)phenyl)-1H-1,2,3-triazole-4-yl)(morpholino)methanone Following the preparation method in Step 6 of Example 23, 3'-((5-amino-6-chloropyrimidin-4-yl)amino)-4'-(4-methylpiperazin-1-yl)-[1,1'-biphenylyl]-4-carboxylic acid was replaced by 1-(3-((5-amino-6-chloropyrimidin-4-yl)amino)-4-(4-methylpiperazin-1-yl)phenyl)-1H-1,2,3-triazole-4-carboxylic acid, to obtain a beige solid. Yield 68.3%; m.p. 200° C.-202° C.; ¹H NMR (300 MHz, DMSO-d₆) δ 9.20 (s, 1H), 8.60 (s, 1H), 8.53 (t, J=5.8 Hz, 1H), 8.34 (s, 1H), 7.94 (s, 1H), 7.62 (d, J=8.7 Hz, 1H), 7.37 (d, J=8.6 Hz, 1H), 5.45 (s, 2H), 3.58 (t, J=4.5 Hz, 4H), 3.45-3.36 (m, 4H), 2.91 (t, J=4.5 Hz, 4H), 2.60 (s, 4H), 2.44 (s, 4H), 2.30 (s, 3H). HRMS (ESI): calcd. for m/z $C_{24}H_{32}ClFN_{11}O_2$, [M+H]⁺ 542.2502, found 542.2500. HPLC (80% methanol in water): $t_R$=4.612 min, 99.65%.

Example 48

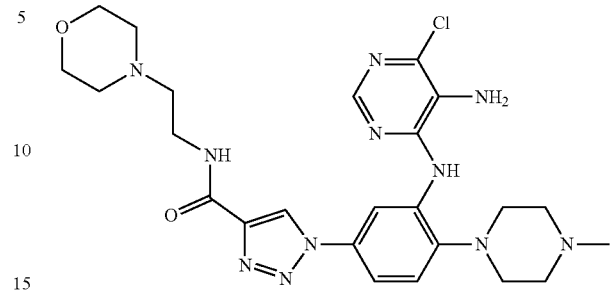

1-(3-((5-amino-6-chloropyrimidin-4-yl)amino)-4-(4-methylpiperazin-1-yl)phenyl)-N-(3-morpholinopropyl)-1H-1,2,3-triazole-4-carboxamide Following the preparation method in Example 24, 3'-((5-amino-6-chloropyrimidin-4-yl)amino)-4'-(4-methylpiperazin-1-yl)-[1,1'-biphenylyl]-4-carboxylic acid was replaced by 1-(3-((5-amino-6-chloropyrimidin-4-yl)amino)-4-(4-methylpiperazin-1-yl)phenyl)-1H-1,2,3-triazole-4-carboxylic acid, to obtain a beige solid. Yield 65.9%; m.p. 203° C.-205° C.; ¹H NMR (300 MHz, DMSO-d₆) δ 9.19 (s, 1H), 8.82 (t, J=5.6 Hz, 1H), 8.59 (s, 1H), 8.34 (s, 1H) 7.94 (s, 1H), 7.62 (d, J=8.7 Hz, 1H), 7.36 (d, J=8.7 Hz, 1H), 5.45 (s, 2H), 3.61 (s, 4H), 3.36-3.33 (m, 4H), 2.90 (s, 4H), 2.58 (s, 4H), 2.40 (s, 4H), 2.28 (s, 3H), 1.73-1.68 (m, 2H). HRMS (ESI): calcd. for m/z $C_{25}H_{34}ClFN_{11}O_2$, [M+H]⁺ 556.2660, found 556.2662. HPLC (80% methanol in water): $t_R$=4.457 min, 98.27%.

Example 49

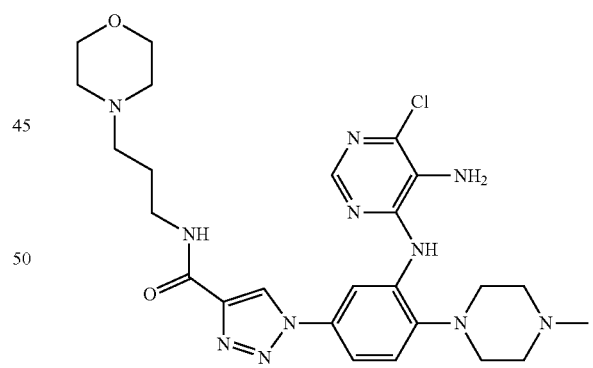

(1-(3-((5-amino-6-chloropyrimidin-4-yl)amino)-4-(4-methylpiperazin-1-yl)phenyl)-1H-1,2,3-triazole-4-yl)(4-methylpiperazin-1-yl)methanone Following the preparation method in Example 25, 3'-((5-amino-6-chloropyrimidin-4-yl)amino)-4'-(4-methylpiperazin-1-yl)-[1,1'-biphenylyl]-4-carboxylic acid was replaced by 1-(3-((5-amino-6-chloropyrimidin-4-yl)amino)-4-(4-methylpiperazin-1-yl)phenyl)-1H-1,2,3-triazole-4-carboxylic acid, to obtain a beige solid. Yield 46.2%; m.p. 225° C.-228° C.; ¹H NMR (300 MHz, DMSO-d₆) δ9.19 (s, 1H), 8.72 (s, 1H), 8.52 (s, 1H), 8.34 (s, 1H) 7.94 (s, 1H), 7.62 (d, J=8.7 Hz, 1H), 7.37 (d, J=8.7 Hz, 1H), 5.45 (s, 2H), 3.76 (s, 4H), 3.39 (s, 4H), 2.93 (s, 4H), 2.68 (s, 4H) 2.22 (s, 3H), 2.15 (s, 3H). HRMS (ESI): calcd. for m/z $C_{23}H_{31}ClFN_{11}O$, $[M+H]^+$ 512.2396, found 512.2397. HPLC (90% methanol in water): $t_R$=3.707 min, 98.00%.

Example 50

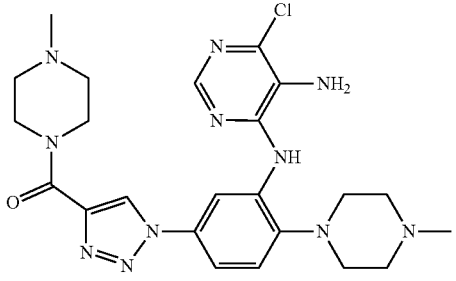 [SMILES: CN1CCN(C(=O)c2cn(-c3ccc(N4CCN(C)CC4)c(Nc4ncnc(Cl)c4N)c3)nn2)CC1]

1-(3-((5-amino-6-chloropyrimidin-4-yl)amino)-4-(4-methylpiperazin-1-yl)phenyl)-N,N-dimethyl-1H-1,2,3-triazole-4-carboxamide Following the preparation method in Example 27, 3'-((5-amino-6-chloropyrimidin-4-yl)amino)-4'-(4-methylpiperazin-1-yl)-[1,1'-biphenylyl]-4-carboxylic acid was replaced by 1-(3-((5-amino-6-chloropyrimidin-4-yl)amino)-4-(4-methylpiperazin-1-yl)phenyl)-1H-1,2,3-triazole-4-carboxylic acid, to obtain a beige solid. Yield 66.6%; m.p. 215° C.-217° C.; $^1$H NMR (300 MHz, DMSO-$d_6$) δ 9.84 (s, 1H), 9.18 (s, 1H), 8.62 (s, 1H), 8.27 (s, 1H) 7.95 (s, 1H), 7.68 (s, 1H), 7.44 (s, 1H), 5.52 (s, 2H), 3.58 (s, 4H), 3.30 (s, 6H), 3.04 (s, 4H), 2.88 (s, 3H). HRMS (ESI): calcd. for m/z $C_{20}H_{25}ClFN_{10}O$, $[M+H]^+$ 457.1974, found 457.1966. HPLC (80% methanol in water): $t_R$=4.203 min, 98.52%.

Example 51

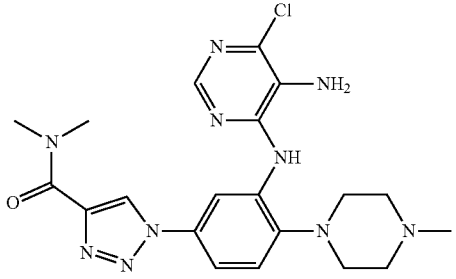 [SMILES: CN1CCN(c2ccc(-n3cc(C(=O)N(C)C)nn3)cc2Nc2ncnc(Cl)c2N)CC1]

1-(3-((5-amino-6-chloropyrimidin-4-yl)amino)-4-(4-methylpiperazin-1-yl)phenyl)-N,N-dimethyl-1H-1,2,3-triazole-4-carboxamide Following the preparation method in Example 26, 3'-((5-amino-6-chloropyrimidin-4-yl)amino)-4'-(4-methylpiperazin-1-yl)-[1,1'-biphenylyl]-4-carboxylic acid was replaced by 1-(3-((5-amino-6-chloropyrimidin-4-yl)amino)-4-(4-methylpiperazin-1-yl)phenyl)-1H-1,2,3-triazole-4-carboxylic acid, to obtain a beige solid. Yield 66.6%; m.p. 215° C.-217° C.; $^1$H NMR (300 MHz, DMSO-$d_6$) δ 9.84 (s, 1H), 9.18 (s, 1H), 8.62 (s, 1H), 8.27 (s, 1H) 7.95 (s, 1H), 7.68 (s, 1H), 7.44 (s, 1H), 5.52 (s, 2H), 3.58 (s, 4H), 3.30 (s, 6H), 3.04 (s, 4H), 2.88 (s, 3H). HRMS (ESI): calcd. for m/z $C_{20}H_{25}ClFN_{10}O$, $[M+H]^+$ 457.1974, found 457.1966. HPLC (80% methanol in water): $t_R$=4.203 min, 98.52%.

Example 52

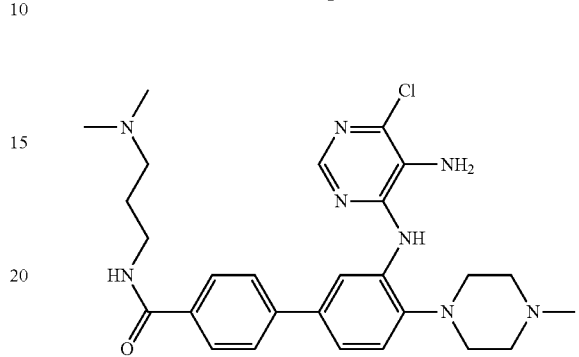

1-(3-((5-amino-6-chloropyrimidin-4-yl)amino)-4-(4-methylpiperazin-1-yl)phenyl)-N-(2-(dimethylamino)ethyl)-1H-1,2,3-triazole-4-carboxamide Following the preparation method in Example 28, 3'-((5-amino-6-chloropyrimidin-4-yl)amino)-4'-(4-methylpiperazin-1-yl)-[1,1'-biphenylyl]-4-carboxylic acid was replaced by 1-(3-((5-amino-6-chloropyrimidin-4-yl)amino)-4-(4-methylpiperazin-1-yl)phenyl)-1H-1,2,3-triazole-4-carboxylic acid, to obtain a beige solid. Yield 39.9%; m.p. 149° C.-152° C.; $^1$H NMR (300 MHz, DMSO-$d_6$) δ 9.84 (s, 1H), 9.18 (s, 1H), 8.62 (s, 1H), 8.54 (s, 1H), 7.95 (s, 1H), 7.68 (d, J=8.7 Hz, 1H), 7.44 (d, J=8.7 Hz, 1H), 5.46 (s, 2H), 3.08-2.90 (m, 6H), 2.77 (s, 6H), 2.50 (s, 4H), 1.90 (s, 4H), 1.28-1.23 (m, 2H). HRMS (ESI): calcd. for m/z $C_{22}H_{30}ClFN_{11}O$, $[M+H]^+$ 500.2402, found 500.2404. HPLC (80% methanol in water): $t_R$=4.157 min, 98.88%.

Example 53

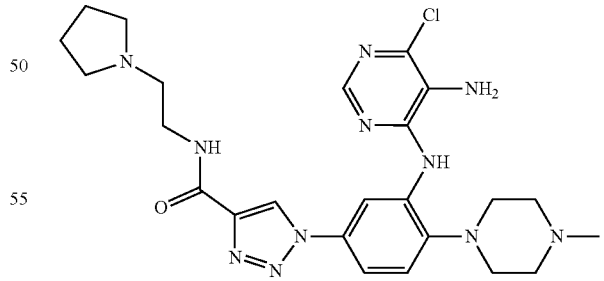

1-(3-((5-amino-6-chloropyrimidin-4-yl)amino)-4-(4-methylpiperazin-1-yl)phenyl)-N-(2-(pyrrolidin-1-yl)ethyl)-1H-1, 2, 3-triazole-4-carboxamide Following the preparation method in Example 29, 3'-((5-amino-6-chloropyrimidin-4-yl)amino)-4'-(4-methylpiperazin-1-yl)-[1,1'-biphenylyl]-4-carboxylic acid was replaced by 1-(3-((5-amino-6-chloropyrimidin-4-yl)amino)-4-(4-methylpiperazin-1-yl)phenyl)-1H-1,2,3-triazole-4-carboxylic acid, to obtain a beige solid. Yield 40.7%; m.p. 172° C.-175° C.; $^1$H NMR (300 MHz, DMSO-d$_6$) δ 9.19 (s, 1H), 8.72 (s, 1H), 8.52 (s, 1H), 8.34 (s, 1H) 7.94 (s, 1H), 7.62 (d, J=8.7 Hz, 1H), 7.37 (d, J=8.7 Hz, 1H), 5.45 (s, 2H), 3.64-3.62 (m, 2H), 3.38-3.34 (m, 6H), 3.12 (s, 4H), 2.54 (s, 2H), 2.48 (s, 2H), 2.36 (s, 3H), 1.93 (s, 4H). HRMS (ESI): calcd. for m/z C$_{24}$H$_{32}$ClFN$_{11}$O, [M+H]$^+$ 526.2553, found 526.2543. HPLC (80% methanol in water): t$_R$=4.211 min, 99.19%.

Example 54

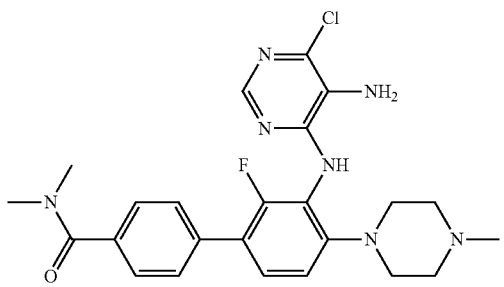

3"-((5-amino-6-chloropyrimidin-4-yl)amino)-2'-fluoro-N,N-dimethyl-4"-(4-methylpiperazin-1-yl)-[1,1'-biphenyl]-4-carboxamide Step 1: Preparation of 1-bromo-2,4-difluoro-3-nitrobenzene A mixed solution of sulfuric acid (10 mL) and trifluoroacetic acid (50 mL) was prepared under an ice bath condition, 2,6-difluoronitrobenzene (5.0 g, 31.4 mmol) was added, and then N-bromosuccinimide (6.15 g, 34.5 mmol) was slowly added portionwise. The reaction mixture was stirred at room temperature for 18 hrs, poured into ice water (100 mL), and extracted with ethyl acetate (3×50 mL). The organic layer was washed with 2 M sodium hydroxide, dried over anhydrous sodium sulfate, filtered and spin-dried to obtain a red oil (6.6 g). Yield 90.0%; $^1$H NMR (300 MHz, CDCl$_3$) δ 7.78 (m, 1H), 7.28-7.16 (m, 1H). m/z (EI-MS): 237.9 [M]$^+$ Step 2: Preparation of 2',4'-difluoro-3'-nitro-[1,1'-biphenyl]-4-carboxylate Following the preparation method in Step 1 of Example 23, 4-bromo-1-fluoronitrobenzene was replaced by 1-bromo-2,4-difluoro-3-nitrobenzene. Yield 65.0%. $^1$H NMR (300 MHz, CDCl$_3$) δ 7.98-7.96 (m, 2H), 7.91-7.87 (m, 1H), 7.58-7.55 (m, 2H), 7.19-7.15 (m, 1H), 3.95 (s, 3H). m/z (EI-MS): 294.1 [M]$^+$.

Step 3: Preparation of methyl 2'-fluoro-4'-(4-methylpiperazin-1-yl)-3'-nitro-[1,1'-biphenylyl]-4-carboxylcarboxylate Following the preparation method in Step 2 of Example 23, methyl 4'-fluoro-3'-nitro-[1,1'-biphenylyl]-4-carboxylate was replaced by methyl 2',4'-difluoro-3'-nitro-[1,1'-biphenylyl]-4-carboxylate. Yield 88.2%; m.p. 112° C.-115° C.; $^1$H NMR (300 MHz, DMSO-d$_6$) δ 8.02-7.99 (m, 2H), 7.69-7.62 (m, 3H), 6.98 (d, J=8.6 Hz, 1H), 3.95 (s, 3H), 3.39 (t, J=4.7 Hz, 4H), 2.54 (t, J=4.6 Hz, 4H), 2.34 (s, 3H). m/z (EI-MS): 374.1 [M]$^+$.

Step 4: Preparation of methyl 3'-amino-2'-fluoro-4'-(4-methylpiperazin-1-yl)-[1,1'-biphenyl]-4-carboxylate Following the preparation method in Step 3 of Example 23, methyl 4'-(4-methylpiperazin-1-yl)-3'-nitro-[1,1'-biphenyl]-4-carboxylate was replaced by methyl 2'-fluoro-4'-(4-methylpiperazin-1-yl)-3'-nitro-[1,1'-biphenylyl]-4-carboxylcarboxylate. Yield 73.5%; m.p. 162° C.-165° C.; $^1$H NMR (300 MHz, DMSO-d$_6$) δ 8.01-7.99 (m, 2H), 7.68-7.66 (m, 2H), 6.75 (dd, J=7.5, 5.7 Hz, 1H), 6.58 (d, J=7.5 Hz, 1H), 4.35 (s, 2H), 3.95 (s, 3H), 3.39 (t, J=4.7 Hz, 4H), 2.54 (t, J=4.7 Hz, 4H), 2.34 (s, 3H). m/z (EI-MS): 344.2 [M]$^+$.

Step 5: Preparation of methyl 3'-((5-amino-6-chloropyrimidin-4-yl)amino)-2'-fluoro-4'-(4-methylpiperazin-1-yl)-[1,1'-biphenyl]-4-carboxylate Following the preparation method in Step 4 of Example 23, methyl 3'-amino-4'-(4-methylpiperazin-1-yl)-[1,1'-biphenyl]-4-carboxylate was replaced by methyl 3'-amino-2'-fluoro-4'-(4-methylpiperazin-1-yl)-[1,1'-biphenyl]-4-carboxylate. Yield 55.7%; m.p. 222° C.-225° C.; $^1$H NMR (300 MHz, DMSO-d$_6$) δ 8.11 (s, 1H), 8.01-7.99 (m, 2H), 7.80 (s, 1H), 7.62-7.60 (m, 2H), 7.12 (dd, J=7.5, 5.7 Hz, 1H), 6.65 (d, J=7.5 Hz, 1H). 5.35 (s, 2H), 3.95 (s, 3H), 3.34 (t, J=4.7 Hz, 4H), 2.57 (t, J=4.7 Hz, 4H), 2.39 (s, 3H). HRMS (ESI): calcd. for m/z C$_{23}$H$_{24}$ClFN$_6$O$_2$, [M+H]$^+$ 471.1706, found 471.1707. HPLC (80% methanol in water): t$_R$=2.744 min, 99.52%.

Step 6: Preparation of 3"-((5-amino-6-chloropyrimidin-4-yl)amino)-2'-fluoro-4"-(4-methylpiperazin-1-yl)-[1,1'-biphenyl]-4-carboxylic Acid Following the preparation method in Step 5 of Example 23, methyl 3'-((5-amino-6-chloropyrimidin-4-yl)amino)-4'-(4-methylpiperazin-1-yl)-[1,1'-biphenylyl]-4-carboxylate was replaced by methyl 3'-((5-amino-6-chloropyrimidin-4-yl)amino)-2'-fluoro-4'-(4-methylpiperazin-1-yl)-[1,1'-biphenyl]-4-carboxylate. Yield of two steps: 80.4%; m.p.>250° C.; $^1$H NMR (300 MHz, DMSO-d$_6$) δ 8.11 (dd, J=5.3, 2.2 Hz, 3H), 7.80 (s, 1H), 7.69-7.67 (m, 2H), 7.12 (dd, J=7.5, 5.7 Hz, 1H), 6.66 (d, J=7.5 Hz, 1H), 5.35 (s, 2H), 3.93 (s, 3H), 3.34 (t, J=4.7 Hz, 4H), 2.57 (s, 4H), 2.32 (s, 3H). m/z (EI-MS): 457.2 [M]$^+$.

Step 7: Preparation of a Target Product 3"-((5-amino-6-chloropyrimidin-4-yl)amino)-2'-fluoro-N,N-dimethyl-4"-(4-methylpiperazin-1-yl)-[1,1'-biphenyl]-4-carboxamide The preparation method was similar to the preparation method in Step 6 of Example 23. Yield 77.5%; m.p. 158° C.-160° C.; $^1$H NMR (300 MHz, DMSO-d$_6$) δ 8.03 (s, 1H), 7.71 (s, 1H), 7.60-7.46 (m, 4H), 7.40 (t, J=8.5 Hz, 1H), 7.00 (d, J=8.6 Hz, 1H), 5.49 (s, 2H), 2.99-2.98 (m, 6H), 2.87 (s, 4H), 2.38 (s, 4H), 2.18 (s, 3H). HRMS (ESI): calcd. for C$_{24}$H$_{27}$ClFN$_7$O, [M+H]$^+$ 484.2202, found 484.2203. HPLC (80% methanol in water): t$_R$=3.448 min, 95.30%.

Example 55

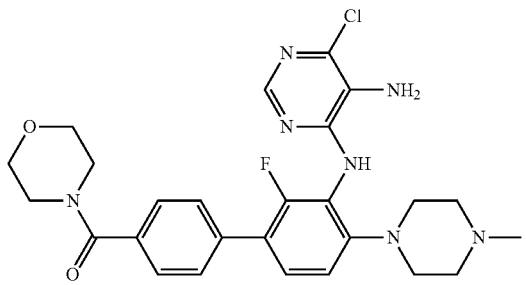 [SMILES: CN1CCN(c2ccc(-c3ccc(C(=O)N4CCOCC4)cc3)c(F)c2Nc2ncnc(Cl)c2N)CC1]

(3"-((5-amino-6-chloropyrimidin-4-yl)amino)-2'-fluoro-4"-(4-methylpiperazin-1-yl)-[1,1'-biphenyl]-4-yl)(morpholino)methanone Following the preparation method in Example 54, dimethyl amine was replaced by morpholine. Yield 84.7%; m.p. 145° C.-148° C.; $^1$H NMR (300 MHz, DMSO-d$_6$) δ 8.05 (s, 1H), 7.72 (s, 1H), 7.54 (dd, J=8.5, 5.4 Hz, 4H), 7.41 (t, J=8.5 Hz, 1H), 7.03 (d, J=8.6 Hz, 1H), 5.48 (s, 2H), 3.61 (s, 4H), 3.34 (s, 4H), 2.98 (s, 4H), 2.65 (s, 4H), 2.38 (s, 3H). HRMS (ESI): calcd. for m/z $C_{26}H_{29}ClFN_7O_2$, [M+H]$^+$ 526.2128, found 526.2122. HPLC (80% methanol in water): $t_R$=3.560 min, 98.66%.

Example 56

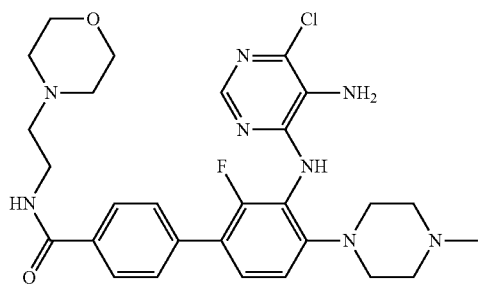 [SMILES: CN1CCN(c2ccc(-c3ccc(C(=O)NCCN4CCOCC4)cc3)c(F)c2Nc2ncnc(Cl)c2N)CC1]

3"-((5-amino-6-chloropyrimidin-4-yl)amino)-2'-fluoro-4"-(4-methylpiperazin-1-yl)-N-(2-morpholinoethyl)-[1,11,1'-terphenyl]-4-carboxamide Following the preparation method in Example 54, dimethyl amine was replaced by 2-morpholinylethyl-1-amine. Yield 74.9%; m.p. 199° C.-202° C.; $^1$H NMR (300 MHz, DMSO-d$_6$) δ 8.48 (t, J=5.5 Hz, 1H), 8.09 (s, 1H), 7.90 (d, J=8.1 Hz, 2H), 7.71 (s, 1H), 7.59 (d, J=7.9 Hz, 2H), 7.41 (t, J=8.5 Hz, 1H), 7.00 (d, J=8.5 Hz, 1H), 5.50 (s, 2H), 3.57 (s, 4H), 3.41-3.38 (m, 2H), 2.91 (s, 4H), 2.49 (s, 4H), 2.42 (s, 6H), 2.21 (s, 3H). HRMS (ESI): calcd. for m/z $C_{28}H_{34}ClFN_8O_2$, [M+H]$^+$ 569.2550, found 569.2548. HPLC (80% methanol in water): $t_R$=3.634 min, 98.88%.

Example 57

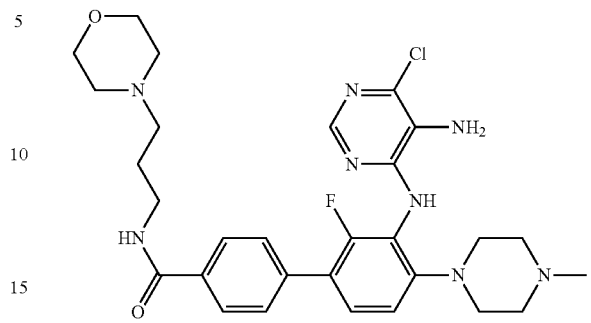

3"-((5-amino-6-chloropyrimidin-4-yl)amino)-2'-fluoro-4"-(4-methylpiperazin-1-yl)-N-(3-morpholinopropyl)-[1,11,1'-terphenyl]-4-carboxamide Following the preparation method in Example 54, dimethyl amine was replaced by 3-morpholinylpropyl-1-amine. Yield 65.2%; m.p. 202° C.-205° C.; $^1$H NMR (300 MHz, DMSO-d$_6$) δ 8.46 (t, J=5.7 Hz, 1H), 7.96 (s, 1H), 7.81 (d, J=8.2 Hz, 2H), 7.31 (t, J=8.6 Hz, 2H), 6.90 (d, J=8.7 Hz, 1H), 5.40 (s, 2H), 3.47 (t, J=5.4 Hz, 4H), 3.21-3.19 (m, 2H), 2.80 (s, 4H), 2.28-2.22 (m, 10H), 2.09 (s, 3H), 1.60 (t, J=7.1 Hz, 2H). HRMS (ESI): calcd. for m/z $C_{29}H_{37}ClFN_8O_2$, [M+H]$^+$ 583.2706, found 583.2707. HPLC (80% methanol in water): $t_R$=3.601 min, 97.46%.

Example 58

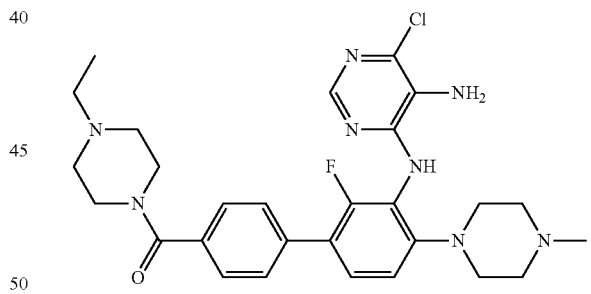

(3"-((5-amino-6-chloropyrimidin-4-yl)amino)-2'-fluoro-4"-(4-methylpiperazin-1-yl)-[1,1'-biphenyl]-4-yl)(4-ethylpiperazin-1-yl)methanone Following the preparation method in Example 54, dimethyl amine was replaced by 1-ethylpiperazine. Yield 64.8%; m.p. 229° C.-232° C.; $^1$H NMR (300 MHz, DMSO-d$_6$) δ 8.05 (s, 1H), 7.71 (s, 1H), 7.57 (d, J=8.2 Hz, 2H), 7.47 (d, J=8.1 Hz, 2H), 7.39 (t, J=8.5 Hz, 2H), 7.00 (d, J=8.7 Hz, 1H), 5.49 (s, 2H), 3.61 (s, 2H), 2.91 (s, 4H), 2.38-2.34 (m, 10H), 2.20 (s, 3H), 1.17 (t, J=7.1 Hz, 2H), 1.01 (t, J=7.1 Hz, 2H). HRMS (ESI): calcd. for m/z $C_{28}H_{34}ClFN_8O$, [M+H]$^+$ 553.2587, found 553.2596. HPLC (80% methanol in water): $t_R$=3.794 min, 97.08%.

Example 59

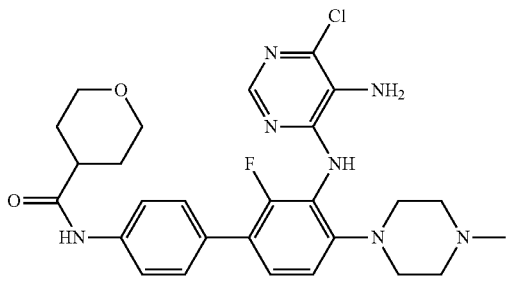 [SMILES: CN1CCN(c2ccc(-c3ccc(NC(=O)C4CCOCC4)cc3)c(F)c2Nc2ncnc(Cl)c2N)CC1]

N-(3''-((5-amino-6-chloropyrimidin-4-yl)amino)-2'-fluoro-4''-(4-methylpiperazin-1-yl)-[1,1'-biphenyl]-4-yl)tetrahydro-2H-pyran-4-carboxamide Step 1: Preparation of 2',4'-difluoro-3'-nitro[1,1'-biphenyl]-4-amine Following the preparation method in Step 1 of Example 23, 4-bromo-1-fluoronitrobenzene was replaced by 1-bromo-2,4-difluoro-3-nitrobenzene. Yield 69.0%; m.p. 136° C.-138° C.; $^1$H NMR (300 MHz, DMSO-d$_6$) δ 7.87-7.83 (m, 1H), 7.24-7.22 (m, 2H), 7.15 (dd, J=9.0, 7.5 Hz, 1H), 6.72-6.70 (m, 2H), 5.24 (s, 2H). m/z (EI-MS): 251.1 [M]$^+$.

Step 2: Preparation of 2'-fluoro-4'-(4-methylpiperazin-1-yl)-3'-nitro[1,1'-biphenyl]-4-amine Following the preparation method in Step 2 of Example 23, methyl 4'-fluoro-3'-nitro-[1,1'-biphenylyl]-4-carboxylate was replaced by 2',4'-difluoro-3'-nitro[1,1'-biphenyl]-4-amine. Yield 88.2%; m.p. 145° C.-147° C.; $^1$H NMR (300 MHz, DMSO-d$_6$) δ δ 7.60 (dd, J=7.4, 5.8 Hz, 1H), 7.25-7.18 (m, 2H), 6.96 (d, J=7.5 Hz, 1H), 6.77-6.71 (m, 2H), 5.24 (s, 2H), 3.20 (t, J=4.6 Hz, 4H), 2.54 (t, J=4.6 Hz, 4H), 2.34 (s, 3H). m/z (EI-MS): 331.2 [M]$^+$.

Step 3: Preparation of N-(2'-fluoro-4'-(4-methylpiperazin-1-yl)-3'-nitro[1,1'-biphenyl]-4-yl)tetrahydro-2H-pyran-4-carboxamide Following a preparation method similar to that in Example 33, N-(4'-amino-4-(4-methylpiperazin-1-yl)-[1,1'-biphenyl]-3-yl)-6-chloropyrimidine-e-4,5-diamine was replaced by 2'-fluoro-4'-(4-methylpiperazin-1-yl)-3'-nitro[1,1'-biphenyl]-4-amine. Yield 88.2%; m.p. 166° C.-168° C.; $^1$H NMR (300 MHz, DMSO-d$_6$) δ 9.52 (s, 1H), 7.63 (dd, J=7.5, 5.7 Hz, 1H), 7.42-7.38 (m, 4H), 6.99 (d, J=7.5 Hz, 1H), 3.95-3.92 (m, 2H), 3.53-3.50 (m, 2H), 3.20 (t, J=4.7 Hz, 4H), 2.54 (t, J=4.7 Hz, 4H), 2.65-2.60 (m, 4H), 2.08-2.01 (m, 2H), 1.83-1.76 (m, 2H). m/z (EI-MS): 443.2 [M]$^+$.

Step 4: Preparation of a Target Product N-(3''-((5-amino-6-chloropyrimidin-4-yl)amino)-2'-fluoro-4''-(4-methylpiperazin-1-yl)-[1,1'-biphenyl]-4-yl)tetrahydro-2H-pyran-4-carboxamide Following a preparation method similar to that in Step 3 and Step 4 of Example 23, a compound 59 was obtained. Yield of three steps: 36.6%; m.p.>250° C.; $^1$H NMR (300 MHz, DMSO-d$_6$) δ 9.56 (s, 1H), 8.25 (s, 1H), 7.80-7.77 (m, 3H), 7.41-7.39 (m, 2H), 7.07 (dd, J=7.5, 5.7 Hz, 1H), 6.68 (d, J=7.3 Hz, 1H), 5.43 (s, 2H), 3.52-3.49 (m, 4H), 3.34 (t, J=4.6 Hz, 4H), 2.70-2.67 (m, 1H), 2.44 (s, 4H), 2.22 (s, 3H), 2.06-1.99 (m, 2H), 1.85-1.78 (m, 2H). HRMS (ESI): calcd. for m/z C$_{27}$H$_{31}$ClFN$_7$O$_2$, [M+H]$^+$ 540.2285, found 540.2276. HPLC (90% methanol in water): t$_R$=3.656 min, 98.94%.

Example 60

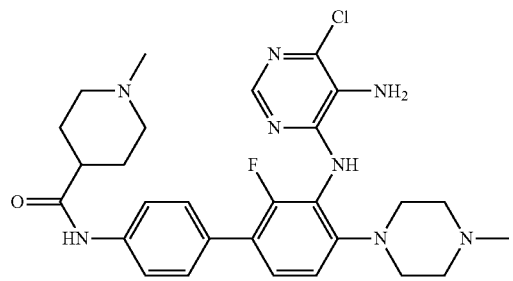 [SMILES: CN1CCC(C(=O)Nc2ccc(-c3ccc(N4CCN(C)CC4)c(Nc4ncnc(Cl)c4N)c3F)cc2)CC1]

N-(3''-((5-amino-6-chloropyrimidin-4-yl)amino)-2'-fluoro-4''-(4-methylpiperazin-1-yl)-[1,1'-biphenyl]-pyridin-4-yl)-1-methylpiperidin-4-carboxamide Step 1: Preparation of N-(2'-fluoro-4'-(4-methylpiperazin-1-yl)-3'-nitro[1,1'-biphenyl]-4-yl)-1-methylpiperidin-4-carboxamide Following the preparation method in Step 3 of Example 59, tetrahydropyran-4-carboxylic acid was replaced by 1-methylpiperazine-4-carboxylic acid. Yield 75.3%; m.p. 170° C.-172° C.; $^1$H NMR (300 MHz, DMSO-d$_6$) δ 9.55 (s, 1H), 7.63 (dd, J=7.5, 5.7 Hz, 1H), 7.40 (s, 4H), 6.98 (d, J=7.5 Hz, 1H), 3.22 (t, J=4.7 Hz, 4H), 2.99-2.93 (m, 6H), 2.64-2.58 (m, 4H), 2.37 (s, 3H), 2.29-2.24 (m, 2H), 2.09-2.02 (m, 2H), 1.71-1.64 (m, 2H). m/z (EI-MS): 455.2 [M]$^+$.

Step 2: Preparation of a Target Product N-(3''-((5-amino-6-chloropyrimidin-4-yl)amino)-2'-fluoro-4''-(4-methylpiperazin-1-yl)-[1,1'-biphenyl]-pyridin-4-yl)-1-methylpiperidin-4-carboxamide Following a preparation method similar to that in Step 3 and Step 4 of Example 23, a compound 60 was obtained. Yield of three steps: 35.3%; m.p.>250° C.; $^1$H NMR (300 MHz, DMSO-d$_6$) δ 9.66 (s, 1H), 8.18 (s, 1H), 7.80 (s, 1H), 7.63 (d, J=7.5, 2H), 7.40 (d, J=7.6, 2H), 7.08-7.05 (m, 1H), 6.61 (d, J=7.5 Hz, 1H), 5.30 (s, 2H), 3.20 (t, J=4.9 Hz, 4H), 3.01-2.96 (m, 6H), 2.63-2.60 (m, 4H), 2.37 (s, 3H), 2.21-2.18 (m, 4H), 2.07-2.02 (m, 4H). HRMS (ESI): calcd. for m/z C$_{28}$H$_{34}$ClFN$_8$O, [M+H]$^+$ 553.2607, found 553.2606. HPLC (80% methanol in water): t$_R$=3.168 min, 97.33%.

Example 61

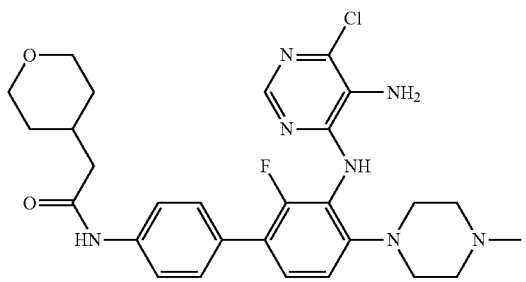 [SMILES: CN1CCN(c2ccc(-c3ccc(NC(=O)CC4CCOCC4)cc3)c(F)c2Nc2ncnc(Cl)c2N)CC1]

N-(3"-((5-amino-6-chloropyrimidin-4-yl)amino)-2'-fluoro-4"-(4-methylpiperazin-1-yl)-[1,1'-biphenyl]-piperidin-4-yl)-2-(tetrahydro-2H-pyran-4-yl)acetamide Step 1: Preparation of N-(2'-fluoro-4'-(4-methylpiperazin-1-yl)-3'-nitro[1,1'-biphenyl]-4-yl)-2-(tetrahydro-2H-pyran-4-yl)acetamide Following Step 3 of Example 59, tetrahydropyran-4-carboxylic acid was replaced by tetrahydropyran-4-ethanoic acid. Yield 68.9%; m.p. 148° C.-150° C.; $^1$H NMR (300 MHz, DMSO-$d_6$) δ 7.80-7.77 (m, 2H), 7.70 (s, 1H), 7.65-7.63 (m, 1H), 7.39 (d, J=7.5 Hz, 2H), 6.94 (d, J=7.5 Hz, 1H), 3.90-3.87 (m, 2H), 3.55-3.51 (m, 2H), 3.24 (t, J=4.7 Hz, 4H), 2.60 (s, 3H), 2.38 (t, J=4.7 Hz, 4H), 2.15 (d, J=7.0 Hz, 2H), 2.05-1.99 (m, 1H), 1.20-1.17 (m, 4H). m/z (EI-MS): 457.2 [M]$^+$.

Step 2: Preparation of a Target Product N-(3"-((5-amino-6-chloropyrimidin-4-yl)amino)-2'-fluoro-4"-(4-methylpiperazin-1-yl)-[1,1'-biphenyl]-piperidin-4-yl)-2-(tetrahydro-2H-pyran-4-yl)acetamide Following a preparation method similar to that in Step 3 and Step 4 of Example 23, a compound 61 was obtained. Yield of three steps: 38.6%; m.p.>250° C.; $^1$H NMR (300 MHz, DMSO-$d_6$) δ 8.24 (s, 1H), 8.11 (s, 1H), 7.80 (s, 1H), 7.40 (s, 4H), 7.15-7.12 (m, 1H), 6.73 (d, J=7.5 Hz, 1H), 5.42 (s, 2H), 3.55-3.50 (m, 4H), 3.53 (t, J=4.6 Hz, 4H), 2.48 (s, 4H), 2.26 (s, 3H), 2.15 (d, J=7.0 Hz, 2H), 2.03-2.01 (m, 1H), 1.70-1.64 (m, 4H). HRMS (ESI): calcd. for m/z $C_{28}H_{33}ClFN_7O_2$, [M+H]$^+$ 554.2441, found 554.2440. HPLC (80% methanol in water): $t_R$=3.524 min, 99.10%.

Example 62

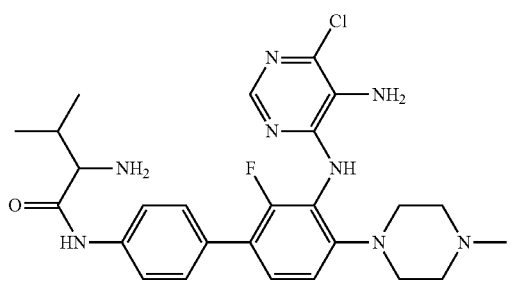 [SMILES: CC(C)C(N)C(=O)Nc1ccc(-c2ccc(N3CCN(C)CC3)c(Nc3ncnc(Cl)c3N)c2F)cc1]

2-amino-N-(3"-((5-amino-6-chloropyrimidin-4-yl)amino)-2'-fluoro-4"-(4-methylpiperazin-1-yl)-[1,1'biphenylyl]-4-yl)-3-methylbutyramide Step 1: Preparation of (1-((2'-fluoro-4'-(4-methylpiperazin-1-yl)-3'-nitro-[1,1'-biphenyl]-4-yl)amino)-3-methyl-t-butyl-1-oxobutan-2-yl)aminocarboxylic Acid Following Step 3 of Example 59, tetrahydropyran-4-carboxylic acid was replaced by (t-butoxylcarbonyl)valine. Yield 69.0%; m.p. 108° C.-110° C.; $^1$H NMR (300 MHz, DMSO-$d_6$) δ 9.63 (s, 1H), 7.64-7.61 (m, 3H), 7.44-7.42 (m, 2H), 7.39 (s, 3H), 6.98 (d, J=7.5 Hz, 1H), 4.13-4.12 (m, 1H), 3.75-3.72 (m, 2H), 3.31-3.27 (m, 2H), 2.79-2.77 (m, 2H), 2.63-2.61 (m, 1H), 2.60 (s, 3H), 2.24-2.22 (m, 2H), 1.44 (s, 9H), 0.94-0.88 (m, 6H). m/z (EI-MS): 530.3 [M]$^+$.

Step 2: Preparation of a Target Product 2-amino-N-(3"-((5-amino-6-chloropyrimidin-4-yl)amino)-2'-fluoro-4"-(4-methylpiperazin-1-yl)-[1,1'biphenylyl]-4-yl)-3-methylbutyramide Following a preparation method similar to that in Step 3 and Step 4 of Example 23, a compound 62 was obtained. Yield of three steps: 46.9%, m.p. 189° C.-192° C.; $^1$H NMR (300 MHz, DMSO-$d_6$) δ 8.00 (s, 1H), 7.74-7.71 (m, 3H), 7.45 (s, 2H), 7.33 (t, J=8.5 Hz, 1H), 6.96 (d, J=7.2 Hz, 1H), 5.47 (s, 2H), 3.15-3.12 (m, 1H), 2.86 (s, 4H), 2.36 (s, 4H), 2.16 (s, 3H), 1.95 (s, 2H), 1.17 (s, 1H), 0.93 (s, 3H), 0.86 (s, 3H). HRMS (ESI): calcd. for m/z $C_{26}H_{32}ClFN_8O$, [M+H]$^+$ 527.2444, found 527.2449. HPLC (80% methanol in water): $t_R$=3.858 min, 99.62%.

Example 63

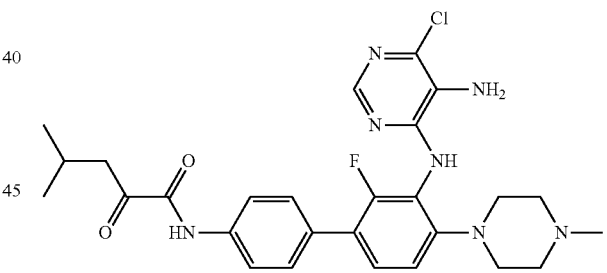

2-amino-N-(3"-((5-amino-6-chloropyrimidin-4-yl)amino)-2'-fluoro-4"-(4-methyl piperazin-1-yl)-[1,1'biphenylyl]-4-yl)-4-methylvaleramide Step 1: Preparation of (1-((2'-fluoro-4'-(4-methylpiperazin-1-yl)-3'-nitro-[1,1'-biphenyl]-4-yl)amino)-4-methyl-t-butyl-1-oxopentan-2-yl)aminocarboxylic Acid Following Step 3 of Example 59, tetrahydropyran-4-carboxylic acid was replaced by (t-butoxylcarbonyl) leucine. Yield 67.2%; m.p. 114° C.-116° C.; $^1$H NMR (300 MHz, DMSO-$d_6$) δ 9.46 (s, 1H), 7.65-7.62 (m, 1H), 7.45-7.42 (m, 4H), 6.95 (d, J=7.5 Hz, 1H), 6.24 (s, 1H), 4.04-4.01 (m, 1H), 3.87-3.82 (m, 2H), 3.31-3.25 (m, 2H), 2.79-2.74 (m, 2H), 2.25-2.19 (m, 4H), 1.98-1.92 (m, 2H), 1.71-1.65 (m, 1H), 1.44 (s, 9H), 0.96-0.90 (m, 6H). m/z (EI-MS): 544.3 [M]$^+$.

Step 2: Preparation of a Target Product 2-amino-N-(3"-((5-amino-6-chloropyrimidin-4-yl)amino)-2'-fluoro-4"-(4-methylpiperazin-1-yl)-[1,1'-biphenylyl]-4-yl)-4-methylvaleramide Following a preparation method similar to that in Step 3 and Step 4 of Example 23, a compound 63 was obtained. Yield of three steps: 47.6%; m.p. 182° C.-185° C.; $^1$H NMR (300 MHz, DMSO-d$_6$) δ 7.99 (s, 1H), 7.73-7.71 (m, 3H), 7.45 (d, J=8.1 Hz, 2H), 7.33 (t, J=8.5 Hz, 2H), 6.96 (d, J=8.6 Hz, 2H), 5.45 (s, 2H), 3.38-3.36 (m, 1H), 2.87 (s, 4H), 2.36 (s, 4H), 2.17 (s, 3H), 1.78-1.74 (m, 2H), 1.52-1.47 (m, 2H), 1.19-1.17 (m, 1H), 0.90 (t, J=7.2 Hz, 6H). m/z (EI-MS): 541.3 [M]$^+$. HPLC (80% methanol in water): $t_R$=3.680 min, 98.32%.

Example 64

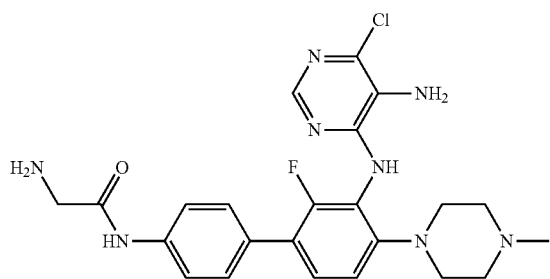 [SMILES: CN1CCN(c2ccc(-c3ccc(NC(=O)CN)cc3)c(F)c2Nc2ncnc(Cl)c2N)CC1]

2-amino-N-(3"-((5-amino-6-chloropyrimidin-4-yl)amino)-2'-fluoro-4"-(4-methylpiperazin-1-yl)-[1,1'biphenylyl]-4-yl)acetamide Step 1: Preparation of (2-((2'-fluoro-4'-(4-methylpiperazin-1-yl)-3'-nitro-[1,1'-biphenyl]-4-yl)amino)-2-oxoethyl-t-butyl)aminocarboxylate Following Step 3 of Example 59, tetrahydropyran-4-carboxylic acid was replaced by (t-butoxylcarbonyl)glycine. Yield 70.0%; m.p. 112° C.-114° C.; $^1$H NMR (300 MHz, DMSO-d$_6$) δ 8.20 (s, 1H), 7.63 (dd, J=7.5, 5.7 Hz, 1H), 7.49-7.47 (m, 2H), 7.44-7.42 (m, 2H), 6.94 (d, J=7.5 Hz, 1H), 6.31 (s, 1H), 3.89 (s, 2H), 3.30 (t, J=4.7 Hz, 4H), 2.44 (s, 4H), 2.24 (s, 3H), 1.44 (s, 9H). m/z (EI-MS): 486.2 [M]$^+$.

Step 2: Preparation of a Target Product 2-amino-N-(3"-((5-amino-6-chloropyrimidin-4-yl)amino)-2'-fluoro-4"-(4-methylpiperazin-1-yl)-[1,1'biphenylyl]-4-yl)acetamide Following a preparation method similar to that in Step 3 and Step 4 of Example 23, a compound 64 was obtained. Yield of three steps: 50.9%; m.p. 177° C.-179° C.; $^1$H NMR (300 MHz, DMSO-d$_6$) δ 7.88 (s, 1H), 7.63-7.61 (m, 3H), 7.36 (d, J=8.2 Hz, 2H), 7.24 (t, J=8.5 Hz, 2H), 6.87 (d, J=8.5 Hz, 2H), 5.35 (s, 2H), 4.00 (s, 1H), 3.08 (s, 2H), 2.77 (t, J=4.7 Hz, 4H), 2.27 (t, J=4.6 Hz, 4H), 2.07 (s, 3H). m/z (EI-MS): 485.3 [M]$^+$. HPLC (80% methanol in water): $t_R$=3.595 min, 99.76%.

Example 65

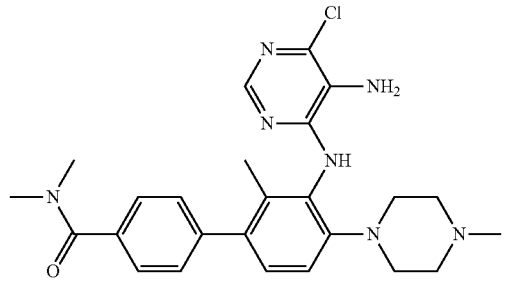

3"-((5-amino-6-chloropyrimidin-4-yl)amino)-N,N,2'-trimethyl-4"-(4-methylpiperazin-1-yl)-[1,1'-biphenyl]-4-carboxamide Step 1: Preparation of 1-bromo-4-fluoro-2-methyl-3-nitrobenzene Following the preparation method in Step 1 of Example 54, 2,6-difluoronitrobenzene was replaced by 1-bromo-2,4-difluoro-3-nitrobenzene. Yield 86.7%; m.p. 74° C.-77° C.; $^1$H NMR (300 MHz, CDCl$_3$) δ 7.72 (d, J=7.5, Hz, 1H), 7.03 (d, J=7.5 Hz, 1H), 2.32 (s, 3H). m/z (EI-MS): 233.9 [M]$^+$ Step 2: Preparation of 4'-fluoro-N,N,2'-trimethyl-3'-nitro-[11,1'-biphenyl]-4-carboxamide Following the preparation method in Step 2 of Example 54, (4-(methoxylcarbonyl)phenyl)boric acid was replaced by (4-(dimethylaminoformoxyl)phenyl)boric acid. Yield 76.9%; $^1$H NMR (300 MHz, CDCl$_3$) δ 7.89-7.86 (m, 2H), 7.76 (d, J=7.5, Hz, 1H), 7.51-7.49 (m, 2H), 7.26 (d, J=7.5 Hz, 1H), 3.03 (s, 6H), 2.30 (s, 3H). m/z (EI-MS): 303.1 [M]$^+$.

Step 3: Preparation of N,N,2'-trimethyl-4'-(4-methylpiperazin-1-yl)-3'-nitro[1,1'-biphenyl]-4-carboxamide Following the preparation method in Step 3 of Example 54, methyl 4'-fluoro-3'-nitro-[1,1'-biphenylyl]-4-carboxylate was replaced by 4'-fluoro-N,N,2'-trimethyl-3'-nitro-[1,1'-biphenyl]-4-carboxamide. Yield 85.5%; m.p. 110° C.-112° C.; $^1$H NMR (300 MHz, DMSO-d$_6$) δ 7.91 (d, J=5.7 Hz, 2H), 7.60-7.57 (m, 3H), 7.04 (d, J=5.6 Hz, 1H), 3.39 (t, J=4.7 Hz, 4H), 3.03 (s, 6H), 2.54 (t, J=4.6 Hz, 4H), 2.34 (s, 3H), 2.17 (s, 3H). m/z (EI-MS): 383.2 [M]$^+$.

Step 4: Preparation of 3'-amino-N,N,2'-trimethyl-4'-(4-methylpiperazin-1-yl)-[1,1'-biphenyl]-4-carboxamide Following the preparation method in Step 4 of Example 54, methyl 4'-(4-methylpiperazin-1-yl)-3'-nitro-[1,1'-biphenyl]-4-carboxylate was replaced by N,N, 2'-trimethyl-4'-(4-methylpiperazin-1-yl)-3'-nitro[1,1'-biphenyl]-4-carboxamide. Yield 80.5%; m.p. 158° C.-160° C.; $^1$H NMR (300 MHz, DMSO-d$_6$) δ 7.91-7.89 (m, 2H), 7.61-7.59 (m, 2H), 6.68-6.64 (m, 2H), 4.35 (s, 2H), 3.39 (t, J=4.7 Hz, 4H), 3.03 (s, 6H), 2.54 (s, 4H), 2.14 (s, 3H), 2.09 (s, 3H). m/z (EI-MS): 353.2 [M]$^+$.

Step 5: Preparation of a Target Product 3"-((5-amino-6-chloropyrimidin-4-yl)amino)-N,N,2'-trimethyl-4"-(4-methylpiperazin-1-yl)-[1,1'-biphenyl]-4-carboxamide Following the preparation method in Step 5 of Example 54, a compound 65 was obtained. Yield 44.5%; m.p. 165° C.-167° C.; $^1$H NMR (300 MHz, DMSO-d$_6$) δ 8.09 (s, 1H), 7.87-7.85 (m, 2H), 7.80 (s, 1H), 7.58 (d, J=7.4 Hz, 2H), 7.10 (d, J=7.5 Hz, 1H), 6.86 (d, J=7.5 Hz, 1H), 5.49 (s, 2H), 3.01-2.98 (m, 6H), 2.87 (s, 4H), 2.38 (s, 4H), 2.18 (s, 3H), 2.09 (s, 3H). m/z (EI-MS): 480.2 [M]$^+$. HPLC (80% methanol in water): t$_R$=3.543 min, 96.37%.

Example 66

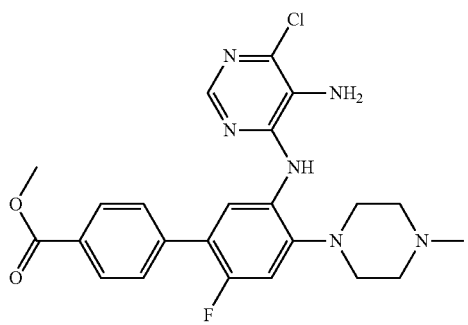 [SMILES: COC(=O)c1ccc(-c2cc(Nc3ncnc(Cl)c3N)c(N3CCN(C)CC3)cc2F)cc1]

Methyl 5'-((5-amino-6-chloropyrimidin-4-yl)amino)-2'-fluoro-4'-(4-methylpiperazin-1-yl)-[1,1'-biphenyl]-4-carboxylate Step 1: Preparation of methyl 2',4'-difluoro-5'-nitro-[1,1'-biphenyl]-4-carboxylate Following the preparation method in Step 1 of Example 23, 4-bromo-1-fluoronitrobenzene was replaced by 1-bromo-2,4-difluoro-5-nitrobenzene. Yield 67.8%; m.p. 134° C.-136° C.; $^1$H NMR (300 MHz, CDCl$_3$) δ 8.30 (t, J=5.7 Hz, 1H), 7.97 (d, J=8.9 Hz, 2H), 7.57 (d, J=5.8 Hz, 2H), 7.24 (t, J=8.9 Hz, 1H), 3.95 (s, 3H). m/z (EI-MS): 294.1 [M]$^+$.

Step 2: Preparation of methyl 2'-fluoro-4'-(4-methylpiperazin-1-yl)-5'-nitro-[1,1'-biphenyl]-4-carboxylate Following the preparation method in Step 2 of Example 23, methyl 4'-fluoro-3'-nitro-[1,1'-biphenylyl]-4-carboxylate was replaced by methyl 2',4'-difluoro-5'-nitro-[1,1'-biphenyl]-4-carboxylate. Yield 84.3%; m.p. 137° C.-140° C.; $^1$H NMR (300 MHz, DMSO-d$_6$) δ 8.02-7.99 (m, 3H), 7.68-7.65 (m, 2H), 6.79 (d, J=7.5 Hz, 1H), 3.95 (s, 3H), 3.39 (t, J=4.7 Hz, 4H), 2.54 (t, J=4.6 Hz, 4H), 2.14 (s, 3H). m/z (EI-MS): 374.1 [M]$^+$.

Step 3: Preparation of methyl 5'-amino-2'-fluoro-4'-(4-methylpiperazin-1-yl)-[1,1'-biphenyl]-4-carboxylate Following the preparation method in Step 3 of Example 23, methyl 4'-(4-methylpiperazin-1-yl)-3'-nitro-[1,1'-biphenyl]-4-carboxylate was replaced by methyl 2'-fluoro-4'-(4-methylpiperazin-1-yl)-5'-nitro-[1,1'-biphenyl]-4-carboxylate. Yield 80.6%; m.p. 162° C.-165° C.; $^1$H NMR (300 MHz, DMSO-d$_6$) δ 8.00 (d, J=8.9 Hz, 2H), 7.68 (d, J=8.8 Hz, 2H), 6.56 (d, J=5.7 Hz, 1H), 6.39 (d, J=8.9 Hz, 1H), 4.35 (s, 2H), 4.35 (s, 2H), 3.95 (s, 3H), 3.39 (t, J=4.7 Hz, 4H), 2.54 (t, J=4.7 Hz, 4H), 2.17 (s, 3H). m/z (EI-MS): 344.2 [M]$^+$.

Step 4: Preparation of a Target Product methyl 5'-((5-amino-6-chloropyrimidin-4-yl)amino)-2'-fluoro-4'-(4-methylpiperazin-1-yl)-[1,1'-biphenyl]-4-carboxylate Following a preparation method similar to that in Step 4 of Example 23, a compound 66 was obtained. Yield 57.4%; m.p. 220° C.-223° C.; $^1$H NMR (300 MHz, DMSO-d$_6$) δ 8.14 (s, 1H), 8.02-7.99 (m, 2H), 7.80 (s, 1H), 7.66-7.64 (m, 2H), 6.80 (d, J=5.7 Hz, 1H), 6.56 (d, J=8.9 Hz, 1H), 5.35 (s, 2H), 3.95 (s, 3H), 3.34 (t, J=4.7 Hz, 4H), 2.57 (t, J=4.7 Hz, 4H), 2.19 (s, 3H). HRMS (ESI): calcd. for m/z C$_{23}$H$_{24}$ClFN$_6$O$_2$, [M+H]$^+$ 471.1706, found 471.1706. HPLC (80% methanol in water): t$_R$=4.248 min, 98.83%.

Example 67

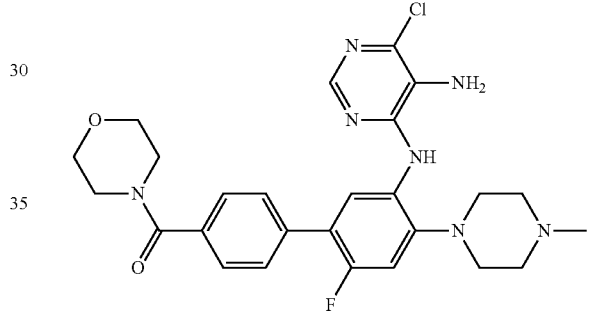

(5"-((5-amino-6-chloropyrimidin-4-yl)amino)-2'-fluoro-4"-(4-methylpiperazin-1-yl)-[1,1'-biphenyl]-4-yl)(morpholino)methanone Step 1: Preparation of 5"-((5-amino-6-chloropyrimidin-4-yl)amino)-2'-fluoro-4"-(4-methylpiperazin-1-yl)-[1,1'-biphenyl]-4-carboxylic Acid Following the preparation method in Step 5 of Example 23, methyl 3'-((5-amino-6-chloropyrimidin-4-yl)amino)-4'-(4-methylpiperazin-1-yl)-[1,1'-biphenylyl]-4-carboxylate was replaced by methyl 5'-((5-amino-6-chloropyrimidin-4-yl)amino)-2'-fluoro-4'-(4-methylpiperazin-1-yl)-[1,1'-biphenyl]-4-carboxylate. Yield 82.7%; m.p.>250° C.; $^1$H NMR (300 MHz, DMSO-d$_6$) δ 8.14-8.10 (m, 3H), 7.80 (s, 1H), 7.73-7.70 (m, 2H), 6.80 (d, J=5.7 Hz, 1H), 6.57 (d, J=8.9 Hz, 1H), 5.34 (s, 2H), 3.93 (s, 3H), 3.34 (t, J=4.7 Hz, 4H), 2.57 (s, 4H), 2.12 (s, 3H). m/z (EI-MS): 457.2 [M]$^+$.

Step 2: Preparation of a Target Product (5"-((5-amino-6-chloropyrimidin-4-yl)amino)-2'-fluoro-4"-(4-methylpiperazin-1-yl)-[1,1'-biphenyl]-4-yl)(morpholino)methanone Following a preparation method similar to that in Step 6 of Example 23, a target compound 67 was obtained. Yield 78.4%; m.p. 136° C.-138° C.; $^1$H NMR (300 MHz, DMSO-$d_6$) δ 8.09 (s, 1H), 7.93 (d, J=8.7 Hz, 1H), 7.82 (s, 1H), 7.59 (s, 2H), 7.51 (d, J=7.8 Hz, 2H), 7.12 (d, J=8.6 Hz, 1H), 5.40 (s, 2H), 3.61 (s, 4H), 2.97 (s, 4H), 2.72 (s, 4H), 2.54-2.51 (m, 4H), 2.41 (s, 3H). HRMS (ESI): calcd. for m/z $C_{26}H_{29}ClFN_7O_2$, [M+H]$^+$ 526.2128, found 526.2130. HPLC (80% methanol in water): $t_R$=4.046 min, 96.85%.

Example 68

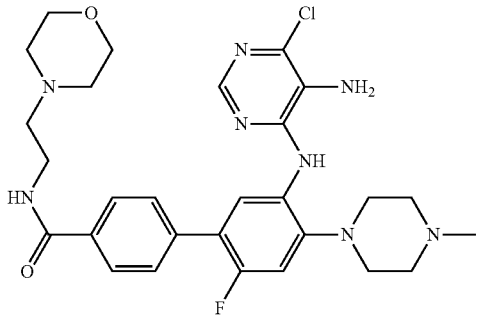 [SMILES: CN1CCN(c2cc(F)c(-c3ccc(C(=O)NCCN4CCOCC4)cc3)cc2Nc2ncnc(Cl)c2N)CC1]

5"-((5-amino-6-chloropyrimidin-4-yl)amino)-2'-fluoro-4"-(4-methylpiperazin-1-yl)-N-(2-morpholinoethyl)-[1,11,1'-terphenyl]-4-carboxamide Following a preparation method similar to that in Example 67, morpholine was replaced by 1-ethylmorpholine, to obtain a target compound 68. Yield 78.4%; m.p. 199° C.-202° C.; $^1$H NMR (300 MHz, DMSO-$d_6$) δ 8.47 (s, 1H), 8.09 (s, 1H), 7.95-7.92 (m, 3H), 7.81 (s, 1H), 7.62 (d, J=7.9 Hz, 2H), 7.11 (d, J=12.4 Hz, 1H), 5.39 (s, 2H), 3.58 (t, J=4.6 Hz, 4H), 3.41-3.40 (m, 4H), 2.92 (s, 4H), 2.56 (s, 4H), 2.45 (s, 4H), 2.29 (s, 3H). HRMS (ESI): calcd. for m/z $C_{28}H_{34}ClFN_8O_2$, [M+H]$^+$ 569.2550, found 569.2548. HPLC (80% methanol in water): $t_R$=4.049 min, 98.64%.

Example 69

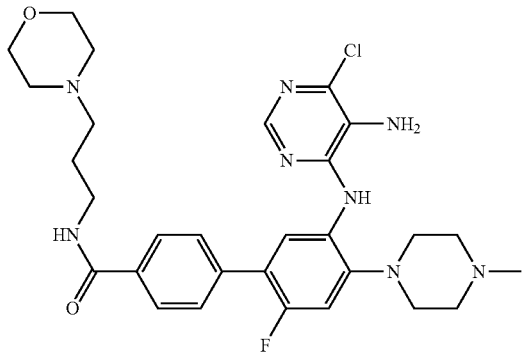 [SMILES: CN1CCN(c2cc(F)c(-c3ccc(C(=O)NCCCN4CCOCC4)cc3)cc2Nc2ncnc(Cl)c2N)CC1]

5"-((5-amino-6-chloropyrimidin-4-yl)amino)-2'-fluoro-4"-(4-methylpiperazin-1-yl)-N-(3-morpholinopropyl)-[1,11,1'-terphenyl]-4-carboxamide Following a preparation method similar to that in Example 67, morpholine was replaced by 1-propylmorpholine, to obtain a target product 69. Yield 78.4%; m.p. 204° C.-206° C.; $^1$H NMR (300 MHz, DMSO-$d_6$) δ 8.55 (s, 1H), 8.09 (s, 1H), 7.93-7.90 (m, 3H), 7.81 (s, 1H), 7.63-7.60 (m, 2H), 7.11 (d, J=12.3 Hz, 1H), 5.39 (s, 2H), 3.59 (s, 4H), 3.32 (s, 4H), 2.92 (s, 4H), 2.58 (s, 4H), 2.41 (s, 4H), 2.31 (s, 3H), 1.72 (s, 2H). HRMS (ESI): calcd. for m/z $C_{29}H_{36}ClFN_8O_2$, [M+H]$^+$ 583.2693, found 583.2699. HPLC (80% methanol in water): $t_R$=3.885 min, 99.38%.

Example 70

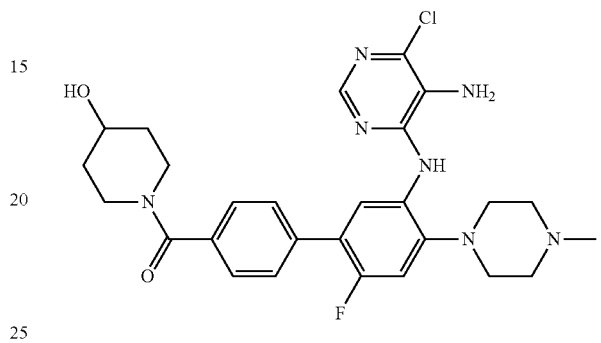

5"-((5-amino-6-chloropyrimidin-4-yl)amino)-2'-fluoro-N-(4-hydroxylcyclohexyl)-4"-(4-methylpiperazin-1-yl)-[1,11,1'-terphenyl]-4-carboxamide Following a preparation method similar to that in Example 67, morpholine was replaced by piperidin-4-ol, to obtain a target compound 70. Yield 65.2%; m.p. 200° C.-203° C.; $^1$H NMR (300 MHz, DMSO-$d_6$) δ 9.67 (s, 1H), 8.06 (s, 1H), 7.92 (d, J=8.4 Hz, 1H), 7.82 (s, 1H), 7.58 (d, J=7.7 Hz, 2H), 7.47 (d, J=7.9 Hz, 2H), 7.21 (d, J=12.2 Hz, 1H), 5.44 (s, 2H), 4.82 (s, 1H), 4.01 (s, 2H), 3.52 (s, 2H), 3.16 (s, 8H), 2.78 (s, 3H), 1.76 (s, 2H), 1.36 (s, 2H). HRMS (ESI): calcd. for m/z $C_{27}H_{31}ClFN_7O_2$, [M+H]$^+$ 554.2441, found 554.2442. HPLC (80% methanol in water): $t_R$=4.057 min, 98.48%.

Example 71

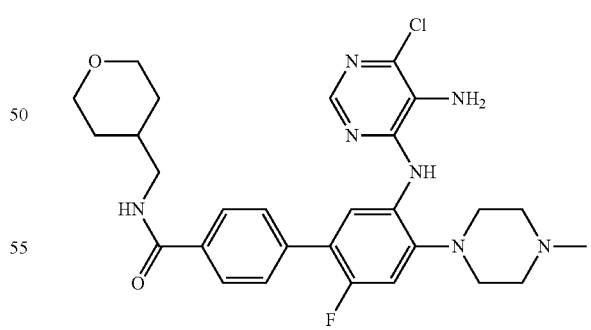

5"-((5-amino-6-chloropyrimidin-4-yl)amino)-2'-fluoro-4"-(4-methylpiperazin-1-yl)-N-((tetrahydro-2H-pyran-4-yl)methyl)-[1,1'-biphenylyl]-4-carboxamide Following a preparation method similar to that in Example 67, morpholine was replaced by (tetrahydro-2H- pyran-4-yl)methylamine, to obtain a target compound 71. Yield 75.2%; m.p. 189° C.-191° C.; $^1$H NMR (300 MHz, DMSO-d$_6$) δ 8.54 (s, 1H), 8.10 (s, 1H), 7.94-7.91 (m, 3H), 7.61 (d, J=8.0 Hz, 2H), 7.11 (d, J=12.2 Hz, 1H), 5.40 (s, 2H), 3.87-3.83 (m, 2H), 3.17 (s, 4H), 2.92 (s, 4H), 2.57 (s, 4H), 2.30 (s, 3H), 1.81 (s, 1H), 1.23 (s, 4H). HRMS (ESI): calcd. for m/z C$_{28}$H$_{33}$ClFN$_7$O$_2$, [M+H]$^+$ 540.2285, found 540.2284. HPLC (100% methanol): t$_R$=7.989 min, 99.16%.

Example 72

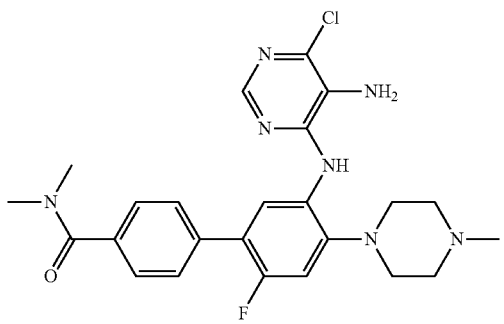

5"-((5-amino-6-chloropyrimidin-4-yl)amino)-2'-fluoro-N,N-dimethyl-4"-(4-meth ylpiperazin-1-yl)-[1,1'-biphenyl]-4-carboxamide Following a preparation method similar to that in Example 67, morpholine was replaced by dimethyl amine, to obtain a target compound 72. Yield 75.2%; m.p. 157° C.-159° C.; $^1$H NMR (300 MHz, DMSO-d$_6$) δ 8.01 (s, 1H), 7.83 (dd, J=8.7, 3.7 Hz, 1H), 7.72 (d, J=3.6 Hz, 1H), 7.49 (d, J=7.1 Hz, 2H), 7.45-7.36 (m, 2H), 7.14-7.01 (m, 1H), 5.35 (s, 2H), 3.27-2.87 (m, 14H), 2.40 (s, 3H). HRMS (ESI): calcd. for m/z C$_{24}$H$_{27}$ClFN$_7$O, [M+H]$^+$ 484.2022, found 484.2022. HPLC (80% methanol in water): t$_R$=4.751 min, 95.34%.

Example 73

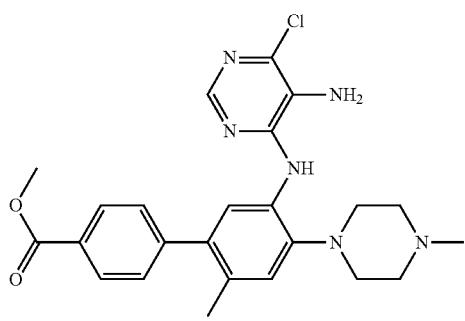 [SMILES: COC(=O)c1ccc(-c2cc(Nc3ncnc(Cl)c3N)c(N3CCN(C)CC3)cc2C)cc1]

Methyl 5'-((5-amino-6-chloropyrimidin-4-yl)amino)-2'-methyl-4'-(4-methylpiperazin-1-yl)-[1,1'-biphenyl]-4-carboxylate Step 1: Preparation of methyl 4'-fluoro-2'-methyl-5'-nitro-[11,1'-biphenylyl]-4-carboxylate Following the preparation method in Step 1 of Example 23, 4-bromo-1-fluoronitrobenzene was replaced by 1-bromo-4-fluoro-2-methyl-5-nitrobenzene. Yield 68.9%; m.p. 133° C.-134° C.; $^1$H NMR (300 MHz, DMSO-d$_6$) δ 8.06 (dd, J=9.4, 3.2 Hz, 2H), 7.97 (d, J=7.7 Hz, 1H), 7.62-7.57 (m, 3H), 3.89 (s, 3H), 2.33 (s, 3H). m/z (EI-MS): 290.1 [M]$^+$.

Step 2: Preparation of methyl 2'-methyl-4'-(4-methylpiperazin-1-yl)-5'-nitro-[1,1'-biphenyl]-4-carboxylate Following the preparation method in Step 2 of Example 23, methyl 4'-fluoro-3'-nitro-[1,1'-biphenylyl]-4-carboxylate was replaced by methyl 4'-fluoro-2'-methyl-5'-nitro-[1,1'-biphenylyl]-4-carboxylate. Yield 84.3%; m.p. 153° C.-155° C.; $^1$H NMR (300 MHz, DMSO-d$_6$) δ 8.02-7.99 (m, 2H), 7.84 (s, 1H), 7.61-7.58 (m, 2H), 7.09 (s, 1H), 3.95 (s, 3H), 3.39 (t, J=4.7 Hz, 4H), 2.54 (t, J=4.6 Hz, 4H), 2.32 (d, J=1.0 Hz, 3H), 2.14 (s, 3H). m/z (EI-MS): 370.1 [M]$^+$.

Step 3: Preparation of methyl 5'-amino-2'-methyl-4'-(4-methylpiperazin-1-yl)-[1,1'-biphenyl]-4-carboxylate Following the preparation method in Step 3 of Example 23, methyl 4'-(4-methylpiperazin-1-yl)-3'-nitro-[1,1'-biphenyl]-4-carboxylate was replaced by methyl 2'-methyl-4'-(4-methylpiperazin-1-yl)-5'-nitro-[1,1'-biphenyl]-4-carboxylate. Yield 78.5%; m.p. 158° C.-160° C.; $^1$H NMR (300 MHz, DMSO-d$_6$) δ 8.00 (d, J=8.9 Hz, 2H), 7.68 (d, J=8.8 Hz, 2H), 6.56 (d, J=5.7 Hz, 1H), 6.39 (d, J=8.9 Hz, 1H), 4.35 (s, 2H), 4.35 (s, 2H), 3.95 (s, 3H), 3.39 (t, J=4.7 Hz, 4H), 2.54 (t, J=4.7 Hz, 4H), 2.17 (s, 3H). m/z (EI-MS): 340.2 [M]$^+$.

Step 4: Preparation of a target compound methyl 5'-((5-amino-6-chloropyrimidin-4-yl)amino)-2'-methyl-4'-(4-methylpiperazin-1-yl)-[1,1'-biphenyl]-4-carboxylate Following the preparation method in Step 4 of Example 23, methyl 3'-amino-4'-(4-methylpiperazin-1-yl)-[1,1'-biphenylyl]-4-carboxylate was replaced by methyl 5'-amino-2'-methyl-4'-(4-methylpiperazin-1-yl)-[1,1'-biphenyl]-4-carboxylate. Yield 45.9%; m.p. 225° C.-228° C.; $^1$H NMR (300 MHz, DMSO-d$_6$) δ 8.14 (s, 1H), 8.00 (d, J=7.7 Hz, 2H), 7.80 (d, J=4.4 Hz, 2H), 7.50-7.47 (m, 2H), 7.08 (s, 1H), 5.30 (s, 2H), 2.86 (d, J=5.5 Hz, 4H), 2.47 (s, 4H), 2.22 (d, J=8.0 Hz, 6H). HRMS (ESI): calcd. for m/z C$_{24}$H$_{27}$ClN$_6$O$_2$, [M+H]$^+$ 467.1957, found 467.1953. HPLC (80% methanol in water): t$_R$=3.844 min, 97.34%.

Example 74

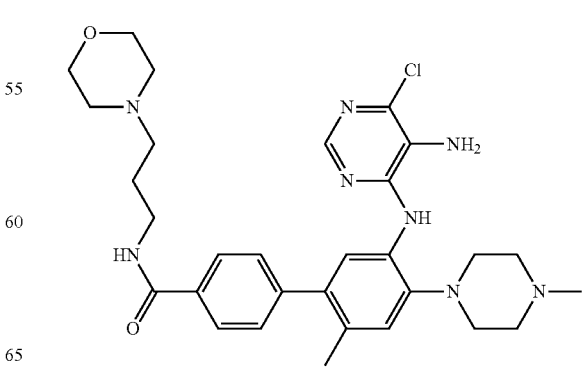

5"-((5-amino-6-chloropyrimidin-4-yl)amino)-2'-methyl-4"-(4-methylpiperazin-1-yl)-N-(3-morpholinopropyl)-[1,11,1'-terphenyl]-4-carboxamide Step 1: Preparation of 5"-((5-amino-6-chloropyrimidin-4-yl)amino)-2'-methyl-4"-(4-methylpiperazin-1-yl)-[1,1'-biphenyl]-4-carboxylic Acid Following the preparation method in Step 5 of Example 23, methyl 3'-((5-amino-6-chloropyrimidin-4-yl)amino)-4'-(4-methylpiperazin-1-yl)-[1,1'-biphenylyl]-4-carboxylate was replaced by methyl 5"-((5-amino-6-chloropyrimidin-4-yl)amino)-2'-methyl-4"-(4-methylpiperazin-1-yl)-[1,1'-biphenyl]-4-carboxylate. Yield 79.4%; m.p.>250° C.; $^1$H NMR (300 MHz, DMSO-d$_6$) δ 8.13-8.10 (m, 3H), 7.80 (s, 1H), 7.66-7.62 (m, 2H), 6.85 (s, 1H), 6.77 (s, 1H), 5.30 (s, 2H), 2.98 (d, J=5.1 Hz, 4H), 2.47 (s, 4H), 2.24 (d, J=8.0 Hz, 6H). m/z (EI-MS): 453.2 [M]$^+$.

Step 2: Preparation of a Target Compound 5"-((5-amino-6-chloropyrimidin-4-yl)amino)-2'-methyl-4"-(4-methylpiperazin-1-yl)-N-(3-morpholinopropyl)-[1,11,1'-terphenyl]-4-carboxamide Following a preparation method similar to that in Example 67, a compound 74 was obtained. Yield 78.4%; m.p. 204° C.-206° C.; $^1$H NMR (300 MHz, DMSO-d$_6$) δ 8.65 (s, 1H), 8.10 (s, 1H), 7.93-7.90 (m, 3H), 7.80 (s, 1H), 7.66-7.62 (m, 2H), 7.11 (d, J=12.3 Hz, 1H), 5.39 (s, 2H), 3.59 (s, 4H), 3.32 (s, 4H), 2.92 (s, 4H), 2.58 (s, 4H), 2.41 (s, 4H), 2.31 (s, 6H), 1.72 (s, 2H). HRMS (ESI): calcd. for m/z C$_{20}$H$_{39}$ClN$_8$O$_2$, [M+H]$^+$ 579.2944, found 579.2950. HPLC (80% methanol in water): t$_R$=3.830 min, 98.82%.

Test Example 1: Some Pharmacodynamic Tests and Results

In the present disclosure, a fluorescent molecular probe was constructed based on a MLL1 peptide fragment binding to WDR5, for use as a method for study on an aniline compound interfering with WDR5 protein-protein interaction, to determine an inhibition rate of the aniline compound at various concentrations, and then compute the IC$_{50}$ value. Specific experimental steps: 20 μL of WDR5 protein, 20 μL of a fluorescent probe, and 20 μL of a compound of different concentration gradients were added to a 384-well plate respectively. After incubation for 0.5 hrs, the fluorescence was read on a multifunctional microplate reader at an excitation wavelength of 485 nm and an emission wavelength of 535 nm, to compute the mP value. The inhibition rate was computed as per the formula below, and then the IC$_{50}$ value was computed using GraphPad software. The results are shown in Table 1.

$$\text{Inhibition rate} = \frac{mP \text{ value of compound group} - mP \text{ value of blank group}}{mP \text{ value of negative control group} - mP \text{ value of blank group}} \times 100\%$$

Interfering with the WDR5 protein-protein interaction will affect the H3K4 methyltransferase activity of MLL1, thereby down-regulating the expression of Hox and Meis-1 genes and inhibiting the proliferation of leukemia cells.

A biphenyl compound DDO-2084 is a micromolecular inhibitor that has been reported to be capable of inhibiting WDR5 protein-protein interaction (Eur. J. Med. Chem. 2016, 124, 480-489). In the present disclosure, DDO-2084 is used as a positive control compound.

TABLE 1

Activity of the Compound of the Present Disclosure in Inhibiting WDR5 Protein-Protein Interaction and Methyltransferase Activity

| Example compound No[a] | MLL1-WDR5 PPI inhibiting activity IC$_{50}$ (μM) | Whether the methylation level of H3K4 was inhibited |
|---|---|---|
| 2 | 10.3 | ND[c] |
| 7 | 2.66 | ND[c] |
| 23 | 0.186 | Yes |
| 24 | 0.183 | Yes |
| 25 | 0.165 | Yes |
| 26 | 0.36 | Yes |
| 27 | 0.217 | Yes |
| 28 | 0.270 | Yes |
| 29 | 0.370 | Yes |
| 30 | 0.310 | Yes |
| 31 | 0.46 | Yes |
| 32 | 0.691 | Yes |
| 33 | 0.489 | Yes |
| 34 | 0.287 | Yes |
| 35 | 0.372 | Yes |
| 36 | 0.261 | Yes |
| 37 | 5.55 | Yes |
| 38 | 0.652 | Yes |
| 39 | 0.675 | Yes |
| 40 | 0.328 | Yes |
| 41 | 0.329 | Yes |
| 42 | 1.56 | ND[c] |
| 43 | 11.43 | ND[c] |
| 44 | 5.707 | ND[c] |
| 45 | 0.56 | Yes |
| 46 | 0.865 | Yes |
| 47 | 0.24 | Yes |
| 48 | 1.09 | ND[c] |
| 49 | 1.25 | ND[c] |
| 50 | 0.164 | Yes |
| 51 | 0.86 | Yes |
| 52 | 1.56 | ND[c] |
| 53 | 1.61 | ND[c] |
| 54 | 0.24 | Yes |
| 55 | 0.117 | Yes |
| 56 | 0.102 | Yes |
| 57 | 0.069 | Yes |
| 58 | 0.112 | Yes |
| 59 | 0.176 | Yes |
| 60 | 0.105 | Yes |
| 61 | 0.085 | Yes |
| 62 | 0.034 | Yes |
| 63 | 0.025 | Yes |
| 64 | 0.033 | Yes |
| 65 | 0.671 | ND[c] |
| 66 | 0.040 | Yes |
| 67 | 0.036 | Yes |
| 68 | 0.074 | Yes |
| 69 | 0.021 | Yes |
| 70 | 0.033 | Yes |
| 71 | 0.036 | Yes |
| 72 | 0.029 | Yes |
| 73 | 0.316 | Yes |
| 74 | 0.465 | Yes |
| DDO-2084[b] | 338.2 | Yes |

[a]The structure of the compound is as shown in specific examples;
[b]the structure of DDO-2084:

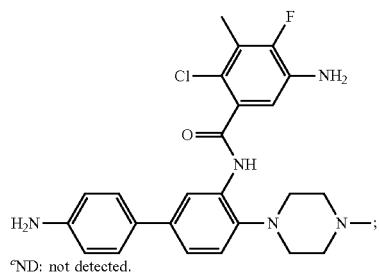

<sup>c</sup>ND: not detected.

As can be seen from Table 1, the compound of the present disclosure has a potent activity in inhibiting WDR5 protein-protein interaction. Table 1 shows the experimental results regarding whether some of the compounds of the present disclosure have the effect of inhibiting the methylation level of H3K4. The experimental results show that the compounds of the present disclosure that have an inhibitory effect on the WDR5 protein-protein interaction can all down-regulate the methylation level of H3K4.

Some compounds of the present disclosure have also been tested for the antiproliferative activity against leukemia cells. Table 2 shows the results for evaluating the activity of some compounds of the present disclosure in inhibiting the proliferation of acute leukemia cells, in which MV4-11 is human acute mononuclear leukemia cells, and Molm-13 is human acute myeloid leukemia cells. Table 2 shows that the compounds of the present disclosure have the effect of significantly inhibiting the proliferation of various leukemia cells.

TABLE 2

Anti-proliferative Activity of Some Compounds of the Present Disclosure against Leukemia Cells

| Example compound No[a] | $GI_{50}/\mu M$ (MV-411) | $GI_{50}/$ $\mu M$(Molm-13) | Example compound No[a] | $GI_{50}/$ $\mu M$(MV-411) | $GI_{50}/$ $\mu M$(Molm-13) |
|---|---|---|---|---|---|
| 23 | 16.67 | 23.41 | 50 | 29.61 | 35.48 |
| 24 | 11.00 | 17.64 | 51 | 37.95 | 38.95 |
| 25 | 24.90 | 20.83 | 54 | 17.48 | 16.16 |
| 26 | 48.62 | 30.73 | 55 | 22.49 | 28.87 |
| 27 | 39.24 | 33.96 | 56 | 9.037 | 8.43 |
| 28 | 29.67 | 24.31 | 57 | 22.28 | 17.62 |
| 29 | 16.56 | 18.17 | 58 | 19.47 | 20.30 |
| 30 | 27.29 | 32.64 | 59 | 26.43 | 31.23 |
| 31 | 10.50 | 18.78 | 60 | 22.73 | 22.60 |
| 32 | 40.01 | 27.19 | 61 | 21.05 | 20.53 |
| 33 | 25.86 | 22.72 | 62 | 17.40 | 21.98 |
| 34 | 23.20 | 20.76 | 63 | 19.65 | 19.36 |
| 35 | 2.07 | 6.164 | 64 | 20.45 | 28.64 |
| 36 | 9.32 | 12.49 | 66 | 14.39 | ND |
| 38 | 20.84 | 26.01 | 67 | 19.56 | 16.50 |
| 39 | 32.20 | 28.62 | 68 | 27.70 | 23.10 |
| 40 | 28.39 | 26.25 | 69 | 25.64 | 17.27 |
| 41 | 25.80 | 24.40 | 70 | 20.17 | 13.16 |
| 45 | 27.27 | 23.17 | 71 | 15.73 | 12.29 |
| 46 | 22.35 | 11.68 | 72 | 12.57 | 13.09 |
| 47 | 10.61 | 14.70 | DDO-2084 | 17.7 ± 2.3 | ND[b] |

[a]The structure of the compound is as shown in specific examples;

[b]ND: not detected;

Moreover, some compounds have also been tested by Western-blot. The results of the inhibitory effect on the methyltransferase function of MLL1 at the cellular level are shown in FIG. 1. As can be seen from FIG. 1, the title compound of Example 72 can inhibit the catalytic activity of MLL1 dose-dependently to reduce the expression level of H3K4me1/2/3.

Figure 2:
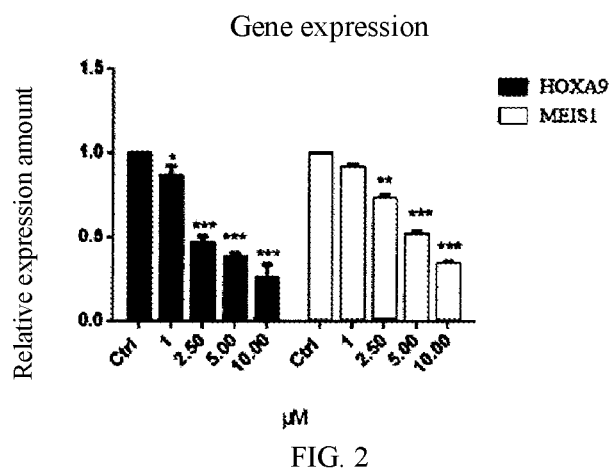
FIG. 2 shows down-regulation of the title compound of Example 72 on the intracellular expression of Hoxa9 and Meis-1 genes, as detected by a RT-PCR experiment.

Furthermore, some of the compounds of the present disclosure have also been subjected to a RT-PCR experiment at the cellular level. The results of the inhibitory effect of some compounds on the expression levels of downstream Hox and Meis-1 genes at the cellular level are shown in FIG. 2. As can be seen from FIG. 2, the title compound of Example 72 can down-regulate the expression levels of Hox and Meis-1 genes dose-dependently.

Figure 3:
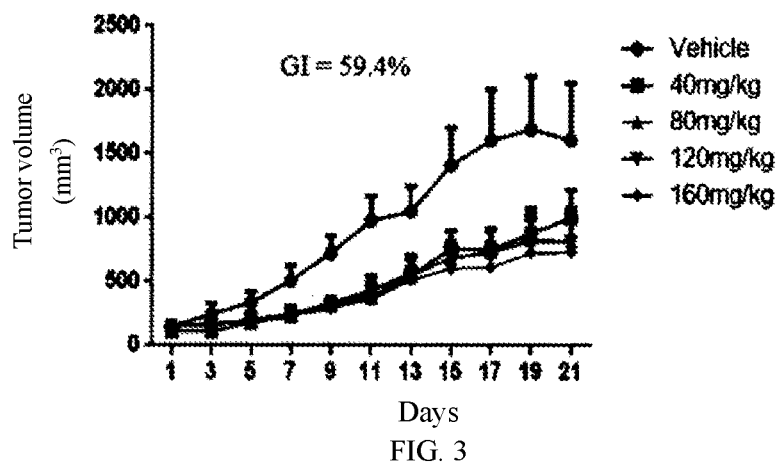
FIG. 3 shows the inhibition level of the title compound of Example 72 on a tumor at the animal level detected using a MV4-11 nude mouse xenograft model.

In addition, some of the compounds of the present disclosure have also been tested for the anti-tumor activity at the animal level. A nude mice xenograft tumor model of leukemia cells MV4-11 was selected for oral administration. The results of the inhibitory effect of some compounds on the MV4-11 tumor are shown in FIG. 3. As can be seen from FIG. 3, the title compound of Example 72 can inhibit the tumor growth dose-dependently at the animal level.

The invention claimed is:

1. An aniline-based WDR5 protein-protein interaction inhibitor, comprising a compound represented by general formula (I), a pharmaceutically acceptable salt thereof, a hydrate, or a solvate thereof:

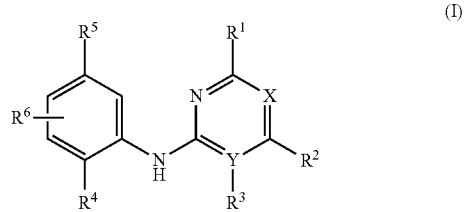

(I)

wherein X represents CH or N;
Y represents C or N;
$R^1$, $R^2$ and $R^3$ are selected from the group consisting of hydrogen, $C_1$-$C_6$ alkyl, $C_3$-$C_6$ cycloalkyl, and $C_1$-$C_6$ alkyl substituted with $C_1$-$C_6$ alkoxyl, nitro, halo, cyano, aldehyde group, hydroxyl, or —$NR^7R^8$, wherein $R^7$ and $R^8$ represent hydrogen, or $C_1$-$C_4$ alkyl, or $R^7$ and $R^8$ together form a 3- to 7-membered nitrogenous heterocycle formed by linking $R^7$ and $R^8$;
$R^4$ represents morpholinyl, piperazinyl, 4-substituted piperazinyl, 4-substituted homopiperazinyl, 3-substituted piperazinyl, or 2-substituted piperazinyl, wherein a substituent is $C_1$-$C_4$ alkyl, 3- to 7-membered cycloalkyl, hydroxyalkyl, or phenyl;
$R^5$ represents nitro, amino, phenyl, substituted phenyl, 5- to 6-membered oxygenic or nitrogenous aromatic heterocycle, substituted 5- to 6-membered oxygenic or nitrogenous aromatic heterocycle, or —$NHCOR^9$; wherein $R^9$ represents hydroxyl, $C_1$-$C_6$ alkoxy, phenyl, substituted phenyl, 5- to 6-membered oxygenic or nitrogenous aromatic heterocycle, or substituted 5- to 6-membered oxygenic or nitrogenous aromatic heterocycle, wherein a substituent is $C_1$-$C_4$ alkyl, $C_1$-$C_4$ alkoxy, halo, cyano, —$NHCOR^{10}$, —$CONR^{11}R^{12}$ or —$COOR^{10}$, wherein $R^{10}$ represents hydrogen, $C_1$-$C_6$ alkyl, $C_1$-$C_6$ amino-substituted alkyl, 3- to 7-membered cycloalkyl, 3- to 7-membered nitrogenous or oxygenic heterocycle, or phenyl; and $R^{11}$ and $R^{12}$ represent hydrogen, $C_1$-$C_6$ alkyl, phenyl or substituted phenyl, or substituted or unsubstituted 3- to 7-membered nitrogenous or oxygenic heterocycle, or 3- to 7-membered nitrogenous or oxygenic heterocycle formed by linking $R^{11}$ and $R^{12}$; and $R^6$ represents hydrogen, halo, methyl, trifluoromethyl, amino, or substituted amino, wherein a substituent is $C_1$-$C_4$ alkyl, or allyl.

2. The aniline-based WDR5 protein-protein interaction inhibitor according to claim 1, wherein X represents CH or N, and Y represents C or N; wherein $R^1$, $R^2$ and $R^3$ are selected from the group consisting of hydrogen, methyl, methoxy, nitro, halo, cyano, aldehyde group, or —$NR^7R^8$, wherein $R^7$ and $R^8$ represent hydrogen or $C_1$-$C_4$ alkyl, or 3- to 5-membered nitrogenous heterocycle formed by linking $R^7$ and $R^8$.

3. The aniline-based WDR5 protein-protein interaction inhibitor according to claim 1, wherein $R^4$ represents morpholinyl, piperazinyl, or 4-substituted piperazinyl, wherein a substituent is methyl, ethyl, cyclopropyl, hydroxyethyl, or phenyl.

4. The aniline-based WDR5 protein-protein interaction inhibitor according to claim 1, wherein $R^5$ represents nitro, amino, —$NHCOR^9$, furyl, pyrimidinyl, pyridinyl, substituted triazolyl, or substituted phenyl, wherein a substituent is a mono- or di-substituted halo, —$NHCOR^{10}$, —$CONR^{11}R^{12}$, or —$COOR^{10}$, wherein $R^9$ represents phenyl, $R^{10}$ represents hydrogen, $C_1$-$C_6$ alkyl, $C_1$-$C_6$ amino-substituted alkyl, 3- to 7-membered cycloalkyl, 3- to 7-membered nitrogenous or oxygenic heterocycle, or phenyl; and $R^{11}$ and $R^{12}$ represent hydrogen, $C_1$-$C_6$ alkyl, phenyl or substituted phenyl, substituted or unsubstituted 3- to 7-membered nitrogenous or oxygenic heterocycle, or 3- to 7-membered nitrogenous or oxygenic heterocycle formed by linking $R^{11}$ and $R^{12}$.

5. The aniline-based WDR5 protein-protein interaction inhibitor according to claim 1, wherein the pharmaceutically acceptable salt is an inorganic acid salt or an organic acid salt represented by general formula (I); wherein the inorganic acid salt is a hydrochloride, a hydrobromide, or a sulfate; and the organic acid salt is an acetate, a lactate, a succinate, a fumarate, a maleate, a citrate, a benzoate, a methanesulfonate, or a p-toluenesulfonate.

6. A pharmaceutical composition, comprising the aniline-based WDR5 protein-protein interaction inhibitor of formula I according to claim 1 and one or more pharmaceutical carriers, diluents and excipients.

7. A method of treating a condition related to a WDR5 enzyme function in an animal, comprising administering to the animal an effective amount of the compound of claim 1.

8. The method of claim 7, wherein the condition is a hematological tumor.

9. The method of claim 8, wherein the hematological tumor is acute leukemia.

10. The compound of claim 1, having the structure:

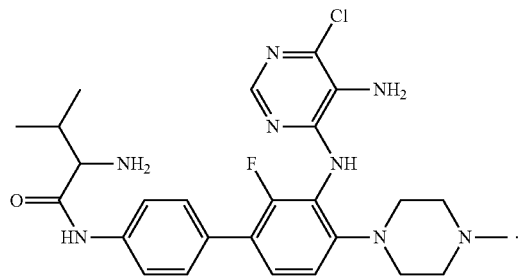 [SMILES: CC(C)C(N)C(=O)Nc1ccc(-c2ccc(N3CCN(C)CC3)c(Nc3ncnc(Cl)c3N)c2F)cc1]

11. The compound of claim 1, having the structure:
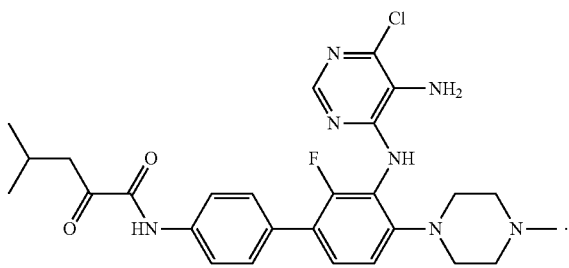 [SMILES: CC(C)CC(=O)C(=O)Nc1ccc(-c2ccc(N3CCN(C)CC3)c(Nc3ncnc(Cl)c3N)c2F)cc1]
12. The compound of claim 1, having the structure:
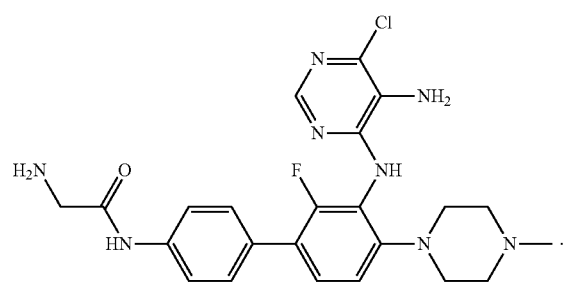 [SMILES: CN1CCN(c2ccc(-c3ccc(NC(=O)CN)cc3)c(F)c2Nc2ncnc(Cl)c2N)CC1]
13. The compound of claim 1, having the structure:
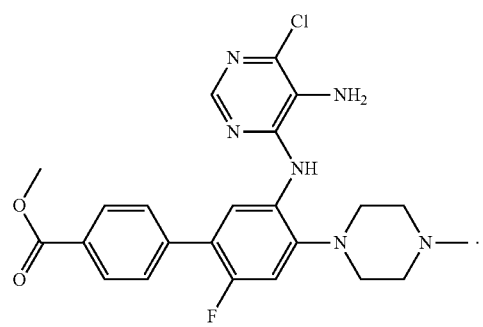 [SMILES: COC(=O)c1ccc(-c2cc(Nc3ncnc(Cl)c3N)c(N3CCN(C)CC3)cc2F)cc1]
14. The compound of claim 1, having the structure:
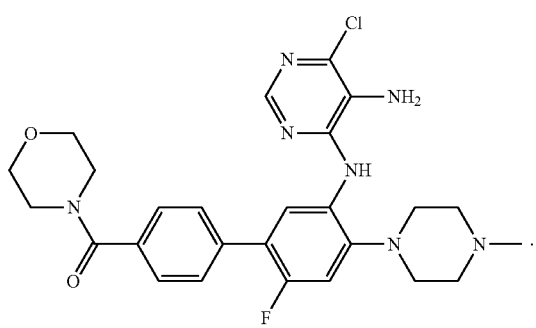 [SMILES: CN1CCN(c2cc(F)c(-c3ccc(C(=O)N4CCOCC4)cc3)cc2Nc2ncnc(Cl)c2N)CC1]
15. The compound of claim 1, having the structure:
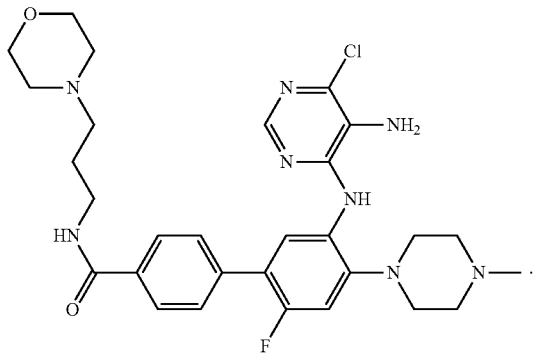 [SMILES: CN1CCN(c2cc(F)c(-c3ccc(C(=O)NCCCN4CCOCC4)cc3)cc2Nc2ncnc(Cl)c2N)CC1]
16. The compound of claim 1, having the structure:
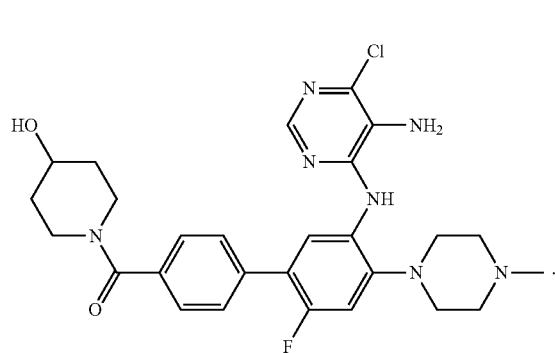 [SMILES: CN1CCN(c2cc(F)c(-c3ccc(C(=O)N4CCC(O)CC4)cc3)cc2Nc2ncnc(Cl)c2N)CC1]
17. The compound of claim 1, having the structure:
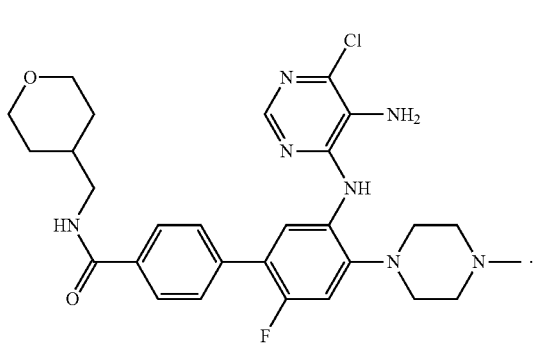 [SMILES: CN1CCN(c2cc(F)c(-c3ccc(C(=O)NCC4CCOCC4)cc3)cc2Nc2ncnc(Cl)c2N)CC1]
18. The compound of claim 1, having the structure:
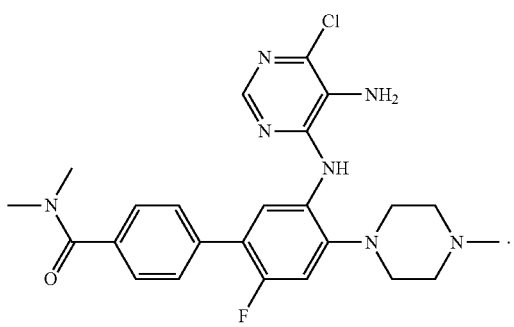
* * * * *